(12) United States Patent  (10) Patent No.:     US 8,627,414 B1
McCune et al.  (45) Date of Patent:     Jan. 7, 2014

(54) METHODS AND APPARATUSES FOR USER-VERIFIABLE EXECUTION OF SECURITY-SENSITIVE CODE

(75) Inventors: Jonathan M. McCune, Pittsburgh, PA (US); Adrian M. Perrig, Pittsburgh, PA (US); Anupam Datta, Pittsburgh, PA (US); Virgil Dorin Gligor, Pittsburgh, PA (US); Yanlin Li, Pittsburgh, PA (US); Bryan Jeffrey Parno, Pittsburgh, PA (US); Amit Vasudevan, Pittsburgh, PA (US); Ning Qu, San Jose, CA (US)

(73) Assignee: Carnegie Mellon University, Pittsburgh, PA (US)

( * ) Notice: Subject to any disclaimer, the term of this patent is extended or adjusted under 35 U.S.C. 154(b) by 912 days.

(21) Appl. No.: 12/720,008

(22) Filed: Mar. 9, 2010

Related U.S. Application Data

(60) Provisional application No. 61/273,454, filed on Aug. 4, 2009, provisional application No. 61/273,448, filed on Aug. 4, 2009.

(51) Int. Cl.
| | |
|---|---|
| *G06F 7/04* | (2006.01) |
| *G06F 12/14* | (2006.01) |
| *H04L 29/06* | (2006.01) |
| *H04L 9/32* | (2006.01) |
| *G06F 15/167* | (2006.01) |
| *G06F 15/16* | (2006.01) |

(52) U.S. Cl.
USPC ........ 726/4; 726/7; 726/23; 726/27; 713/165; 713/166; 713/168; 709/212; 709/217

(58) Field of Classification Search
USPC ........ 726/17, 4, 7, 23, 27; 713/165, 166, 168; 709/212, 217
See application file for complete search history.

(56) References Cited

U.S. PATENT DOCUMENTS

2007/0067435 A1\* 3/2007 Landis et al. ............... 709/224

OTHER PUBLICATIONS

Singaravelu, L. et al., Reducing TCB Complexity for Security-Sensitive Applications: Three Case Studies, Eurosys '06, Apr. 18-21, 2006, Leuven, Belgium, 2004.
Ta-Min, R. et al., Splitting Interfaces: Making Trust Between Applications and Operating Systems Configurable, Department of Computer Science, University of Toronto, 1-14, 2006.
Wahbe, R. et al., Efficient Software-Based Fault Isolation, Computer Science Division, University of California, SIGOPS, 1993, 203-216.
Yang, J. et al., Using Hypervisor to Provide Data Secrecy for User Applications on a Per-Page Basis, VEE '08, Mar. 5-7, 2008, Seattle, Washington, 71-80.
TPM Main Part 1: Design Principles, Specification Version 1.2, Level 2 Revision 103, Jul. 9, 2007, TCG 2003-2007.

(Continued)

*Primary Examiner* — Aravind Moorthy
(74) *Attorney, Agent, or Firm* — Fox Rothschild LLP; Dennis M. Carleton

(57) ABSTRACT

A computer including a processor and a verification device. The processor in the computer performs the steps of authenticating a secure connection between a hypervisor and the verification device, measuring the identity of at least a portion of a select guest before the select guest executes any instruction, and sending a measurement of the identity of the select guest to the verification device. The verification device compares the policy stored in the verification device with the measurement of the select guest received by the verification device. The steps of authenticating, measuring, sending, and comparing are performed after receiving a signal indicative of a request to execute the select guest and without rebooting the computer.

35 Claims, 31 Drawing Sheets

(56) References Cited

OTHER PUBLICATIONS

TPM Main Part 2: TPM Structures, Specification Version 1.2, Level 2 Revision 103, Oct. 26, 2006, TCG 2003-2005.
TPM Main Part 3: Commands, Specification Version 1.2, Level 2 Revision 103, Oct. 26, 2006, TCG 2003-2005.
AMD64 Technology: AMD64 Architecture Programmer's Manual vol. 2: System Programming, Publication No. 24593, Revision 3.14, Sep. 2007.
The Invisible Things Lab's blog: Attacking Intel Trusted Execution Technology, Jan. 5, 2009.
National Computer Security Center: A Guide to Understanding Covert Channel Analysis of Trusted Systems, Nov. 1993, Version 1.
Abadi, M. et al., Control-Flow Integrity: Principles, Implementations, and Applications, Microsoft, 2005.
Arbaugh, W. et al., A Secure and Reliable Bootstrap Architecture, IEEE, 1997.
Barak, B. et al., On the (Im)possibility of Obfuscating Programs, Aug. 1998.
Berger, S. et al., vTPM: Virtualizing the Trusted Platform Module, USENIX Association, Security '06: 15th USENIX Security Symposium, 305-320, 2006.
Bhargava, R. et al., Accelerating Two-Dimensional Page Walks for Virtualized Systems, ASPLOS '08, Mar. 1-5, 2008, Seattle, Washington, 26-35.
Bond, M., Diagnosing and Tolerating Bugs in Deployed Systems, University of Texas, 2008.
Brumley, D. et al., Privtrans: Automatically Partitioning Programs for Privilege Separation, Carnegie Mellon University, USENIX Security Symposium, 2004.
Chen, X. et al., Overshadow: A Virtualization-Based Approach to Retrofitting Protection in Commodity Operating Systems, ASPLOS '08, Mar. 1-5, 2008, Seattle, Washington.
Chen, H. et al., Tamper-Resistant Execution in an Untrusted Operating System Using a Virtual Machine Monitor, Parallel Processing Institute, Fudan University, 2007.
Chen, B. et al., Certifying Program Execution with Secure Processors, MIT Laboratory for Computer Science, In Proceedings of HotOS, 2003.
Clarke, E. et al., A Tool for Checking ANSI-C Programs, Carnegie Mellon University, 2004.
Cox, L. et al., Pocket Hypervisors: Opportunities and Challenges, 2007.
Datta, A. et al., A Logic of Secure Systems and its Application to Trusted Computing, Carnegie Mellon University, IEEE Computer Society, 2009.
Dewan, P. et al., A Hypervisor-Based System for Protecting Software Runtime Memory and Persistent Storage, SpringSin, 2008.
Dolev, D. et al., On the Security of Public Key Protocols, Department of Computer Science, Stanford University, May 1981.
Garfinkel, T. et al., Terra: A Virtual Machine-Based Platform for Trusted Computing, SOSP '03, Oct. 19-22, 2003, New York.
NCSC-TG-030, Library No. S-240,572, Version 1, National Computer Security Center, Nov. 1993.
Intel Virtualization Technology Specification for the IA-32 Intel Architecture, C97063-002, Apr. 2005.
Intel Trusted Execution Technology (Intel TXT): Software Development Guide, Dec. 2009.
Kauer, Bernhard, OSLO: Improving the Security of Trusted Computing. Department of Computer Science, Technische Universitat Dresden, Aug. 2007.
Klein, G. et al., seL4: Formal Verification of an OS Kernel, ACM Symposium on Operating System Principles, 2009.
Lampson, Butler W., A Note on the Confinement Problem, Xerox Palo Alto Research Center, 1973.
Litty, L. et al., Hypervisor Support for Identifying Covertly Executing Binaries, USENIX Association, 17th USENIX Security Symposium, 243-258, 2008.
Fournet, C. et al., A Security-Preserving Compiler for Distributed Programs: From Information-Flow Policies to Cryptographic Mechanisms, CCS '09, Nov. 9-13, 2009, Chicago, Illinois, 1-10.
McCamant, S. et al Evaluating SFI for a CISC Architecture, 1-16, 15th USENIX Security Symposium, 209-224, 2006.
McLean, John, A General Theory of Composition for a Class of "Possibilistic" Properties, IEEE Transactions on Software Engineering, vol. 22 (1): 53-67, 1996.
McCune, J. et al., Flicker: An Execution Infrastructure for TCB Minimization, EuroSys '08, Apr. 1-4, 2008, Glasgow, Scotland.
McCune, J. et al., Minimal TCB Code Execution (Extended Abstract), IEEE Symposium on Security and Privacy, 2007.
McCune, J. et al., How Low Can You Go?: Recommendations for Hardware-Supported Minimal TCB Code Execution, ASPLOS'08, Mar. 1-5, 2008, Seattle, Washington.
Misra, S. et al., Relationships Between Selected Software Measures and Latent Bug-Density: Guidelines for Improving Quality, Springer-Verlag Berlin Heidelberg, 2003.
Nguyen, V. et al., A Model and Temporal Proof System for Networks of Processes, ACM, 1984.
Owicki, S. et al., Proving Liveness Properties of Concurrent Programs, ACM Transactions on Programming Languages and Systems, vol. 4 (3): 455-495, 1982.
Petroni, Jr., N. et al., Copilot—a Coprocessor-based Kernel Runtime Integrity Monitor, 2004.
Rahita, R. et al Dynamic Software Application Protection, Intel Corporation, 2009.
Kennell, R. et al., Establishing the Genuinity of Remote Computer Systems, USENIX Association, Proceedings of the 12th USENIX Security Symposium, Washington, DC, Aug. 4-8, 2003, 295-310.
Sailer, R. et al., Design and Implementation of a TCG-based Integrity Measurement Architecture, USENIX Association, Proceedings of the 13th USENIX Security Symposium, San Diego, CA, Aug. 9-13, 2004.
Sadeghi, A. et al., TCG Inside?—A Note on the TPM Specification Compliance, 2006.
Schneider, F., Enforceable Security Policies, Cornell University, ACM Transactions on Information and System Security, vol. 3 (1): 30-50, 2000.
Seshadri, A. et al., Pioneer: Verifying Code Integrity and Enforcing Untampered Code Execution on Legacy Systems, SOSP '05, Oct. 23-26, 2005, Brighton, United Kingdom.
Shacham, Hovav, The Geometry of Innocent Flesh on the Bone: Return-into-libe Without Function Calls (on the x86), Sep. 2007.
Shankar, U. et al., Side Effects are not Sufficient to Authenticate Software, Report No. UCB/CSD-04-1363, Sep. 2004.
Shi, E. et al BIND: A Fine-grained Attestation Service for Secure Distributed Systems, May 2005.
Seshadri, A. et al., SecVisor: A Tiny Hypervisor to Provide Lifetime Kernel Code Integrity for Commodity OSes, SOSP '07, Oct. 14-17, 2007.
Small, C. et al., MiSFIT: A Tool for Constructing Safe Extensible C++ Systems, Harvard University, 3rd USENIX Conference on Object-Orientated Technology (COOTS), 1997.

\* cited by examiner

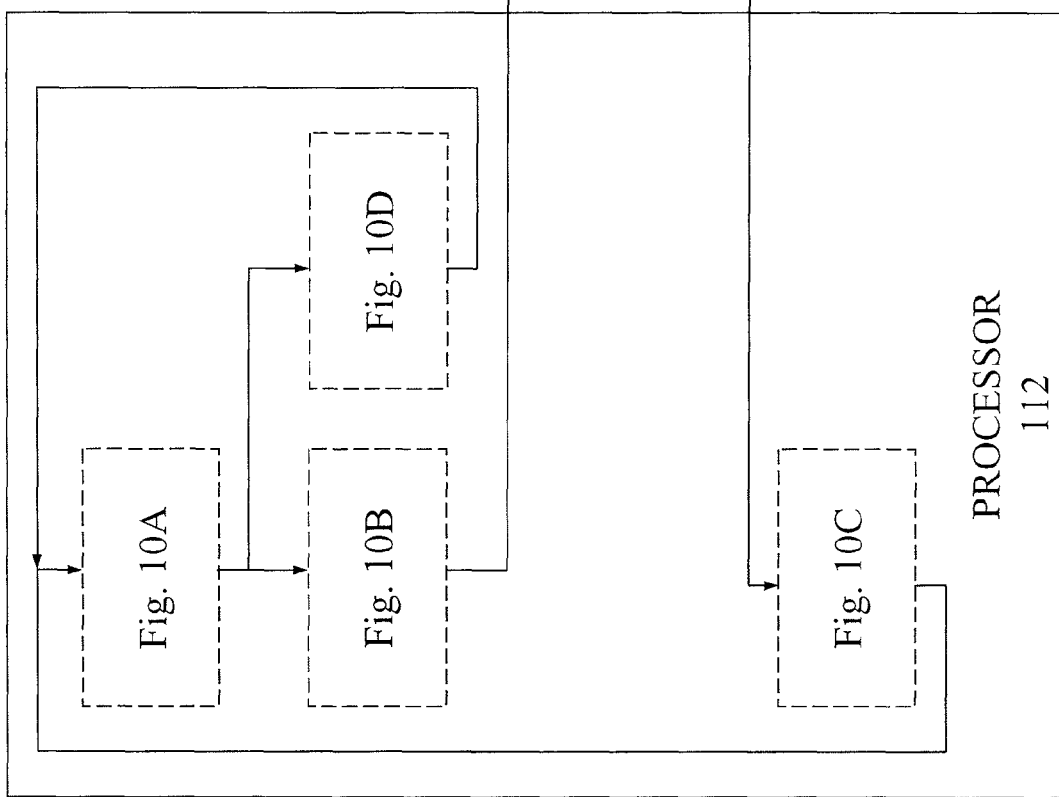

| | |
|---|---|
| Remote Party (RP): | has $AIK_{public}$, expected hash(TrustVisor) = $\hat{H}$ |
| TV: | TPM_Extend(PCR[18], $h(\mu AIK_{public})$) |
| RP: | generate $nonce1$, $nonce2$ |
| RP → App: | $nonce1$, $nonce2$ |
| App → SSCB: | $nonce2$ |
| App: | q1 ← TPM_Quote(PCR[17,18], $nonce1$) |
| SSCB: | q2 ← TV_Quote($\mu$PCR[0], $nonce2$) |
| App → SSCB: | q2 |
| RP ← App: | q1, q2 |
| RP: | if ($\neg$Verify($AIK_{public}$, q1, $nonce1$) |
| | $\vee$ q.PCR17 $\neq h(0\|\hat{H})$ |
| | $\vee$ q.PCR18 $\neq h(0\|h(\mu AIK_{public}))$ |
| | $\vee \neg$Verify($\mu AIK_{public}$, q2, $nonce2$) |
| | ) then abort |
| RP: | $\mu PCR$ array represents a valid SSCB run. |

Fig. 22

METHODS AND APPARATUSES FOR USER-VERIFIABLE EXECUTION OF SECURITY-SENSITIVE CODE

CROSS-REFERENCE TO RELATED APPLICATIONS

This application claims priority from U.S. Provisional Patent Application No. 61/273,454, filed Aug. 4, 2009, which is incorporated herein by reference. This application is related to U.S. provisional patent application No. 61/273,448, filed Aug. 4, 2009 and U.S. patent application Ser. No. 11/545,924, filed Oct. 10, 2006.

STATEMENT REGARDING FEDERALLY-SPONSORED RESEARCH AND DEVELOPMENT

This invention may have been made with government support under contracts DAAD19-02-1-0389 and W911NF-09-1-0273, awarded by the Army Research Office. The United States government may have certain rights in this invention.

FIELD OF THE INVENTION

The present invention is directed generally to methods and apparatuses for user-verifiable execution of security-sensitive code and, more particularly, for such methods and apparatuses for use on untrusted computer platforms.

BACKGROUND OF THE INVENTION

The increasing complexity of computer systems makes them vulnerable to a variety of attacks. The dominant current approach to deal with such malware is to compare execution patterns with malware patterns (i.e., malware signatures). Unfortunately, this has led to an "arms race," where malware developers flood the defenders with polymorphic and ever-changing malware.

Current commodity operating systems and the majority of applications lack assurance that the secrecy and integrity of security-sensitive code and data remain intact. Absent is any guarantee of code integrity, which implies that users, administrators, and other systems must blindly trust that a given system platform or application protects its sensitive data—trust that is all too often misplaced.

Three fundamental causes of this problem are: (1) increased size and complexity of commodity operating systems over time, which effectively eliminates the possibility of precise, formal verification of the entire code base, (2) retention of object code compatibility of operating system and application APIs, which implies their immutability in time despite the presence of demonstrable design flaws, and (3) new business models for developing operating systems and applications rely extensively on mixed-provenance code bases; i.e., code provided by different development organizations with different business interests. This rules out global guarantees of security properties since a single point of control and responsibility over a platform's code base does not exist any longer.

A significant source of increased size and complexity is support for "plug and play" code that changes system configuration by adding new devices and system administrative functions to the base operating system. Undoubtedly operating system ease of extensibility is a fundamental requirement for innovation. However, complexity is often further increased by removing inter-module and inter-layer boundaries to enhance system performance for these applications. Unfortunately, verification of the code base and the analysis of its penetration resistance cannot be effectively performed for code bases that are almost continuously extended in time with their modules reaching sizes that exceed one million lines of monolithic code. It is not just the Windows code base that was extended over the past 20 years: in the mid 1980s UNIX for PCs had 50 K SLOC in the Kernel (and 120 K in security-relevant components); today it has over 1 M SLOC.

Retention of object-code compatibility for applications suggests that design flaws cannot be readily eliminated without breaking an execution environment. In time, lack of object code compatibility tends to destroy the very market base sought by a system provider, such as whenever users of that environment have to recompile their code with a new set of APIs. Often users cannot perform recompilation since very seldom do they own the source code of their applications. In effect, if flawed APIs become immutable, "compatibility with previous mistakes" becomes a pervasive challenge to building trusted systems. Numerous examples of conflicts between API definitions and security properties exist, ranging from APIs that have built-in covert channels that would otherwise not exist [National Computer Security Center. A guide to understanding covert channel analysis of trusted systems. Technical Report NCSC-TG-030 Version 1, National Computer Security Center, November 1993.], to APIs that enable outright penetration of an operating system [M. Howard and D. LeBlanc. Writing Secure Code: Second Edition. Microsoft Press, 2003.], and to cryptographic APIs that enable discovery of secrets [M. D. Bond. Diagnosing and Tolerating Bugs in Deployed Systems. PhD thesis, University of Cambridge, 2008.]. The challenge of how to remove or neutralize API flaws without introducing object-code incompatibility for extant applications has been a subject of intense research (viz., over half-a-dozen workshops in the API security area).

Mixed-provenance code within an operating system or application means that code analysis, verification, and unit testing of the resulting system cannot possibly be performed, since no single party would own, and have access to, all the system source code. A code provider and a code user have different, often conflicting business interests: the code provider does not have any incentive to address the verification concerns of the code user since the provider cannot be expected to satisfy global system properties; whereas the code user may know all global system properties but has no access to the many providers' code bases to verify them. Thus, externally provided modules could only be monolithically API-tested for coarse, global properties by the code user—hardly a reassuring feature for a computing base upon which security-sensitive applications are expected to rely. The inner working of at least some NVIDIA drivers are a mystery to Microsoft while Microsoft's higher-level security concerns are far removed from NVIDIA's design priorities. Yet those drivers affect the overall system security as much as any other code. Similar security dilemmas appear at the application level; e.g., in the financial and banking applications it is estimated that 70% of all software is of mixed provenance.

These three fundamental obstacles to the development of trusted commodity operating systems and applications suggest that we will not achieve the level of assurance necessary to run security-sensitive code and data on these platforms in the near future. Yet, commodity operating systems and applications offer unmatched incentives for use by both casual users and developers, and hence will remain a dominant presence in the marketplace. First, commodity systems have become and will continue to be the major common platforms for innovation. Hence, the latest technology advances are likely to occur on these platforms and thus they can hardly be set aside. Second, they provide a rich development environment by offering powerful application and device support. Third, they combine productivity software (e.g., office, web, mail) with entertainment (e.g., games, socialization) in a marketplace that values consolidation of computing and communication services.

Challenge 1.

The major challenge we face is not to develop new secure operating system platforms, though this remains a worthy long-term goal. Nor is it to eliminate all software flaws from an existing platform, though this too remains a worthy, if somewhat elusive, goal. Instead, the major challenge is to develop system-level techniques that enable users to run applications containing security-sensitive code and data on untrusted commodity platforms, which may be plagued by malware (e.g., rootkits, Trojan Horse programs, software key-loggers, screen-scrapers), and yet provide strong, user-verifiable assurances of secrecy and integrity selectively for the applications' security-sensitive code and data. That is, a developer should be able to specify precisely and select the security-sensitive code and data of an application, and provide guarantees, which can be verified by a user external to the untrusted platform, that the desired security properties of the selected code and data are maintained even in the presence of malware. Moreover, the verification of these guarantees should be available at any time, not just at system boot, and should be easy to perform by a casual user. Finally, the mechanisms that provide these capabilities should not impose significant, or even user-perceptible, performance degradation.

Security Properties.

A second challenge that arises in running security-sensitive code and maintaining the data of an application on an untrusted platform is that of specifying what security properties can be supported. Clearly, some security properties cannot be supported either in theory or in practice. For instance, certain code-obfuscation models that do not take advantage of any underlying system security features (i.e., are implementation-independent) can be theoretically ruled out [B. Barak, O. Goldreich, R. Impagliazzo, S. Rudich, A. Sahai, S. Vadhan, and K. Yang. On the (Im)possibility of obfuscating programs. In Advances in Cryptology (CRYPTO), August 1998.]. Other properties, such as those of noninterference and other information-flow control policies (e.g., elimination or control of covert channel use), may be theoretically viable but either impractical in or insignificant to an application.

There is a need to support a very large class of security properties that fall into the class of "safety" properties [S. Gupta and V. Gligor. Towards a theory of penetration-resistant systems and its applications. In Proceedings of the Computer Security Foundations Workshop, June 1991.], [S. Gupta and V. Gligor. Experience with a penetration analysis method and tool. In Proceedings of the National Computer Security Conference, October 1992.], [V. Nguyen, D. Gries, and S. Owicki. A model and temporal proof system for networks of processes. In Proceedings of the ACM Symposium on Principles of Programming Languages (POPL), pages 121-131, 1985.], [S. Owicki and L. Lamport. Proving liveness properties of concurrent programs. ACM Trans. Program. Lang. Syst., 4(3):455-495, 1982.]. There are three important reasons for this. First, most security polices can be expressed as safety properties [F. B. Schneider. Enforceable security policies. ACM Trans. Inf. Syst. Secur., 3(1):30-50, 2000.], and while information-flow policies are a notable exception [J. McLean. A general theory of composition for a class of "possibilistic" properties. IEEE Trans. Softw. Eng., 22(1):53-67, 1996.], most of these policies can be approximated as safety properties; e.g., all mandatory access controls implemented to date are such approximations. Second, most penetration-resistance properties can also be expressed as safety properties, since they are typically represented via state-transition models [M. Bishop. Computer Security Art and Science. Addison Wesley, 2003.]. Finally, the only "liveness" properties that concern the selected sections of application code whose security needs to be protected are automatically converted into "safety" properties in our system. That is, the protected execution of these sections is bracketed by "timeouts" so that termination of their execution is always guaranteed [F. B. Schneider. Enforceable security policies. ACM Trans. Inf. Syst. Secur., 3(1):30-50, 2000.].

Challenge 2.

Another core challenge is that any security system that is added needs to be compatible with current applications and IT workflows. For example, end-users do not want to abandon their legacy software and OS to switch to a new system to gain better security. Thus, we need to ensure that our mechanisms are compatible with current operating environments and applications.

Related Research in Software-Based Attestation.

Genuinity is a technique that explores the problem of detecting the difference between a simulator-based computer system and an actual computer system [R. Kennell and L. H. Jamieson. Establishing the genuinity of remote computer systems. In Proceedings of the USENIX Security Symposium, 2004.]. Genuinity relies on the premise that simulator-based program execution is bound to be slower because a simulator has to simulate the CPU architectural state in software, in addition to simulating the program execution. A special checksum function computes a checksum over memory, while incorporating different elements of the architectural state into the checksum. By the above premise, the checksum function should run slower in a simulator than on an actual CPU. While this statement is probably true when the simulator runs on an architecturally different CPU than the one it is simulating, an adversary having an architecturally similar CPU can compute the Genuinity checksum within the allotted time while maintaining all the necessary architectural state in software. As an example, in their implementation on the x86, Kennell and Jamieson [R. Kennell and L. H. Jamieson. Establishing the genuinity of remote computer systems. In Proceedings of the USENIX Security Symposium, 2004.] propose to use special registers, called Model Specific Registers (MSR), that hold various pieces of the architectural state like the cache and TLB miss count. The MSRs can only be read and written using the special RDMSR and WRMSR instructions. We found that these instructions have a long latency (approximately 300 cycles). An adversary that has an x86 CPU could simulate the MSRs in software and still compute the Genuinity checksum within the allotted time, even if the CPU has a lower clock speed than what the adversary claims. Also, researchers have documented weaknesses in the Genuinity approach [U. Shankar, M. Chew, and J. Tygar. Side effects are not sufficient to authenticate software. In Proceedings of the 13th USENIX Security Symposium, 2004.].

Related Research in Hardware-Based Attestation.

The Integrity Measurement Architecture (IMA) is a SRTM-based technique that relies on the TPM chip standardized by the Trusted Computing Group [R. Sailer, X. Zhang, T. Jaeger, and L. van Doorn. Design and implementation of a TCG-based integrity measurement architecture. In Proceedings of the USENIX Security Symposium, August 2004.]. That technique enables a remote verifier to verify what software was loaded into the memory of a platform. However, a malicious peripheral could overwrite code that was just loaded into memory with a DMA-write, thereby breaking the load-time attestation guarantee. The Terra system uses a Trusted Virtual Machine Monitor (TVMM) to partition a tamper-resistant hardware platform into multiple virtual machines (VM) that are isolated from each other [T. Garfinkel, B. Pfaff, J. Chow, M. Rosenblum, and D. Boneh. Terra: A virtual machine-based platform for trusted computing. In Proceedings of the Symposium on Operating System Principles, 2003.]. CPU-based virtualization and protection are used to isolate the TVMM from the VMs and the VMs from each other. Although the authors only discuss load-time attestation using a TPM, Terra is capable of performing runtime attestation on the software stack of any of the VMs by asking the TVMM to take integrity measurements at any time. All the properties provided by Terra are based on the assumption that the TVMM is uncompromised when it is started and that it cannot be compromised subsequently. Terra uses the load-time attestation property provided by TCG to guarantee that the TVMM is uncompromised at start-up. Since this property of TCG is compromised, none of the properties of Terra hold. Even if TCG were capable of providing the load-time attestation property, the TVMM could be compromised at run-time if there are vulnerabilities in its code. The Copilot approach relies on an add-in card connected to the PCI bus to perform periodic integrity measurements of the in-memory Linux kernel image [N. L. Petroni, Jr., T. Fraser, J. Molina, and W. A. Arbaugh. Copilot—a coprocessor-based kernel runtime integrity monitor. In Proceedings of the USENIX Security Symposium, 2004.]. These measurements are sent to the trusted verifier through a dedicated side channel. The verifier uses the measurements to detect unauthorized modifications to the kernel memory image. The Copilot PCI card cannot access CPU-based state such as the pointer to the page table and pointers to interrupt and exception handlers. Without access to such CPU state, it is impossible for the PCI card to determine exactly what resides in the memory region that the card measures. The adversary can exploit this lack of knowledge to hide malicious code from the PCI card. For instance, the PCI card assumes that the Linux kernel code begins at virtual address 0xc0000000, since it does not have access to the CPU register that holds the pointer to the page tables. While this assumption is generally true on 32-bit systems based on the Intel x86 processor, the adversary can place a correct kernel image starting at address 0xc0000000 while in fact running a malicious kernel from another memory location. (The authors of Copilot are aware of this attack.) It is not possible to prevent this attack without access to the CPU state.

The Cerium [B. Chen and R. Morris. Certifying program execution with secure procesors. In Proceedings of HotOS, 2003.] approach uses hardware extensions to the execution platform to provide a remote host with the guarantee of verifiable code execution. Cerium relies on a physically tamper-resistant CPU with an embedded public-private key pair and a micro-kernel that runs from the CPU cache. Unfortunately, Cerium remains a paper design and was never built. The BIND system [E. Shi, A. Perrig, and L. van Doorn. BIND: A time-of-use attestation service for secure distributed systems. In Proceedings of IEEE Symposium on Security and Privacy, May 2005.] requires that the execution platform provides support for DRTM and was designed for an early version of AMD Secure Virtual Machine (SVM) processors. The Open Secure Loader (OSLO) [B. Kauer. OSLO: Improving the security of Trusted Computing. In Proceedings of the USENIX Security Symposium, August 2007.] employs the AMD SVM SKINIT instruction to eliminate the BIOS and boot loader from the TCB and establish a DRTM for trusted boot. The Flicker system provides an approach for secure execution and externally-verifiable code execution that relies on DRTM mechanisms offered by modern AMD and Intel processors [J. M. McCune, B. Parno, A. Perrig, M. K. Reiter, and H. Isozaki. Flicker: An execution infrastructure for TCB minimization. In Proceedings of the ACM European Conference in Computer Systems (EuroSys), April 2008.].

Accordingly, there is a need for improved security for sensitive code and data, particularly for improvements that are easy to use. Those and other advantages of the present invention will be described in more detail hereinbelow.

BRIEF SUMMARY OF THE INVENTION

The present invention offers a different approach than that offered in the prior art. In particular, the present invention defines a secure execution environment and provides specific mechanisms to detect any attempted violation of its security properties.

One key insight is that users tend to perform security-sensitive transactions infrequently. Furthermore, modern hardware allows for rapid and secure switching between two completely different computing environments. As a result, according to one embodiment, the present invention can include a system to provide several security modes on a single computer system. In such a system, users can activate a "secure mode" before performing security-sensitive transactions, and then return to a non-secure mode for other activities and with fewer restrictions than in the secure mode.

One goal of research that lead to the present invention was to obtain user-verifiable execution properties for software executing on an untrusted host, potentially containing malicious software. We investigated a technique for User-Verifiable Execution of Security-sensitive Code on Untrusted Platforms (UVESCUP) in the presence of malware. This technique allows an entity (the verification device) to obtain assurance that the execution of an arbitrary piece of code, called the target executable, on a local or remote computing device is not tampered with by any malware that may be present on the computing device. The research performed had three specific overall technical objectives.

The first technical objective was to produce the design of a user-verifiable execution of security sensitive code on untrusted platforms (1) in the presence of malware, and (2) under minimal assumptions regarding the physical security and administrative (e.g., insider) trust. This goal is important since any network-connected computing platform is subject to malware attacks, and since the use of state-of-the-art physical protection mechanisms (e.g., tamper-proof TPMs) cannot fully protect against malware and physical attacks launched by insiders.

The second technical objective of the UVESCUP technology is reducing the use of secrets (i.e., secret keys) in either hardware or software. This goal is important for two reasons. First, minimizing the use of secrets automatically minimizes the potential attack surface of our mechanism. Second, use of secrets in any basic security mechanism poses a significant bootstrapping problem: their protection cannot be provided by assuming other, more basic underlying mechanisms because these mechanisms do not necessarily exist or can be impractical.

The third technical objective is to increase the usability of security mechanisms with UVESCUP. This is important because experience with design and operation of secure systems for the past three decades indicates that a major risk factor in the use of security mechanisms is user/administrator error. Being keenly aware of the importance of human factors to security mechanism design and use, we performed a usability analysis of our design. This is important because invariably configuration errors lead to breaches of even the strongest security mechanisms. For example, configuration mismatches between what the trusted verifier of UVESCUP assumes and what the underlying platform supports can lead to circumvention of the implemented security mechanisms. Thus a key goal of the UVESCUP technology is the transparent verification of the required platform configuration As a result, the present invention can include a trusted verifier that can validate the correct execution of the secure environment on the untrusted host through attestation mechanisms. The verification device can be integrated or it can be removable. The present invention can also include a variety of mechanisms for both hardware-based and software-based attestation.

The following features may be included with the present invention for software-based attestation: no secrets are involved which enables recovery after system compromise; execution on legacy systems; low cost because no special hardware is needed; and updatability in case of detected vulnerabilities.

The present invention may also include one or more of the following features.

1. The present invention may be implemented for user-verifiable execution of security-sensitive code on untrusted platforms (UVESCUP) on commodity operating systems and in the presence of malware and under minimal assumptions regarding physical and administrative trust.

2. The present invention minimizes the use of secrets (e.g., secret cryptographic keys) in our system. Secrets are targets from the perspective of the attacker. Further, at the lowest level of system design, it may be impossible or impractical to assume pre-existing shared secrets.

3. The present invention is user friendly. An unusable security system will suffer from perpetual misconfiguration, and may introduce more problems than it solves by way of instilling a false sense of security and additional user overhead.

In addition to the above, we consider a more concrete definition of security-sensitive code, expand our use of hardware-supported attestation and virtualization, and additionally use software-based attestation to support legacy hardware and as a recovery mechanism in the event of compromise.

Security-Sensitive Code.

Legacy applications that depend on the availability of a flawed (from a security design perspective) API (e.g., Windows or Linux) may still be considered security-sensitive. However, the level and kind of protection that can be provided for these applications is different from the protections available to new code developed in accordance with today's best practices. Thus, an objective of our system is to offer the best possible protection in either scenario: to both legacy (and potentially fundamentally flawed) and newly developed security-sensitive code. We further strive for ease-of-adoptability with respect to our protection mechanisms for newly-developed code. This way, critical components of legacy applications can more readily be extracted or ported into our maximum security environment.

Hardware-Based Attestation.

Computing platforms equipped with the latest (v1.2) Trusted Platform Module [Trusted Computing Group. Trusted platform module main specification, Part 1: Design principles, Part 2: TPM structures, Part 3: Commands. Version 1.2, Revision 103, July 1007.] (TPM) and an appropriate CPU and chipset are capable of creating a dynamic root of trust (DRTM) for executing an arbitrary piece of code in isolation from everything else on the system except for the CPU, memory, and chipset [Advanced Micro Devices. AMD64 architecture programmer's manual: Volume 2: System programming. AMD Publication no. 24593 rev. 3.14, September 2007.], [Intel Corporation. Intel trusted execution technology—software development guide. Document number 315168-005, June 2008.]. The use of DRTM and the invoked code is recorded in the TPM so that it can be used in an attestation to an external entity. We leverage the DRTM mechanism to securely bootstrap a hypervisor, sometimes called "TrustVisor", that provides isolation and attestation facilities for guests of diverse pedigree. Though attacks have been demonstrated against TPM-equipped platforms [B. Kauer. OSLO: Improving the security of Trusted Computing. In Proceedings of the USENIX Security Symposium, August 2007.].

Software-Based Attestation.

Software-based attestation mechanisms (e.g., SWATT [A. Seshadri, A. Perrig, L. van Doorn, and P. Khosla. SWATT: Software-based attestation for embedded devices. In Proceedings of the IEEE Symposium on Security and Privacy, May 2004.] and Pioneer [A. Seshadri, M. Luk, E. Shi, A. Perrig, L. VanDoorn, and P. Khosla. Pioneer: Verifying integrity and guaranteeing execution of code on legacy platforms. In Proceedings of the Symposium on Operating Systems Principals, 2005]) offer many advantages. However, some examples of these mechanisms offer similar security properties to hardware-based DRTM but have a different set of requirements. Software-based attestation requires an authentic communication channel with extremely low latency, which rules out verification across the Internet. However, software-based attestations is perfectly viable even on older hardware that does not support hardware-based DRTM. Thus, these technologies are complementary along several axes. First, software-based attestation enables our secure execution environment on older hardware. Second, software-based attestation can serve as a recovery mechanism in the event that an adversary somehow learns (e.g., via expensive or time-consuming side-channel or timing attacks) the hardware TPM chip's secrets. In this case, we can use software-based attestation to reconfigure the platform's TPM chip and re-establish trust in the platform.

Secure Browser Environment.

To enable users to visit their trusted web sites in a secure fashion, the present invention may include a system that leverages a hypervisor, sometimes called "TrustVisor", and a verification device, sometime called the "USB verifier". The secure browser environment of the present invention will protect against malware interfering when a user visits her trusted web site(s).

In this embodiment, the present invention may set up TrustVisor on the system to switch between several OS partitions, each partition for a different security level. To verify the correct operation of TrustVisor and to provide a trusted path for a security indicator to the user, we leverage the trusted USB verifier. Through the use of hardware based attestation (or more specifically, an attestation to a late launch or dynamic root of trust operation) the USB verifier ensures the correct operation of TrustVisor. A switch on the USB verifier provides a trusted path for input, and triggers secure switching between different OS partitions.

To enable users to use their computers as they have become accustomed, TrustVisor provides an untrusted partition of an OS, permitting installation and execution of arbitrary software. For the secure partitions, TrustVisor will measure all OS and application components, to ensure code integrity and to prevent execution of any unapproved software. Furthermore, TrustVisor may write-protect all code on the system to protect that code against arbitrary write operations (this measure by itself will prevent the majority of current malware, including all kernel-level rootkits that we are aware of).

The OS and applications that execute in the trusted partition are still commodity OSes and applications. As a result, they are still plagued by vulnerabilities. To further protect the execution for the secure partitions, we ensure that network communication only occurs with approved sites over secure SSL connections. As a result, according to one embodiment of the present invention, no source other than the user's trusted sites can send network packets to the OS and applications within the secure OS. Consequently, only those trusted web sites could launch an attack. To achieve these properties, TrustVisor contains an SSL inspector or proxy, only permitting SSL network connections that use a specifically approved certificate.

In summary, the present invention can be made easy to use, only requiring users to realize when they intend to visit a secure web site, and to switch to a secure partition by pressing a button on the USB verifier. Even with minimal user diligence, this environment will offer a very high level of security.

Trusted Path to Security-Sensitive Code.

To achieve very strong security properties for execution on commodity operating systems, the present invention may include a system for executing security-sensitive code modules within applications with very strong protections. For example, TrustVisor provides a safe execution environment for security-sensitive code modules without trusting the OS or the application that invokes the code module. TrustVisor will protect security-sensitive code and data on untrusted commodity platforms from malware, e.g., kernel-level rootkits. More specifically, TrustVisor protects the integrity and execution of security-sensitive code, and confidentiality and integrity of the data used by that code; as well as attest these properties to remote entities.

This system enables many applications, but is particularly well suited when the security-sensitive code is small and self-contained. For example, a webserver serving SSL/TLS-based connections needs to protect its private signature key. If the OS or application is compromised, the attacker can steal the private key and impersonate the web server. In our system, the code accessing the private key can be confined to a self-contained code module protected by a secure hypervisor, and the http server code can call that code module for setting up SSL/TLS connection state. In this setting, even if the OS or http server are compromised, the secrecy of the private key is guaranteed, as well as the integrity of the code that is allowed to access it.

The present invention may include an execution environment that will make it easy to encapsulate sensitive code within an application into a security-sensitive code module protected by TrustVisor. OEMs will be able to achieve very strong execution guarantees as well as secrecy and integrity for data within these security-sensitive code modules.

The present invention can also include or be embodied as computer-readable instructions such as software, firmware, hardware, and other embodiments which, when executed by a processor, causes the processor to perform certain actions according to the present invention. In one embodiment, the present invention includes an apparatus including a processor, memory, an input device, and an output device, and the memory includes computer-readable instructions which, when executed, cause the processor to perform the methods described herein.

Many other variations are possible with the present invention, and those and other teachings, variations, and advantages of the present invention will become apparent from the description and figures of the invention.

BRIEF DESCRIPTION OF THE SEVERAL VIEWS OF THE DRAWING

Embodiments of the present invention will now be described, by way of example only, with reference to the accompanying drawings for the purpose of illustrating the embodiments, and not for purposes of limiting the invention.

FIG. 9 illustrates one embodiment of how the processor interacts with the verification device to control the operation of the select guests and the legacy guests.

FIG. 22 illustrates one embodiment of an attestation protocol by which a remote party (which may be a local verification device) verifies that a particular attestation represents a legitimate run of a SSCB.

DETAILED DESCRIPTION OF THE INVENTION

Figure 1:
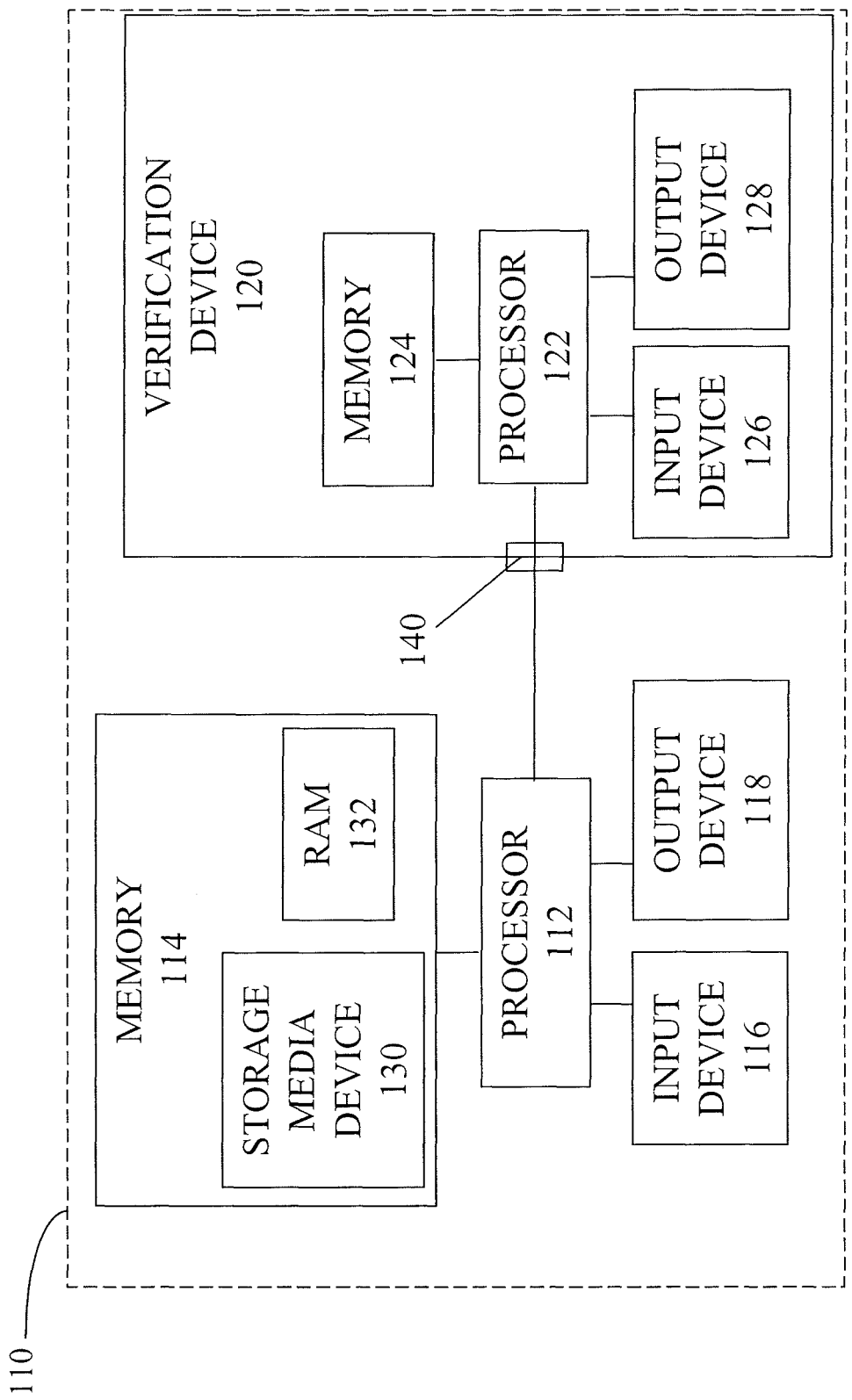
FIG. 1 illustrates one embodiment of a computer according to the present invention.

FIG. 1 illustrates one embodiment of a computer 110 according to the present invention. In that embodiment, the computer 110 includes a processor 112, memory 114, an input device 116, an output or display device 118, and a verification device 120. The processor 112 is connected to the memory 114, the input device 116, and the output device 118. The memory 114 includes computer readable instructions, such as computer hardware, software, firmware, or other forms of computer-readable instructions which, when executed by the processor 112, cause the processor 112 to perform certain functions, as described herein. The computer 110 may also include one or more other devices not shown herein. Although this embodiment is illustrated with the verification device 120 as part of the computer 110, the verification device 120 may be separate from the computer 110.

The processor 112 receives input from the input device 116, provides signals to control the output device 118, and provides and receives other signals such as, for example, signals to and from the verification device 120. The processor 112 also performs certain functions, as described herein.

The memory 114 can be any form of computer-readable memory, and may store information in magnetic form, optical form, electrical form, or other forms. The memory 114 includes computer-readable instructions which, when executed by the processor 112, cause the processor 112 to perform certain functions, as described herein.

The memory 114 may have many variations. For example, the memory 114 may be separate from the processor 112 or the memory 114 may be integrated with the processor 112. The memory 114 may also include one memory device or the memory 114 may include more than one memory device. For example, the memory 114 may include one or more memory devices of non-volatile memory and it may also include one or more memory devices of volatile memory. For example, the memory 114 may include a storage media device 130 for long term data storage, such as a magnetic disk drive, an optical drive, or flash memory. The memory 114 may also include RAM 132 or other memory devices for other functions. Other combinations and variations of memory 114 may also be used with the present invention.

The input device 116 may be a keyboard, a touchscreen, a computer mouse, or other forms of inputting information from a user. The input device 116 may also be used for inputting information from a source other than a human user, such as a data port for receiving input from another computer.

The output device 118 may be a video display or other forms of outputting information to a user. The output device 118 may also be lights, speakers, or other forms of output that can be used to convey information to, or to get the attention of, a user The output device 118 may also be used for outputting information to something other than a human user, such as a data port.

The verification device 120 includes a processor 122 and memory 124. The verification device 120 may also include an input device 126 and an output device 128. In some embodiments, the verification device 120 will be relatively small for reasons described herein. For example, keeping the verification device 120 small and simple can offer advantages for the security offered by the device 120. Also, if the verification device 120 is removable from the computer 110 and meant to be portable with a user, then a relatively small size is advantageous. However, a small size is not required and it is possible for the verification device 120 to be larger and to include other features and functions, particularly if the verification device 120 is integrated into the computer or if the verification device 120 is not meant to be portable with the user. In the case of a removable verification device 120, it may also include a communications interface 140 that is not permanently attached to the computer 110, such as a USB port, an infrared transmitter/receiver or other communications interfaces that allow the verification device 120 to be connected and disconnected by the user. In those embodiments, the computer 110 will also have a communications interface 140 that is complimentary to the communications interface 140 of the verification device 120.

The verification device 120 may be integrated with the other parts of the computer 110, or the verification device 120 may be removable and portable by a user. In one embodiment, the verification device 120 plugs into a port of the computer, such as a USB port or any other port that may be part of a computer and accessible by a user.

The verification device 120 includes information or policies about other parts of the computer 110. For example, the verification device 120 may include policies about the secure guest 312 (see FIG. 3) and the hypervisor 316 (see FIG. 3), as well as other information. The verification device may include a policy for each guest, or it may include policies that are shared by more than one guest. For example, the policies may include known good identity measurements for the select guest 312, the hypervisor 316, and other parts of the computer 110.

The policies may also include a list of trusted endpoints on a network 210 (see FIG. 2) for guests that have a network interface or which otherwise have access to a network 210. The verification device 120 may, for example, include a single list of trusted endpoints on the network 210, or it may include a list of trusted endpoints for each guest, or it may include multiple lists of trusted endpoints, some of which are unique to a particular guest and some of which are shared by more than one guest. Each policy may apply to a different guest or some policies may be shared by more than one guest.

The policies may also identify other guests with which a particular guest may share information or otherwise communicate. For example, there may be a policy for a select guest 312 identifying the other guests with which the select guest 312 may share information.

The verification device 120 may or may not permit policies or other information to be added, deleted, or modified. For example, in one embodiment the verification device 120 allows updates to be made to trusted endpoints on a network 210. In another embodiment, the verification device 120 is read-only in order to reduce the risk of the verification device 120 being compromised.

The processor 122 in the verification device 120 performs certain functions, as described herein. The processor 122 in the verification device 120 is connected to and communicates with the processor 112.

The memory 124 in the verification device can be any form of computer-readable memory, and may store information in magnetic form, optical form, electrical form, or other forms. The memory 124 may have many variations, such as those described above with regard to memory 114. For example, the memory 124 in the verification device may be separate from the processor 122 in the verification device, or the memory 124 in the verification device may be integrated with the processor 122 in the verification device. The memory 124 in the verification device may also include more than one memory device, which may be integrated with the processor 122 in the verification device, separate from the processor 122 in the verification device, or both. Other variations are also possible.

The memory 124 includes computer readable instructions which, when executed by the processor 122 in the verification device, cause the processor 122 in the verification device to perform certain functions, as described herein.

The input device 126 and the output device 128 may be the same or different than the input 116 and output 118 devices of the computer 110. For example, the verification device 120 may be a relatively small device and, as a result, the input 126 and output 128 devices may be correspondingly small and simplified. For example, rather than a keyboard or a computer mouse, the input device 126 may include one or more buttons or switches for input from a user, such as an analog switch or a multi-position knob. Similarly, rather than a full video display, the output device 128 may include one or more lights, buzzer or other device to provide feedback to the user. Alternatively, the verification device 120 may also have larger and/or more complex input 126 and output 128 devices. In one embodiment, the verification device 120 may include "soft keys" and an electronic display, such as may be used with a PDA or smart phone. In other embodiments, the verification device 120 may include a combination of soft keys and physical buttons or switches. Other variations are also possible.

Many variations are possible with the computer 110 according to the present invention. For example, more than one processor 112, memory 114, input device 116, output device 118, and verification device 120 (as well more than one of each component in the verification device 120), may be present in or with the computer 110. In addition, devices not shown in FIG. 1 may also be included in the computer 110, and devices shown in FIG. 1 may be combined or integrated together into a single device, or in some cases omitted. Similar variations and modifications are also possible with other embodiments described and illustrated herein.

The present invention may be embodied in many forms. For example, the present invention may be an embedded system such as software on a chip. In another embodiment, the present invention may be embodied as one or more devices located in one or more parts of the invention illustrated in FIG. 1. For example, the present invention may be embodied as computer-readable instructions (e.g, software on a chip, software in a portable or integrated memory device, hard-wired instructions embodied in a hardware device, or other variations). In another embodiment, the present invention may be embodied as one or more discrete computers. The present invention may also be embodied as computer-readable instructions (e.g., computer software, firmware, or hardware). The computer-readable instructions may be stored in memory devices which may be integrated or embedded into another device, or which may be removable and portable. Other variations and embodiments are also possible.

Figure 2:
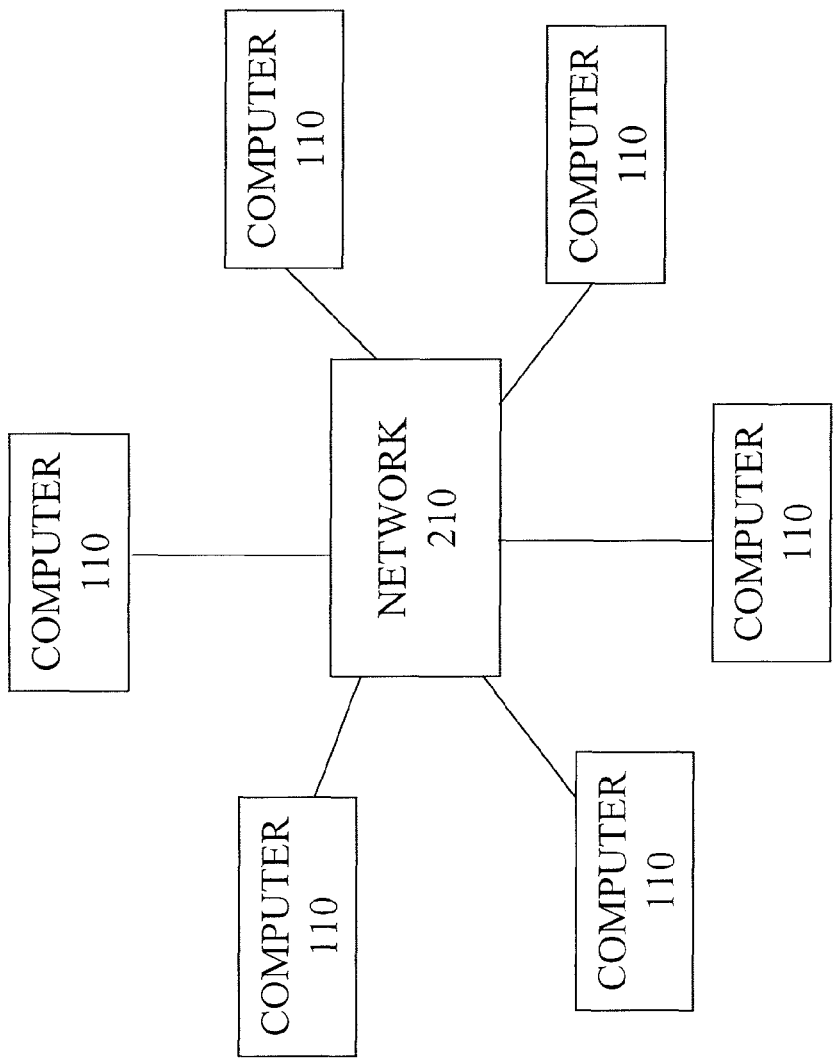
FIG. 2 illustrates another embodiment of the present invention in which several computers are connected together via a network.

FIG. 2 illustrates another embodiment of the present invention in which several computers 110 are connected together via a network 210. The network 210 provides a connection between the several computers 110. The computers 110 may be referred to as "endpoints" on the network 210. In other words, from the perspective of one of the computers 110 on the network 210, the other computers 110 are endpoints on the network 210 with which a network connection can be made.

The network 210 may be, for example, the Internet, a local area network, a wide area network, a metro area network, or other types of networks. The network 210 may be a wired network (such as an electrical network or an optical network), a wireless network, or a combination of different kinds of networks.

As described above, the present invention may be embodied as software, hardware, firmware, or in other forms. The present invention may, for example, be embodied in some or in all of the computers 110 in the network 210. For example, only one computer 110 may include a verification device 120, while the other computers 110 on the network 210 may operate without verification devices 120. In other embodiments, several or all of the computers 110 may include verification devices 120. In other embodiments, the network 210 itself may include one or more parts embodying the present invention, including verification devices 120.

Figure 3A:
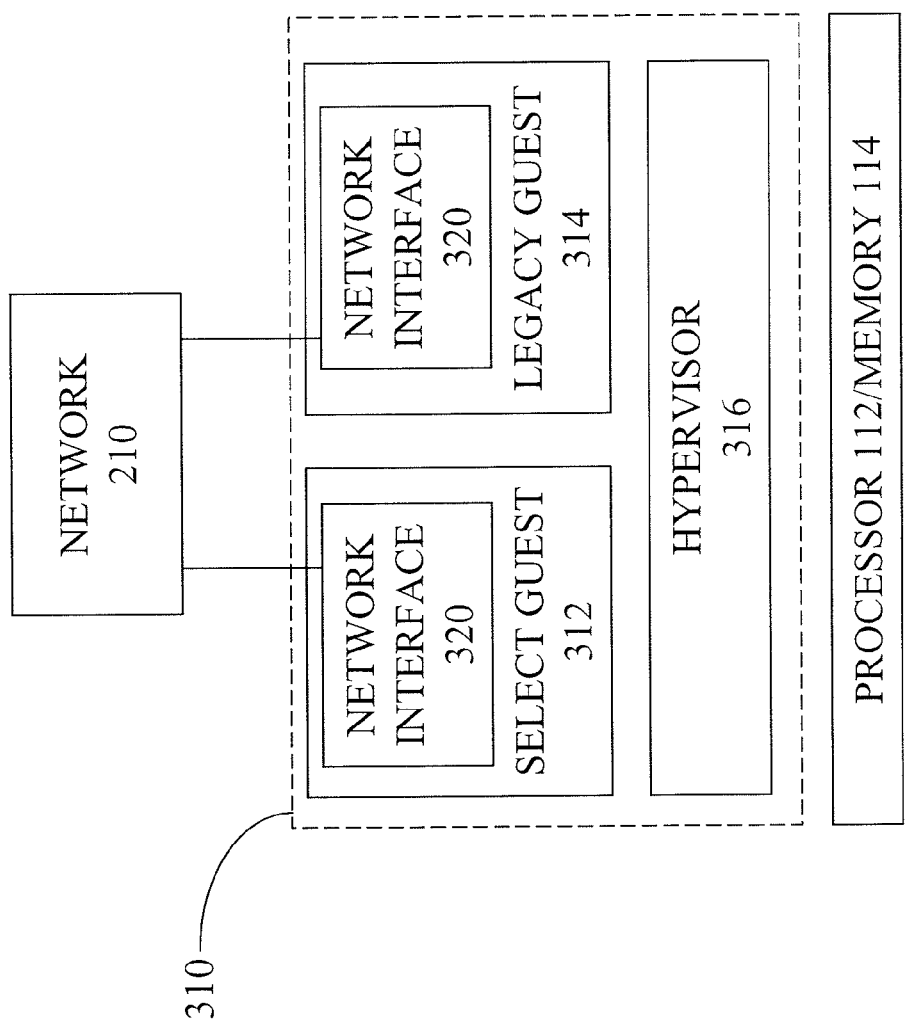
FIG. 3 illustrates one embodiment of a computing platform that may be created and used with the present invention.

FIG. 3A illustrates one embodiment of a computing platform 310 that may be created and used with the present invention. The computing platform 310 may be created, for example, when the computer-readable instructions in the memory 114 of the computer 110, when executed by the processor 112, cause the processor 112 to create the computing platform 310.

In the illustrated embodiment, the computing platform 310 includes a select guest 312, a legacy guest 314, and a hypervisor 316. The computing platform 310 may also include one or more network interfaces 320. The select guest 312, the legacy guest 314, and the hypervisor 316 may each have one or more characteristics, such as a privilege level, an identity, and other characteristics.

In one embodiment, the hypervisor 316 has a privilege level that is more privileged than that of both the select guest 312 and the legacy guest 314, and the hypervisor 316 supports both the select guest 312 and the legacy guest 314.

The select guest 312 is a guest which is meant to be kept secure from certain other parts of the computer 110. For example, the select guest 312 may be an application which is used for secure financial transactions, or for exchanging personal and sensitive information with a healthcare provider, or information or an application for use, review, or processing by the user in a secure environment.

The legacy guest 314, in contrast, is a guest which is not assumed to be secure or free from undesirable conditions such as infection by malware.

The hypervisor 316 has access to both the select guest 312 and the legacy guest 314 and controls information and access available to the select 312 and legacy 314 guest. The hypervisor 316 can also perform other tasks such as, for example, partitioning memory 114. In one embodiment, the hypervisor 316 partitions a unique portion of the memory 114 for the exclusive use of the select guest 312, partitions a unique portion of the memory 114 for the exclusive use of the legacy guest 314, and partitions a unique portion of the memory 114 for the exclusive use of the hypervisor 316. Many other embodiments are also possible, such as partitioning memory 114 for more than one select guest 312, more than one legacy guest 314, and more than one hypervisor 316. The unique portions of memory 114 may be different parts of the same memory device or it may be parts of different memory devices, or combinations thereof. Furthermore, the hypervisor 316 may also partition memory for shared use by those devices, and the hypervisor 316 may partition memory for exclusive or shared use by other parts of the computer 110.

The network interfaces 320 are shown in both the select guest 312 and the legacy guest 314 and provide a connection to the network 210. In other embodiments, less than all of the guests may include a network interface 320. In some embodiments, neither guest has a network interface 320. In some embodiments, the physical network interface 320 for one or more of the guests may be located in the verification device 120. This is advantageous because it allows the hypervisor 316 to control access between the guests and the network interface 320. In other embodiments, the network interface for one or more of the guests may be located outside of the verification device 120, such as in another part of the computer. As in the case of the network interface 320 being located in the verification device 120, this embodiment may also allow the hypervisor 316 to control access between the guests and the network interface 320.

The computing platform 310 may take many forms. For example, the computing platform 310 may include one or more select guests 312, one or more legacy guests 314, and one or more hypervisors 316. Furthermore, the computing platform 310 may include other features not illustrated herein.

Figure 3B:
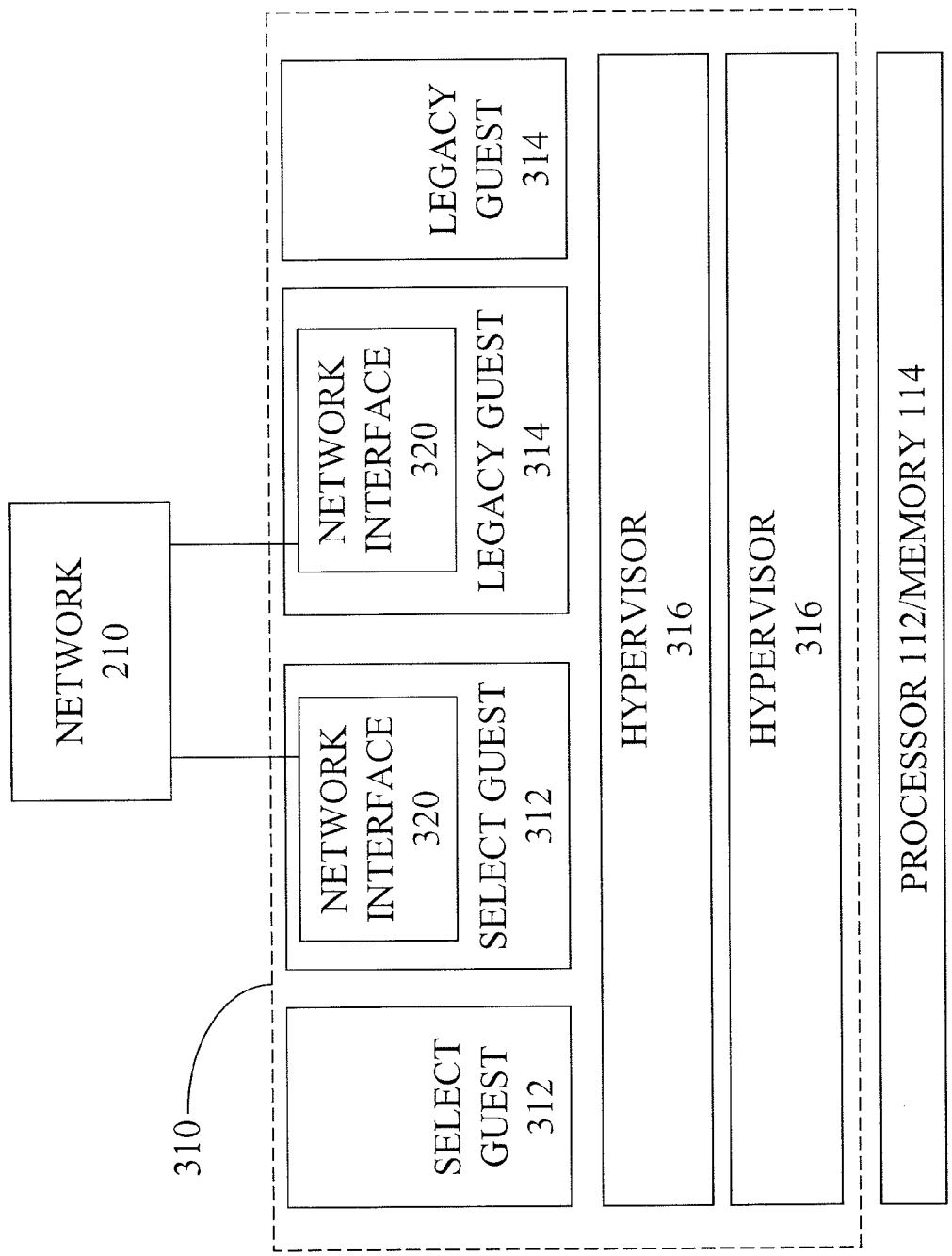

FIG. 3B illustrates another embodiment of the computing platform 310 in which there is more than one select guest 312, more than one legacy guest 314, and more than one hypervisor 316. Many variations are possible with the present invention, including numbers and combinations of select guests 312, legacy guests 314, hypervisors 316, and network interfaces 320 other than those illustrated herein. For example, the present invention may be used with two select guests 312, three legacy guests 314, one hypervisor 316, and a network interface in every guest, as well as other combinations.

The properties and characteristics of the select guest 312, legacy guest 314, hypervisors 316, and network interfaces 320 may be as described above. For example, each select guest 312 can have a privilege level, an identity, and other information, which may be the same for each select guest 312 or it may be different. The same is true for the legacy guests 314, hypervisors 316, and network interfaces 320.

In one embodiment, the hypervisor 316 supports the select guest 312 and the legacy guests 314, and both of the hypervisors 316 have a privilege level that is more privileged that the privilege level of the select guests. 312 and legacy guests 314. Also, the hypervisors 316 may partition unique of shared portions of the memory 114 for the exclusive or shared use of the select 312 and legacy 314 guests. The verification device 120 may include a policy for each of the select 312 and legacy 314 guests.

Figure 3C:
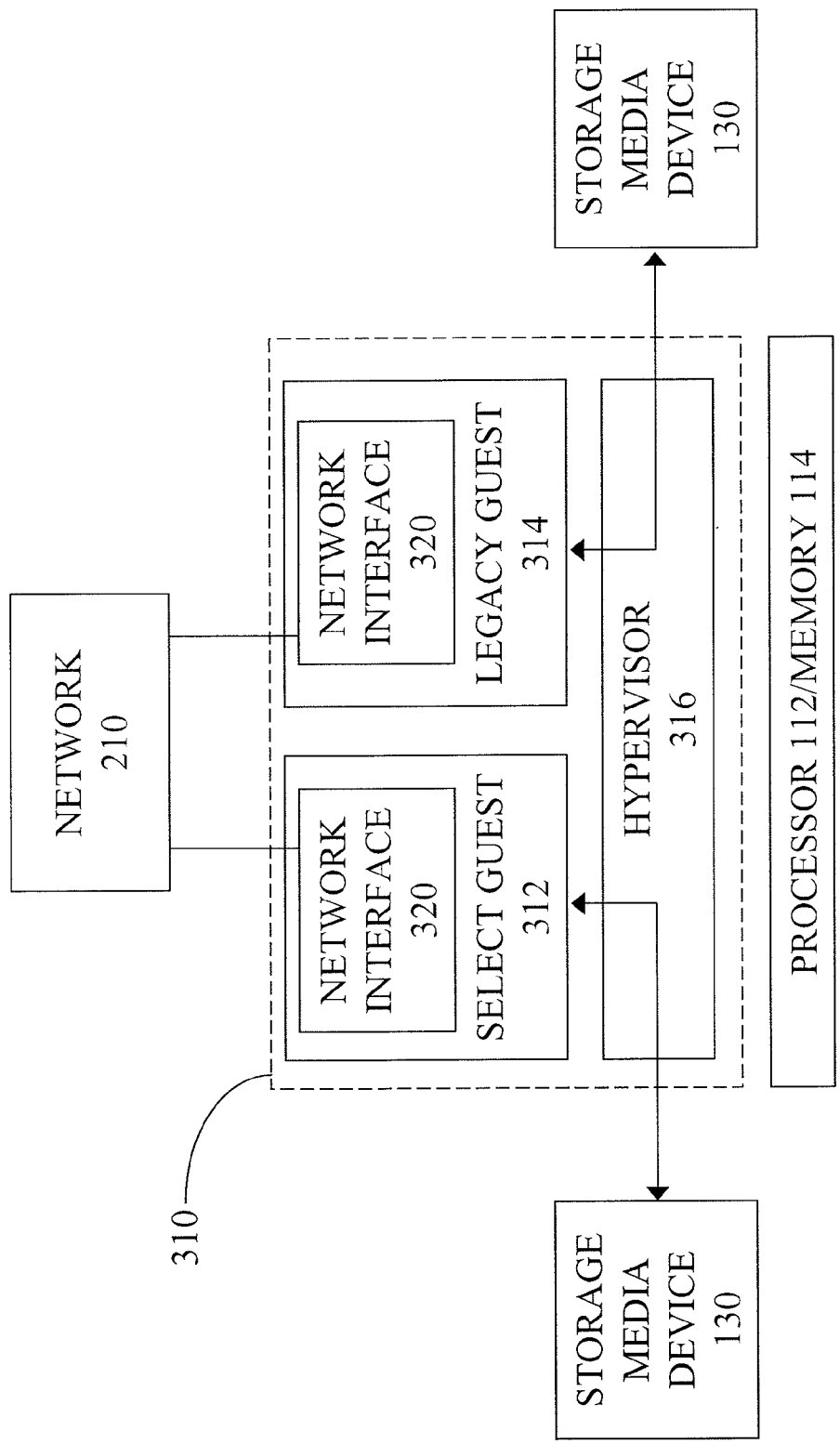

FIG. 3C illustrates another embodiment of a computing platform 310 that may be created and used with the present invention. The computing platform 310 controls access between the select 312 and legacy 314 guests and one or more devices. In the illustrated embodiment there are two devices and they are storage media devices 130, although more or fewer than two devices may be used with the present invention, and devices other than storage media devices may be used with the present invention.

In the illustrated embodiment there are two allocated devices and those devices are storage media devices 130, although other devices may also be shared. The hypervisor 316 allocates the two devices 130 for exclusive use by the select 312 and legacy 314 guests, respectively.

The present invention may be used with two separate physical devices 130 allocated to the select 312 and legacy 314 guests, respectively. Alternatively, the present invention may also be used where a single device 130 has two parts that are allocated to the select 312 and legacy 314 guests, respectively. For example, the hypervisor 316 may partition different parts of a single data storage media device 130 to provide a unique portion of memory for the exclusive use of the select guest 312 and a unique portion of memory for the exclusive use of the legacy guest 314

The hypervisor 316 may also control access between the select 312 and legacy 314 guests and the one or more storage media devices 130. For example, the hypervisor 316 may detect when one of the guests 312, 314 sends instructions (e.g., write instructions or read instructions) to the storage media device(s) 130. When the hypervisor 316 detects that instructions are coming from the select guest 312, the hypervisor 316 sends the instructions to the allocated device or partition for the select guest 312 and, if applicable, sends the data from the storage media device 130 to the select guest 312. Similarly, when the hypervisor 316 detects that instructions are coming from the legacy guest 312, the hypervisor 316 sends the instructions to the allocated device or partition for the legacy guest 314 and, if applicable, sends the data from the storage media device 130 to the legacy guest 314.

The present invention may also include one or more base devices which are used by both the select 312 and legacy 314 guests. In that embodiment, the hypervisor partitions the same base device for use by both the select 312 and legacy 314 guests.

Figure 3D:
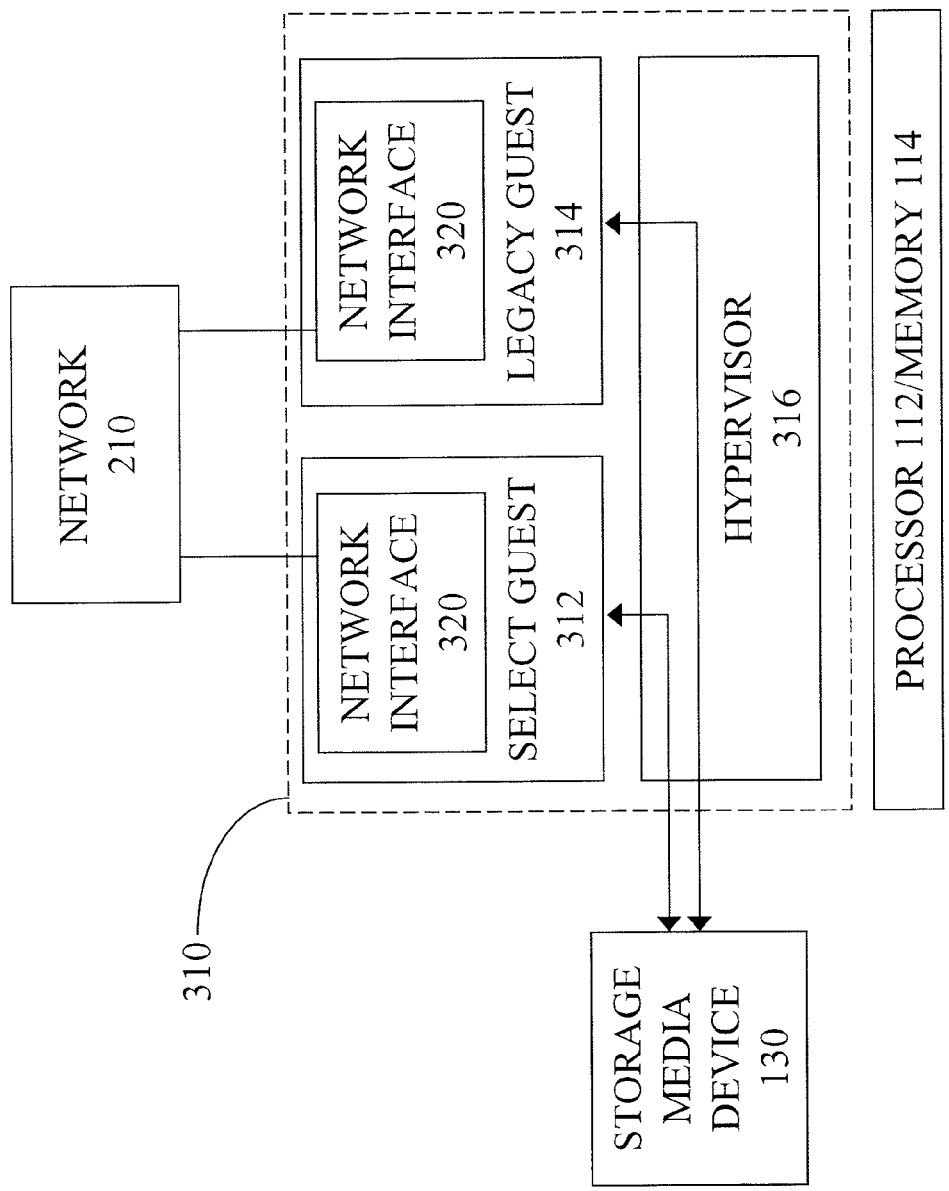

FIG. 3D illustrates another embodiment of a computing platform 310 that may be created and used with the present invention. The computing platform 310 controls access between the select 312 and legacy 314 guests and a shared device. In the illustrated embodiment the device is a storage media device 130, although other devices may also be used with the present invention.

The present invention may be used to allow the select guest 312 to store encrypted data on the shared storage media device 130 and to protect that data from unauthorized access. This will be described in more detail hereinbelow with reference to FIG. 14.

Figure 4:
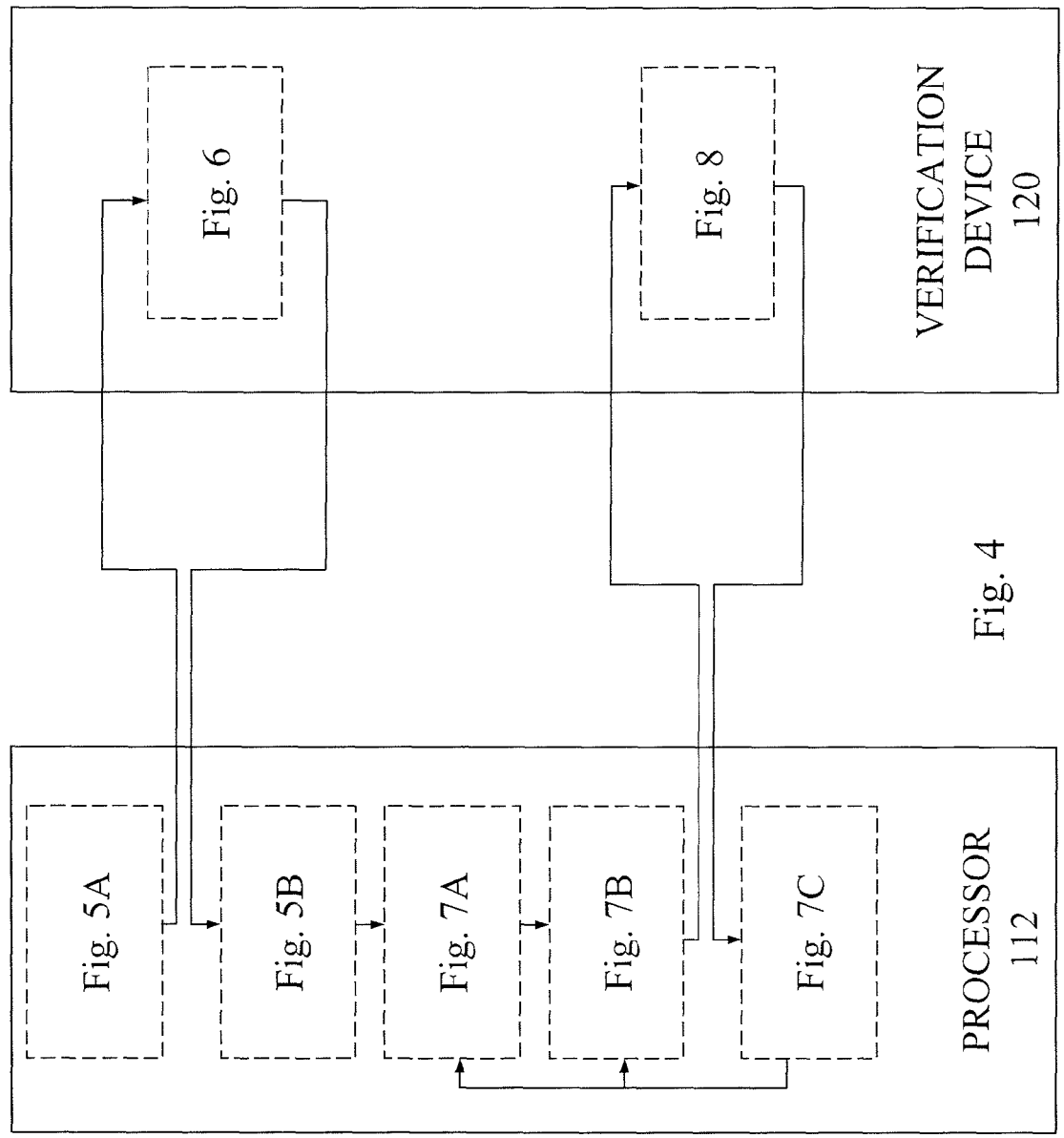
FIG. 4 illustrates one embodiment of how the processor interacts with the verification device.

FIG. 4 illustrates one embodiment of how the processor 112 interacts with the verification device 120 to control the operation of the select guests 312 and the legacy guests 314. In the illustrated embodiment, the process represents a situation in which there is first a request to execute the select guest 312, followed by a request to execute the legacy guest 314, followed by a request to execute the select guest again.

Figure 5A:
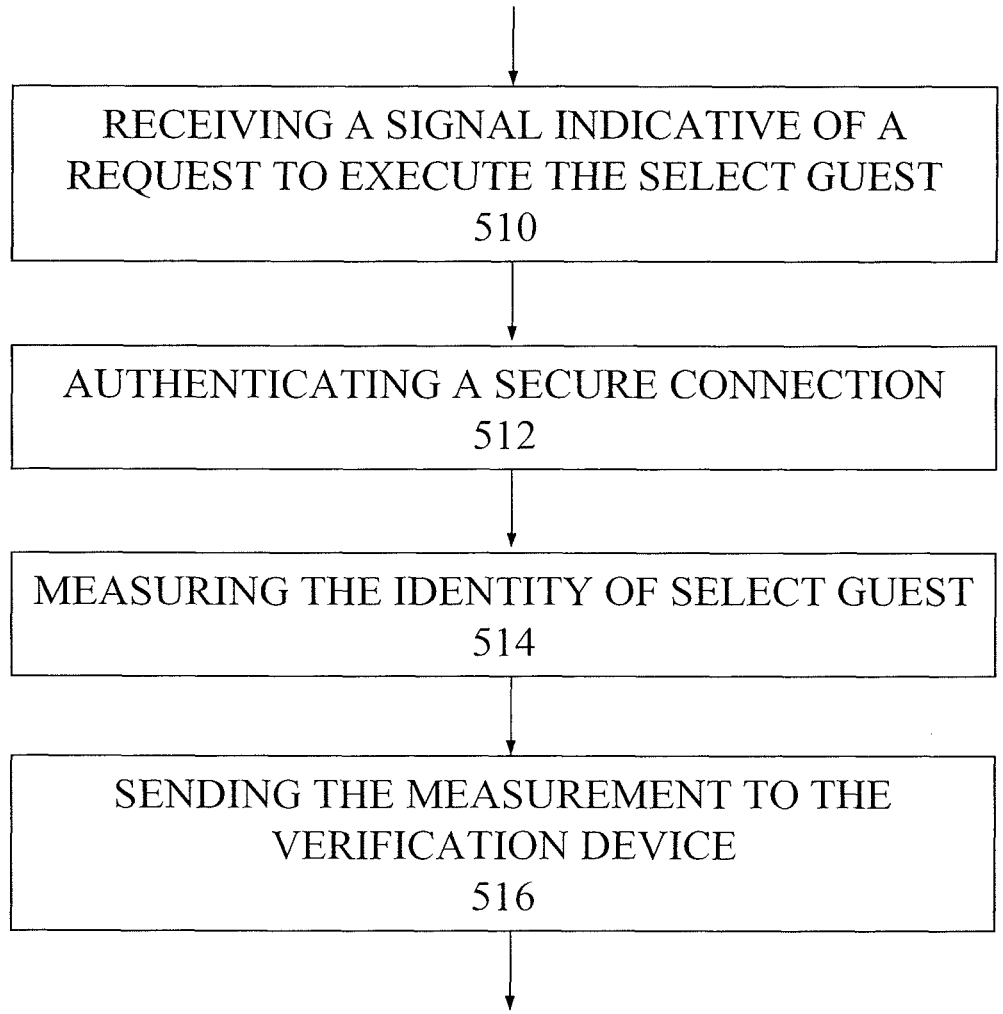
FIGS. 5A and 5B illustrate one embodiment of a process according to the present invention that is performed by the processor for execution of the secure guest.
Figure 5B:
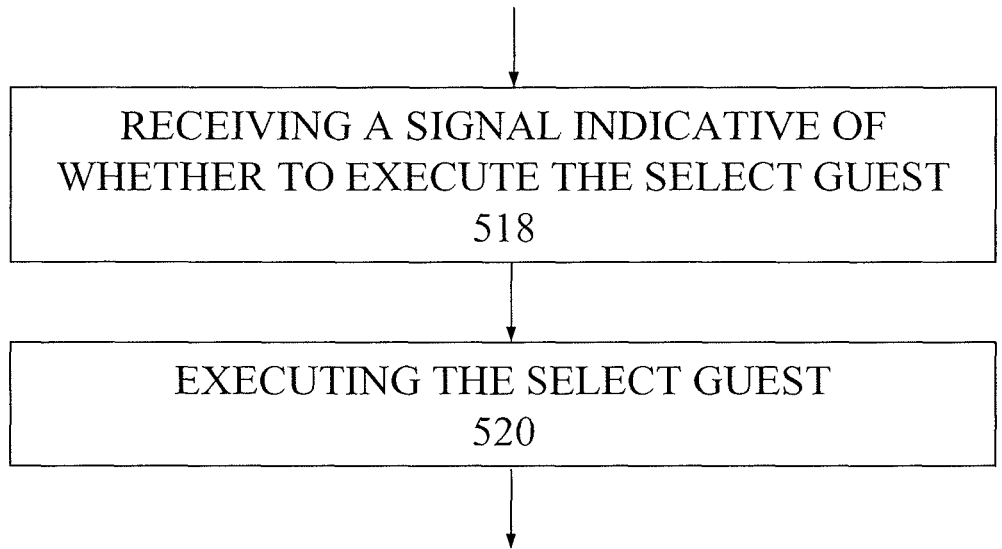

FIGS. 5A and 5B illustrate one embodiment of a process according to the present invention that is performed by the processor 112.

FIG. 5A illustrates one embodiment of a process according to the present invention that is performed by the processor 112 after the processor 112 receives a signal indicating a request to execute the select guest 312. A request to execute the select guest 312 may be received immediately after creating the computing platform 310, or the request may be received at a later time after the processor 112 has perform other tasks, such as executing one or more legacy guests 314. After receiving the request, the processor 112 sends certain information related to the select guest 312 to the verification device 120.

Figure 6:
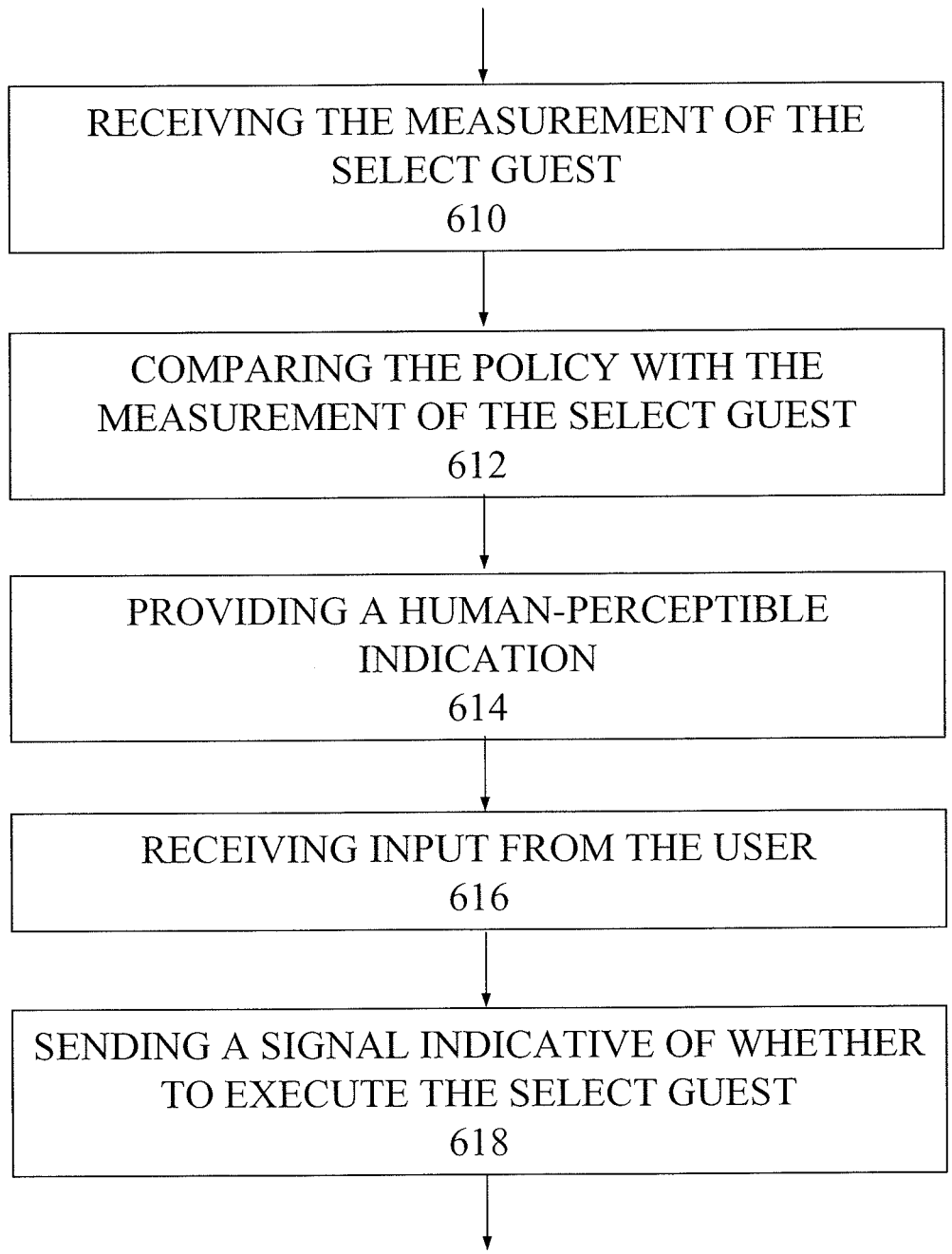
FIG. 6 illustrates one embodiment of a process according to the present invention that is performed by the verification device after receiving information related to the select guest from the processor.

FIG. 6 illustrates one embodiment of a process according to the present invention that is performed by the verification device 120 after receiving information related to the select guest 312 from the processor 112. The verification device 120 determines whether the select guest 312 should be executed and sends a signal back to the processor 112.

FIG. 5B illustrates one embodiment of a process according to the present invention that is performed by the processor 112 after receiving the signal from the verification device 120.

Figure 7A:
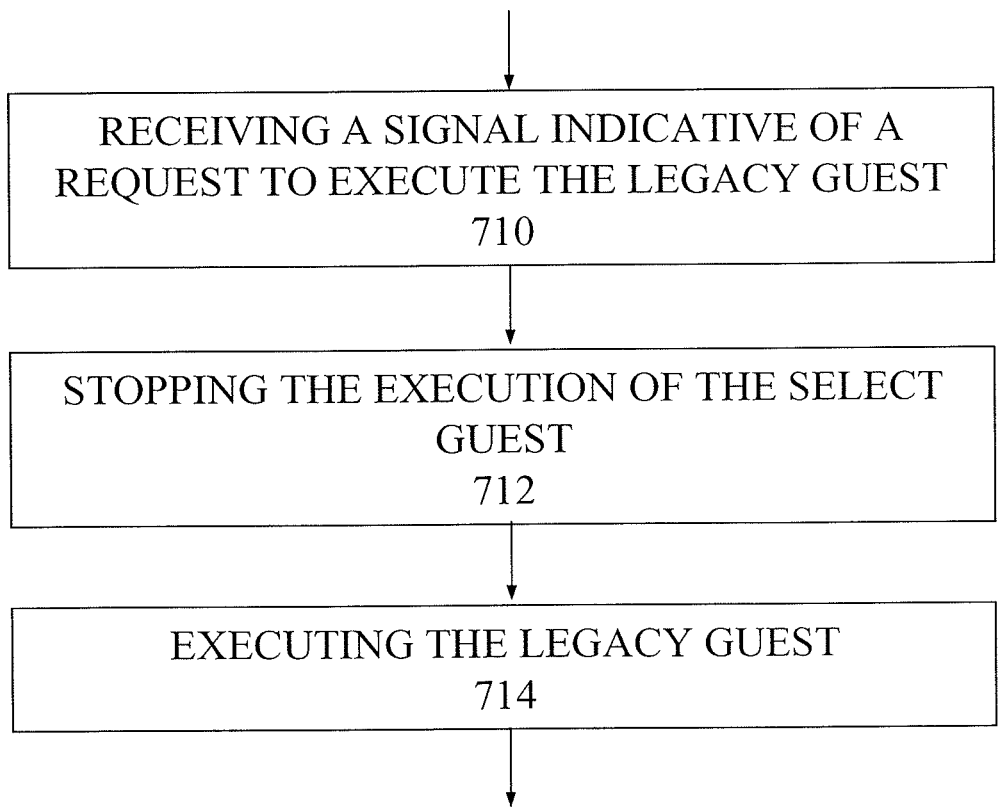
FIGS. 7A, 7B, and 7C illustrate one embodiment of a method performed by the processor after the execution of the select guest.

FIG. 7A illustrates one embodiment of a process according to the present invention that is performed by the processor 112 when the processor 112 receives a request to execute the legacy guest 314 when the select guest 312 is executing.

Figure 7B:
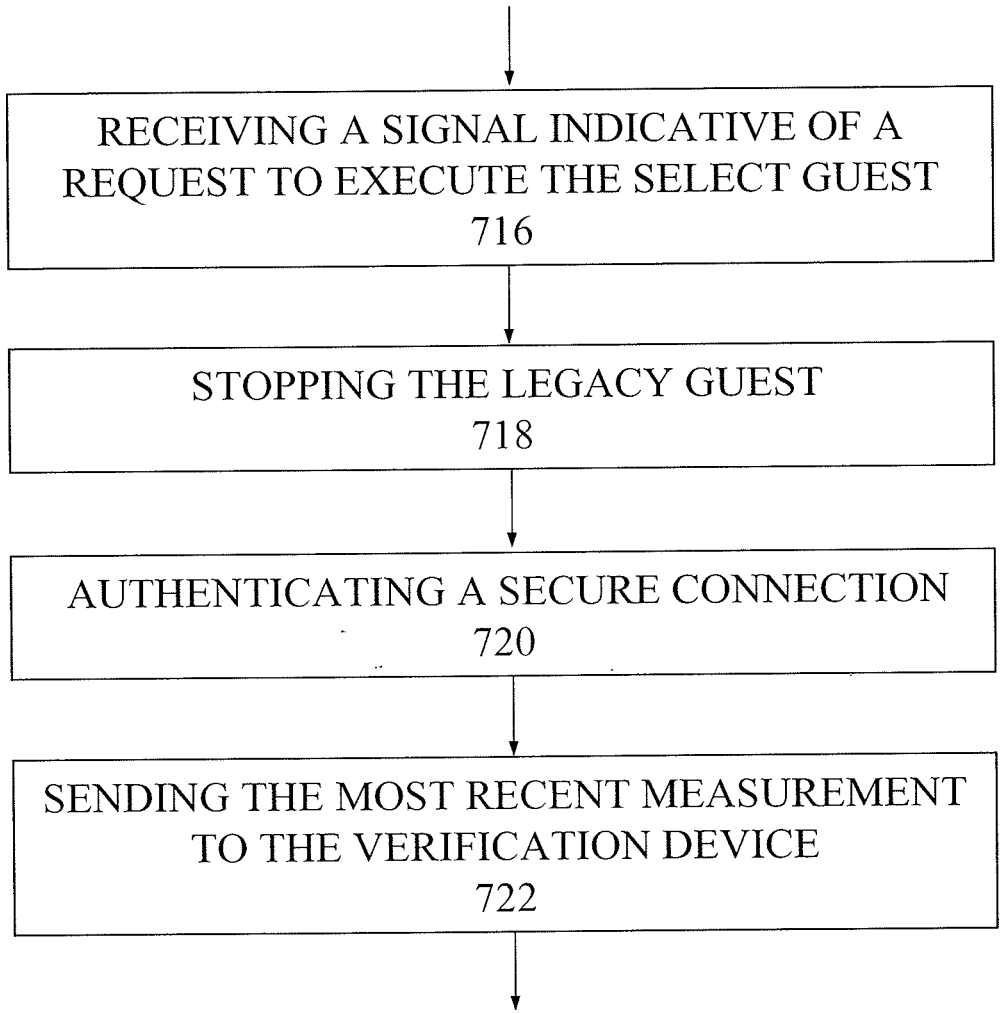

FIG. 7B illustrates one embodiment of a process according to the present invention that is performed by the processor 112 when the processor 112 receives a request to execute the select guest 312 when the legacy guest 314 is executing. As in FIG. 5A, the processor 112 sends certain information related to the select guest 312 to the verification device.

Figure 8:
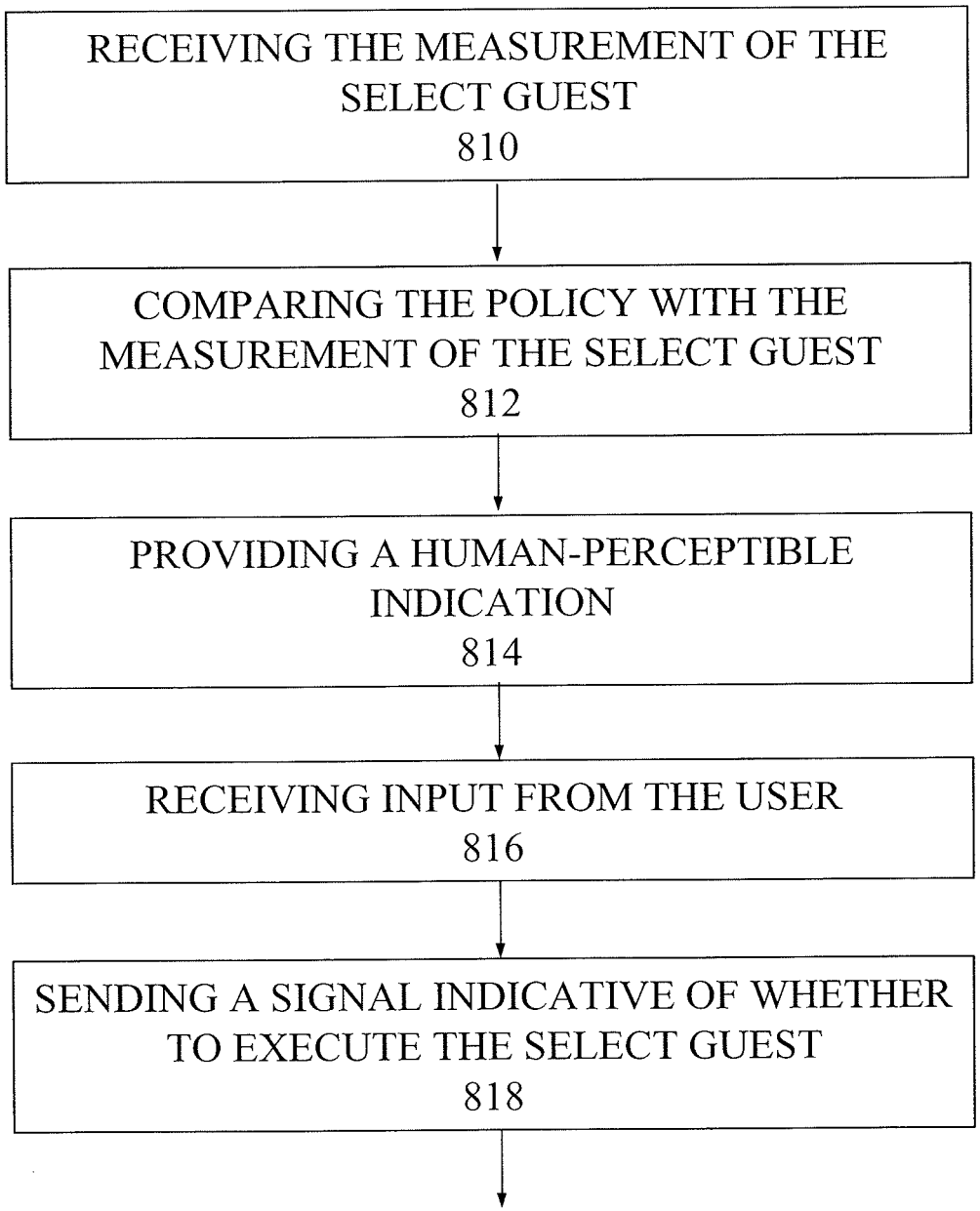
FIG. 8 illustrates one embodiment of a process according to the present invention that is performed by the verification device after receiving information related to the select guest from the processor.

FIG. 8 illustrates one embodiment of a process according to the present invention that is performed by the verification device 120 after receiving information related to the select guest 312 from the processor 112. The verification device 120 determines whether the select guest 312 should be executed and sends a signal back to the processor 112.

Figure 7C:
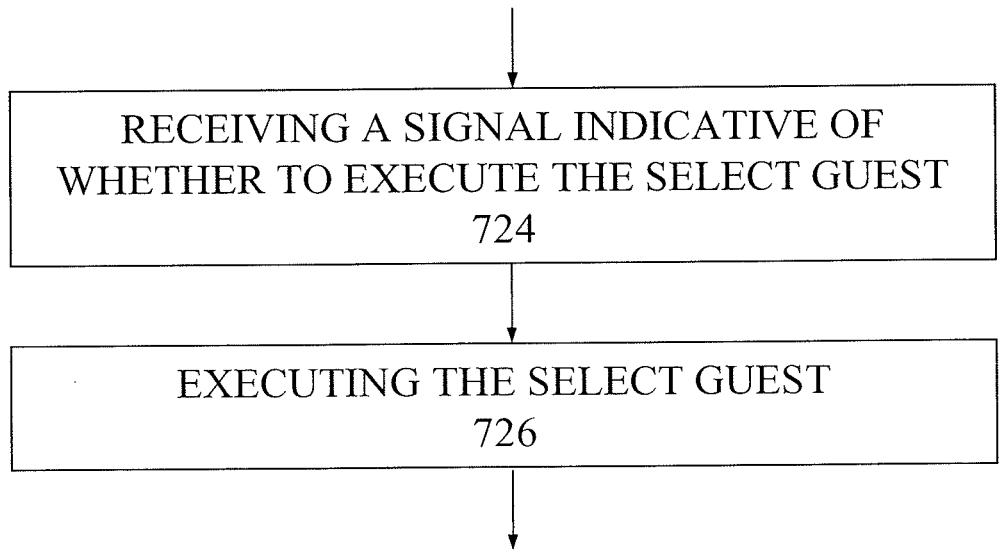

FIG. 7C illustrates one embodiment of a process according to the present invention that is performed by the processor 112 after receiving the signal from the verification device 120.

The process may continue by proceeding to either the process of FIG. 7A or the process of FIG. 7B, depending on whether the next request is one to execute the legacy guest 314 or the select guest 312.

Each of FIGS. 5-8 will now be described in more detail.

FIGS. 5A and 5B illustrate one embodiment of another method performed by the processor 112. The method may be performed after the computing platform 310 is created and when a user wants to execute the select guest 312. The method may be performed, for example, when the computer-readable instructions in the memory 114 of the processor 112, when executed by the processor 112, cause the processor 112 to perform the following steps.

Step 510 includes receiving a signal indicative of a request to execute the select guest 312. The signal may be initiated by a guest in the computing platform 310, or it may be initiated by a human user, or it may be initiated by some other part of the computer 110 or by another computer.

Step 512 includes authenticating a secure connection between the hypervisor 316 and the verification device 120. This step is performed after receiving the signal indicative of the request to execute the select guest 312.

Step 514 includes measuring the identity of at least a portion of the select guest 312. This step may measure the identity of the entire select guest 312 or it may measure the identity of less than all of the select guest 312. This measurement is made when the select guest is in a known state, such as before the select guest 312 executes any instructions. This measurement of the select guest 312 can be used to determine if the select guest is in a proper state or if it has been modified or otherwise compromised. For example, if malware has infected the select guest 46, the measurement of the identity of the select guest 46 will be different than the measurement of the uninfected select guest 46. The hypervisor 316 may measure all guests (e.g., select guests 312 and legacy guests 314) prior to any of the guests being executed. In this way, the hypervisor 316 has an identity measurement for all of the guests. Alternatively, the hypervisor 316 may measure identities of guests at other times, such as immediately before each guest is executed, or at other times.

Step 516 includes sending the measurement of the identity of the select guest 312 to the verification device 46 wherein it will be compared with a policy stored in the verification device 120. Alternatively, this comparison can be performed by the processor 112, although the verification device 120 may be more secure than the processor 112 and, therefore, the use of the verification device 120 may be preferred.

The steps performed by the verification device 120 after receiving the measurement of the identity of the select guest 312 are described below with reference to FIG. 6.

Step 518 includes receiving a signal from the verification device 120 indicative of whether to execute the select guest 312.

Step 520 includes executing the select guest 312 if the signal from the verification device 120 indicates that the select guest 312 should be executed.

If, however, the signal from the verification device 120 indicates that the select guest 312 should not be executed, then step 520 may not be executed. For example, the computer 110 may include a default in which the select guest 312 is never executed in these circumstances. Alternatively, the computer 110 may include an override such as, for example, if the user provides additional input to execute the select guest even after the user receives a signal indicating that the measurement of the select guest 312 received by the verification device 120 does not corresponds with the policy stored in the verification device 120. This input from the user may be provided, for example, through an input on the verification device 120 as described below with regard to FIG. 6.

Steps 512, 514, and 516 are performed after step 510, receiving the signal indicative of the request to execute the select guest 312. A recent measurement of the select guest 312 is desirable in order to avoid a situation in which the select guest 312 is compromised after measurement and before execution. These steps are also performed without rebooting the computer 110. This is important because rebooting the computer 110 is time consuming and it is desirable to reduce the time that the user is required to wait. However, the present invention can be used in different embodiments, such as where the computer 110 is rebooted.

FIG. 6 illustrates one embodiment of a method performed by the processor 122 of the verification device 120. The method may be performed between steps 516 and 518 of FIG. 5 to verify that the select guest 312 is still secure and not compromised. The method may be performed, for example, when the computer-readable instructions in the memory 124 of the verification device 120, when executed by the processor 122 in the verification device 120, cause the processor 122 in the verification device 120 to perform the following steps.

Step 610 includes receiving the measurement of the select guest 312 from the processor 112 in the computer 110. The measurement and the sending of the measurement are described above in FIG. 5.

Step 612 includes comparing the policy stored in the verification device 120 with the measurement of the select guest 312 received by the verification device 120. This step compares the measured value with the known value stored as a policy in the verification device 120 and determines whether the measurement of the select guest 312 received by the verification device 120 corresponds with the policy stored in the verification device 120.

Step 614 includes providing a human-perceptible indication of whether the measurement of the select guest 312 received by the verification device 120 corresponds with the policy stored in the verification device 120. This step may be omitted in some embodiments. In other embodiments including more than one select guests 312, this step may be or may also include providing a human-perceptible indication of which of a plurality of select guests 312 is selected for execution.

Step 616 includes receiving an input from a user indicative of confirmation to execute the selection guest 312. The human confirmation in this step may be confirmation to execute the select guest 312 after it is determined that the measurement of the select guest 312 received by the verification device 120 corresponds with the policy stored in the verification device 120. Alternatively, the human confirmation in this step may be confirmation to override a situation in which the measurement of the select guest 312 received by the verification device 120 does not correspond with the policy stored in the verification device 120, but in which the user still wants to execute the select guest 312 despite the potential problem with the select guest 312. This step may be omitted in some embodiments. For example, the present invention may not require input from the user in certain situations, such as when the policy stored in the verification device 120 corresponds with the measurement of the identity of the select guest 312 that was received by the verification device 120. In another embodiment, the present invention may provide a warning but not require user input before executing the select guest 312, even if the select guest 312 appears to be compromised.

Step 618 includes sending a signal to the processor 112 indicative of whether to execute the select guest 312. The signal to execute the select guest 312 may be based on whether the measurement of the select guest 312 received by the verification device 120 corresponds with the policy stored in the verification device 120. Alternatively, the signal to execute the select guest 312 may be based on the confirmation from the user in step 616.

Steps 610 and 612 are performed after step 510, receiving the signal indicative of the request to execute the select guest 312. A recent measurement of the select guest 312 is desirable in order to avoid a situation in which the select guest 312 is compromised after measurement and before execution. These steps are also performed without rebooting the computer 110. This is important because rebooting the computer 110 is time consuming and it is desirable to reduce the time that the user is required to wait. However, the present invention can be used in different embodiments, such as where the computer 110 is rebooted.

The order of the steps do not need to be exactly as illustrated herein. For example, although step 614 is illustrated as being performed before step 618, in other embodiments step 614 may be performed after step 618.

FIGS. 7A, 7B, and 7C illustrate one embodiment of a method performed by the processor 112 after the execution of the select guest 312. The method may be performed, for example, when the computer-readable instructions in the memory 114, when executed by the processor 112, cause the processor 112 to perform the following steps.

Step 710 includes receiving a signal indicative of a request to execute the legacy 314 when the select guest is already executing (i.e., after step 520). This signal may be initiated by a human user or by a non-human user. For example, this step may include receiving a signal initiated by one of the guests 312, 314 in the computing platform 310. The select guest 312 may request the execution of the legacy guest 314, or one legacy guest 314 may request the execution of another legacy guest 314. Alternatively, this step may include receiving an input at the verification device 120 from a human user indicative of a request to execute the legacy device 314. In that case, the input at the verification device 120 will be sent to the processor 112 for the operation of this step.

Step 712 includes stopping the execution of the select guest 312. The may be pausing the execution of the select guest 312 or terminating the execution of the select guest 312.

Step 714 includes executing the legacy guest 314 after stopping the select guest 312.

After the legacy guest 314 is executed, the computer 110 may receive another request to execute the select guest 312, which can involve resuming or restarting the execution of the select guest 312. In that case, the following steps may be performed, which are similar to steps 510 to 516 and, as a result, some details described with reference to FIG. 5 will not be repeated here.

Step 716 includes receiving a signal indicative of a request to execute the select guest 312. This can be a request to resume the execution of the select guest 312 if the select guest 312 was previously paused, or it can be a request to restart execution of the select guest 312 if the select guest was previously terminated. This signal may be initiated by a human user or a non-human. For example, the signal may be initiated by one of the guests 312, 314 in the computing platform 310. Alternatively, the request may be initiated by a human user, such as by providing input through the verification device 120 or though some other part of the computer 110.

Step 718 includes stopping the execution of the legacy guest 314. As described above, stopping may be pausing or terminating the execution of the legacy guest 314. Although this step is indicated as being performed in a particular part of the process, it may be performed at other parts of the process. However, in order to reduce the risk of the legacy guest 314 corrupting the select guest 312, the legacy guest 314 is preferable stopped before executing the select guest 312.

Step 720 includes authenticating a secure connection between the hypervisor 316 and the verification device 120.

Step 722 includes sending a measurement of the identity of the select guest 312 to the verification device 120. If the select guest 312 was previously paused, then this measurement may be the last or most recent measurement before the select guest 312 was executed. Alternatively, if the select guest 312 was terminated in step 712, then the select guest 312 may be measured again. In any event, the most recent measurement is usually used in order to utilize the most up to date information. However, it is possible to use the present invention with information that is not the most recent.

Step 724 includes receiving a signal from the verification device 120 indicative of whether to execute the select guest 312.

Step 726 includes executing the select guest 312 if the signal from the verification device 120 indicates that the select guest 312 should be executed. However, as described above, the present invention allows for variations and alternative embodiments.

FIG. 8 illustrates one embodiment of a method performed by the processor 122 in the verification device 120 between steps 722 and 724 in FIG. 7. These steps are analogous to the steps in FIG. 6 and, therefore, some details of these steps described with reference to FIG. 6 are not repeated here. The method may be performed, for example, when the computer-readable instructions in the memory 124, when executed by the processor 122, cause the processor 122 to perform the steps.

Step 810 includes receiving the measurement of the identity of the select guest 312 from the processor 112.

Step 812 includes comparing the policy stored in the verification device 120 with the measurement of the identity of the select guest 312 that was received by the verification device 120.

Step 814 includes providing a human-perceptible indication of whether the measurement of the select guest 312 received by the verification device 120 corresponds with the policy stored in the verification device 120. This step may be omitted in some embodiments.

Step 816 includes receiving an input from a user indicative of confirmation to execute or to resume execution of the select guest 312. This step may be omitted in some embodiments. For example, the present invention may not require input from the user in certain situations, such as when the policy stored in the verification device 120 corresponds with the measurement of the identity of the select guest 312 that was received by the verification device 120.

Step 818 includes sending a signal to the processor 112 indicative of whether to execute the select guest 312.

These steps may be performed without rebooting the computer 110, as described above. Some of the steps may be omitted and other steps may be performed along with those illustrated.

FIG. 9 illustrates one embodiment of how the processor 112 interacts with the verification device 120 to control the operation of the select guests 312 and the legacy guests 314. This figure illustrates a more generalize process flow that that illustrated in FIG. 4.

Figure 10A:
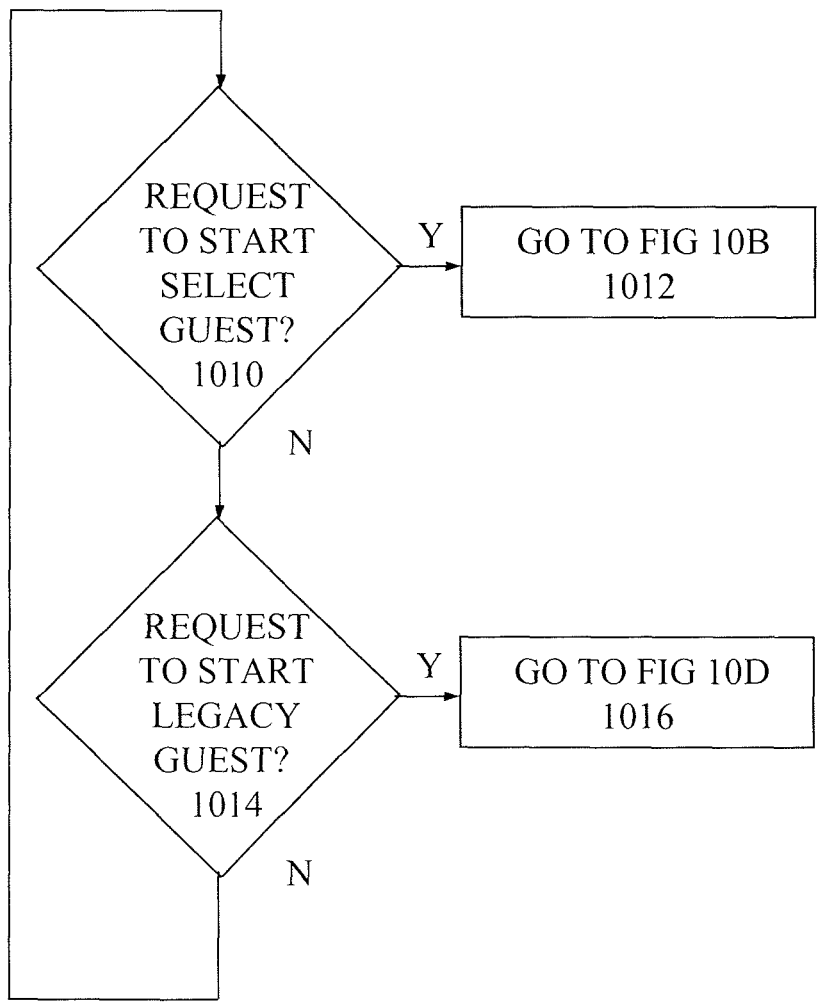
FIG. 10A illustrates a routing process that is used to determine whether the user wants to execute the select guest or the legacy guest.

FIG. 10A illustrates a routing process that is used to determine whether the user wants to execute the select guest 312 or the legacy guest 314.

Figure 10B:
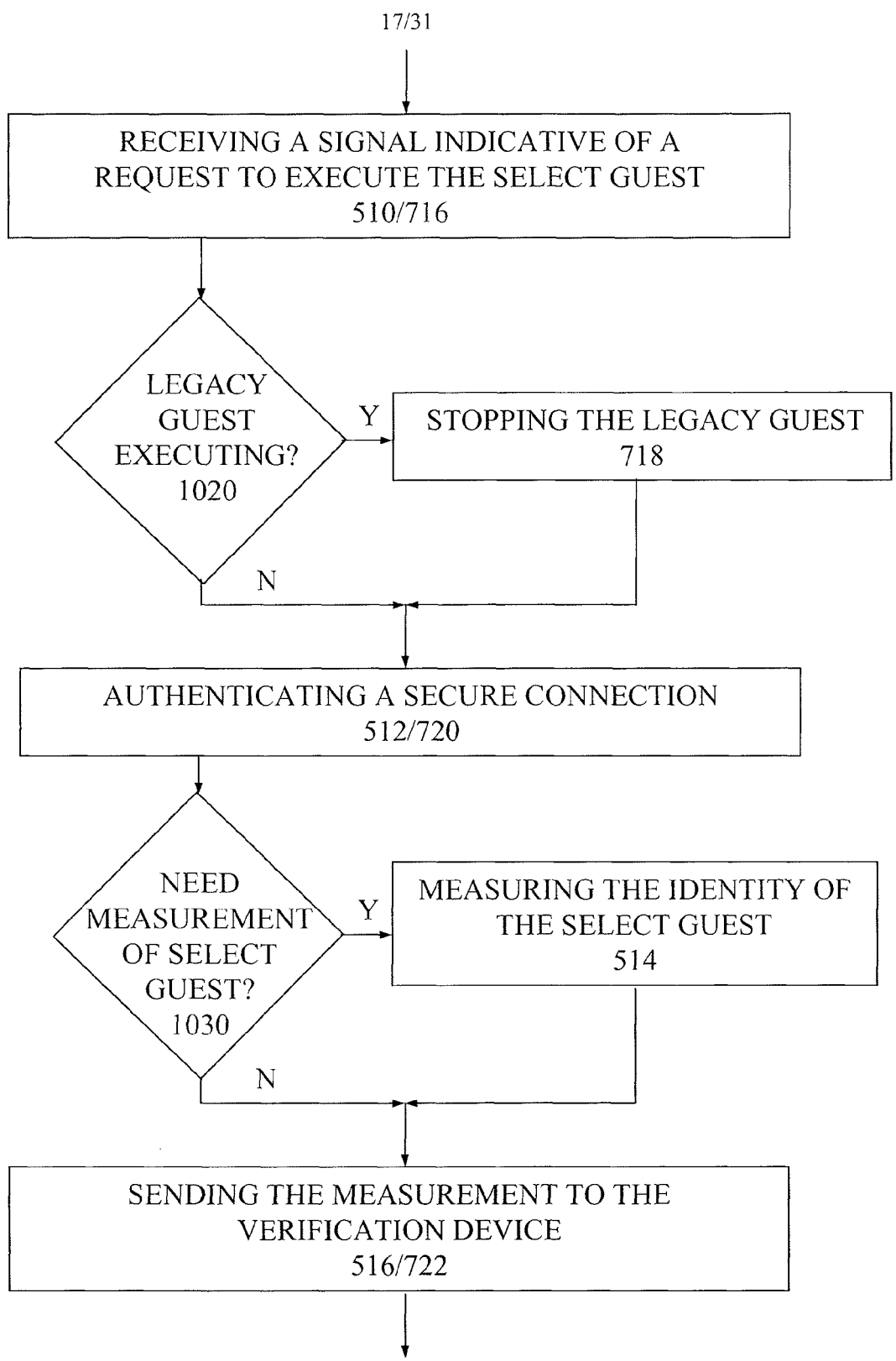
FIG. 10B represents one embodiment of the process according to the present invention when the user requests to execute the select guest.

FIG. 10B represents one embodiment of the process according to the present invention when the user requests to execute the select guest 312. After receiving the request, the processor 112 sends certain information related to the select guest 312 to the verification device 120.

FIGS. 6 and 8 illustrate embodiments of a process according to the present invention that is performed by the verification device 120 after receiving information related to the select guest 312 from the processor 112. The verification device 120 determines whether the select guest 312 should be executed and sends a signal back to the processor 112.

Figure 10C:
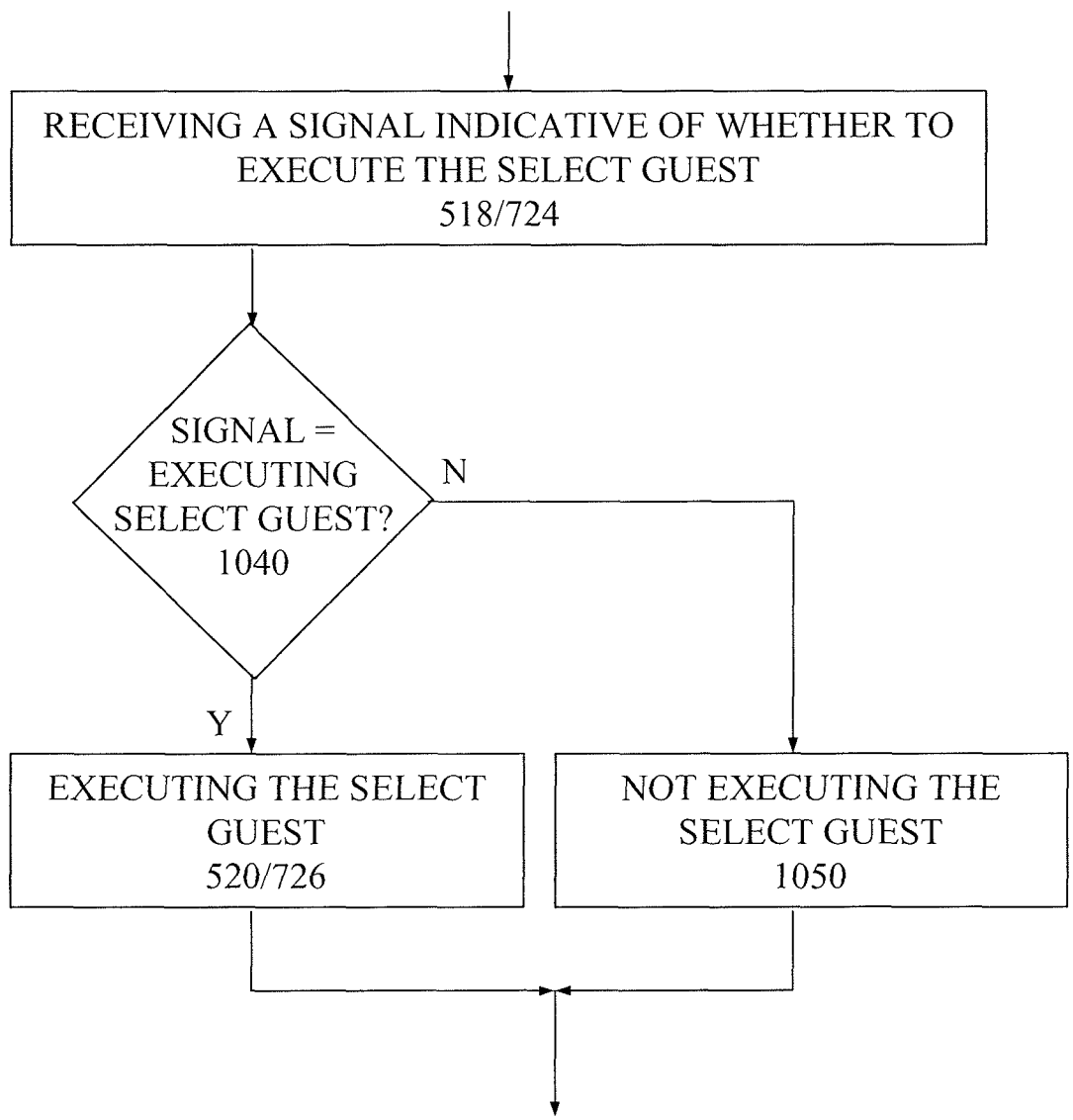
FIG. 10C illustrates one embodiment of a process according to the present invention that is performed by the processor after receiving the signal from the verification device.

FIG. 10C illustrates one embodiment of a process according to the present invention that is performed by the processor 112 after receiving the signal from the verification device 120. After the process of FIG. 10C is completed, it returns to FIG. 10A.

Figure 10D:
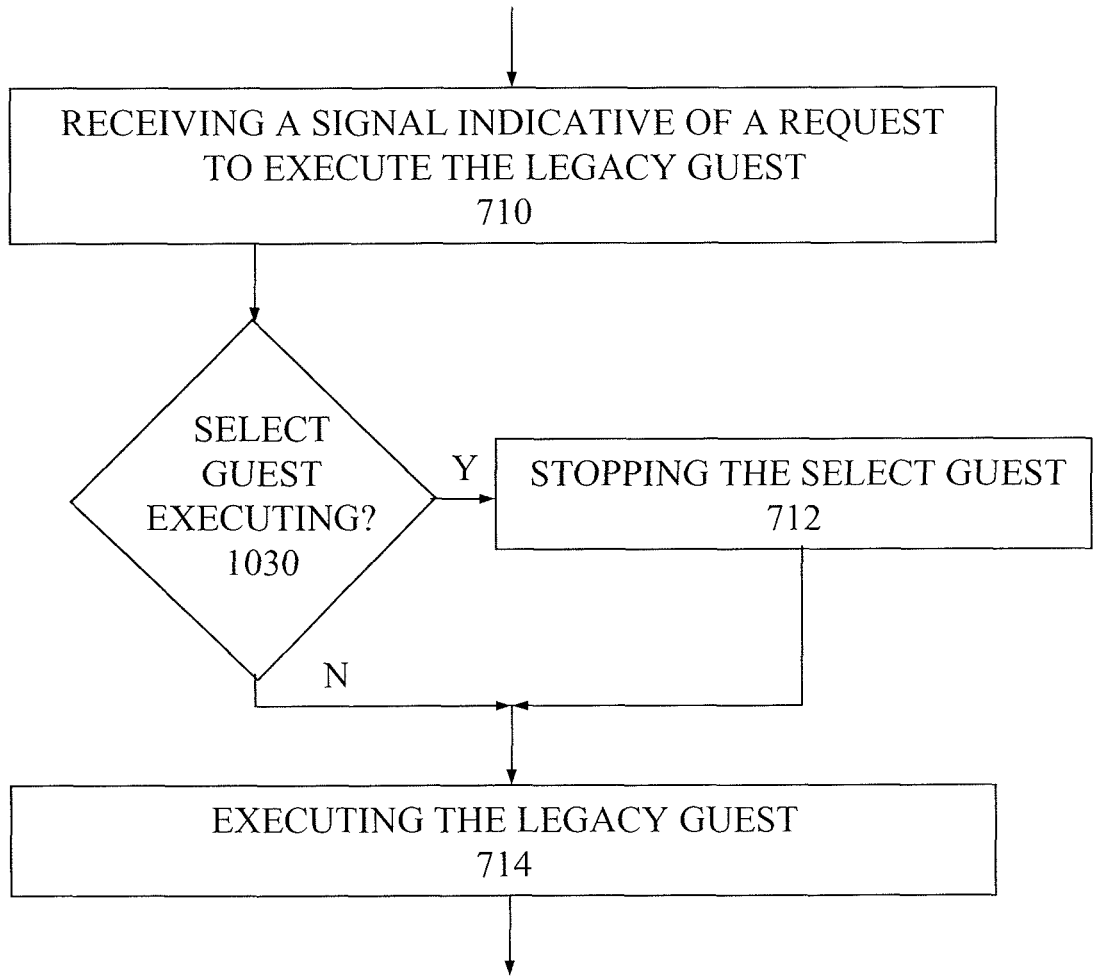
FIG. 10D illustrates one embodiment of the process according to the present invention when the user requests to execute the legacy guest.

FIG. 10D illustrates one embodiment of the process according to the present invention when the user requests to execute the legacy guest 314.

FIGS. 10A-D will now be described in more detail.

FIG. 10A illustrates one embodiment of a method that may be performed by the processor 112. The method may be performed after the computing platform 310 is created. The method may be performed, for example, when the computer-readable instructions in the memory of the processor 112, when executed by the processor 112, cause the processor 112 to perform the following steps.

Step 1010 includes determining whether there has been a request to start the select guest 312. If there has been such a request, the process move to step 1012. If there has not been such a request, then the process moves to step 1014.

Step 1012 includes beginning the process of starting the select guest 312, as described in FIG. 10B.

Step 1014 includes determining whether there has been a request to start the legacy guest 314. If there has been such a request, the process move to step 1016. If there has not been such a request, then the process moves to step 1010.

Step 1016 includes beginning the process of starting the legacy guest 314, as described in FIG. 10D.

The process may include steps in addition to those illustrated.

FIG. 10B illustrates one embodiment of a method that may be performed by the processor 112. The method may be performed, for example, when the computer-readable instructions in the memory of the processor 112, when executed by the processor 112, cause the processor 112 to perform the following steps.

Step 510/716 were previously described and include receiving a signal indicative of a request to execute the select guest. In some embodiments, this step may be eliminated or included in step 1010.

Step 1020 includes determining whether the legacy guest 314 is executing. If it is, then the process proceeds to step 718 to stop the execution of the legacy guest 314. If it is not executing, the process proceeds to steps 512/720.

Step 718 has previously been described and includes stopping the legacy guest 314.

Steps 712/720 have been previously described and include authenticating a secure connection.

Step 1030 determines whether there is a need to measure the identity of the select guest 312. If there is a need, the process proceeds to step 514. If there is not a need, the process proceeds to steps 516/722.

Step 514 has been previously described and includes measuring the identity of the select guest 312.

Steps 516/722 have been previously described and include sending the measurement of the identity of the select guest 312 to the verification device 120. As described herein, this measurement may be a new measurement taken in step 512, or a measurement that was take sometime before step 1030.

FIG. 10C illustrates one embodiment of a method that may be performed by the processor 112. The method may be performed, for example, when the computer-readable instructions in the memory of the processor 112, when executed by the processor 112, cause the processor 112 to perform the following steps.

Steps 518/724 have been previously described and include receiving a signal from the verification device indicative of whether to execute the select guest 312.

Step 1040 determines whether the signal received from the verification device 120 indicates to execute the select guest 312. If so, the process proceeds to steps 520/726. If not, the process proceeds to step 1050.

Steps 520/726 have been previously described and include executing the select guest 312 when the processor 112 receives a signal from the verification device 120 indicating that the select guest 312 should be executed.

Step 1050 includes not executing the select guest 312 when the processor 112 receives a signal from the verification device 120 indicating that the select guest 312 should not be executed.

FIG. 10D illustrates one embodiment of a method that may be performed by the processor 112. The method may be performed, for example, when the computer-readable instructions in the memory of the processor 112, when executed by the processor 112, cause the processor 112 to perform the following steps.

Step 710 has been previously described and includes receiving a signal indicative of a request to execute the legacy guest 314. In some embodiments, this step may be eliminated or included in step 1014.

Step 1030 determines whether the select guest 312 is executing. If so, the process proceeds to step 712. If not, the process proceeds to step 714.

Step 712 has been previously described and includes stopping the select guest 312.

Step 714 has been previously described and includes executing the legacy guest 314.

Many variations and modifications are possible with the present invention. In embodiments including more than one select guest 312, more than one legacy guest 314, more than one hypervisor 316, or other variations of the present invention are utilized, the process steps described herein may be modified appropriately. For example, in embodiments including more than one select guest 312, step 510 may be modified to be receiving a signal indicative of a request to execute one of the plurality of select guests 312, step 514 may be modified to be measuring the identity of at least a portion of the select guest 312 corresponding to the signal indicative of the request to execute one of the plurality of select guests 312, and step 516 may be modified to be sending a measurement of the identity of the select guest 312 corresponding to the signal indicative of the request to execute one of the plurality of select guests 312. Other changes to other steps may also be made in a similar fashion. Several other variations and modifications are discussed below.

Figure 11:
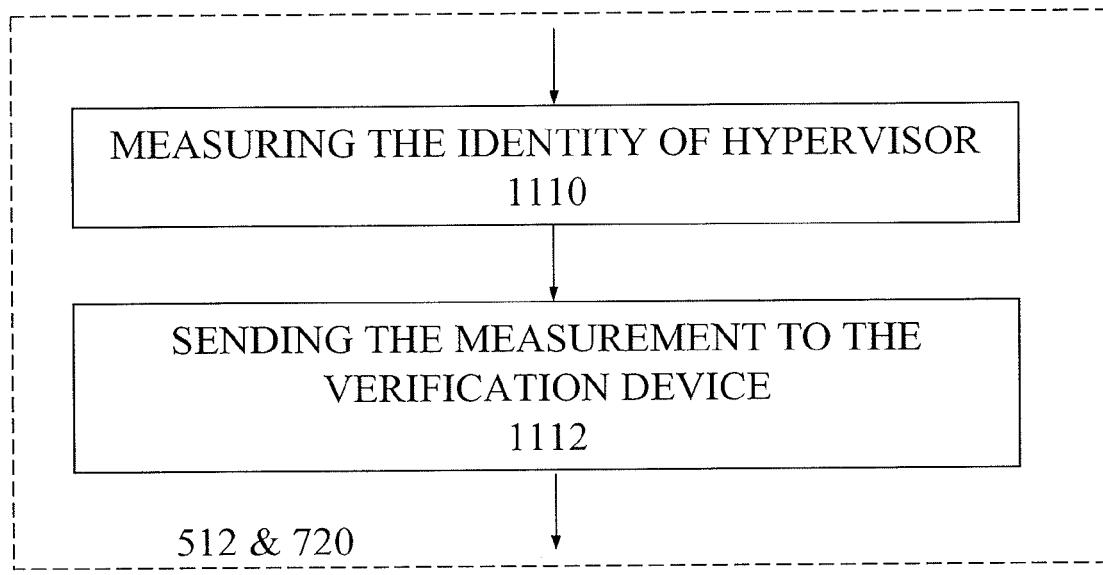
FIG. 11 illustrates one embodiment of the step of authenticating a secure connection between the hypervisor and the verification device.

FIG. 11 illustrates one embodiment of the step of authenticating a secure connection between the hypervisor 316 and the verification device 120, such as in steps 512 and 720. In that embodiment, authenticating includes the following steps.

Step 1110 includes measuring the identity of at least a portion of the hypervisor 316. The identity of the entire hypervisor 316 may be measured, or the identity of less than all of the hypervisor 316 may be measured.

Step 1112 includes sending the measurement of the identity of the hypervisor 316 to the verification device 120.

Steps 1110 and 1112 are performed after step 510, receiving the signal indicative of the request to execute the select guest. Steps 1110 and 1112 are also performed without rebooting the computer 110. As described above, it is desirable to measure a recent identity and it is also desirable to avoid rebooting the computer 110. However, the present invention can be used in different embodiments, such as where the computer 110 is rebooted. Also, the processor 112 of the computer 110 may perform the step of measuring the identity of the hypervisor 316 before the hypervisor 316 executes any instructions or step 1110 may be performed after the hypervisor 316 executes.

Steps 1110 and 1112 are used to determine whether the hypervisor 316 has been compromised. These steps are preferably used in combination with the steps shown in FIG. 12.

Figure 12:
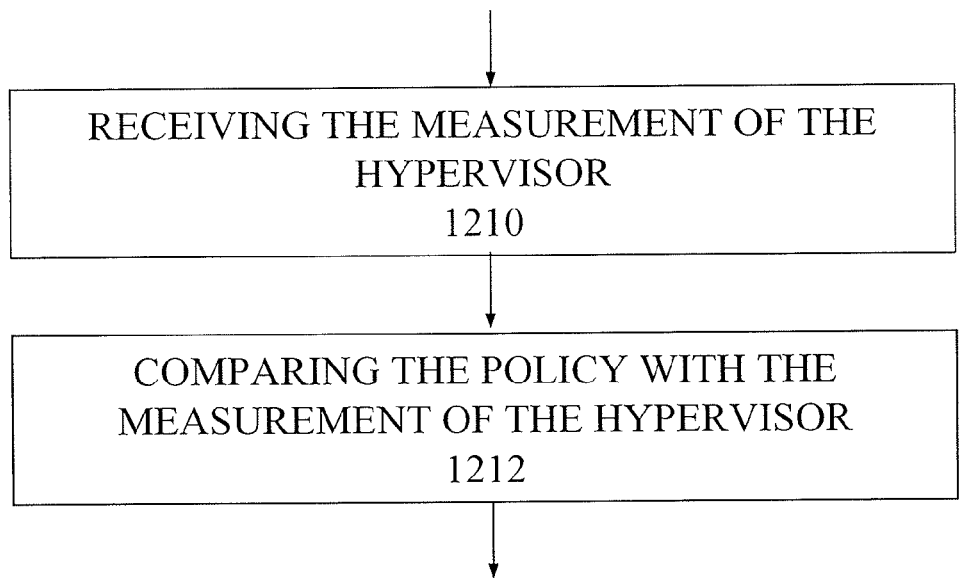
FIG. 12 illustrates additional steps that may be performed by the verification device.

FIG. 12 illustrates additional steps that may be performed by the verification device 120. These steps are complimentary to the steps of FIG. 11 and they may be performed by the verification device 120 before or after the steps illustrated in FIG. 6.

Step 1210 includes receiving the measurement of the hypervisor 316 from the processor 120 of the computer 110.

Step 1212 includes comparing the policy stored in the verification device 120 with the measurement of the hypervisor 316 received by the verification device 120.

Steps 1210 and 1212 are performed after step 1112, sending the measurement of the identity of the hypervisor 316 to the verification device 120. Steps 1210 and 1212 are also performed without rebooting the computer 110. As described above, it is also desirable to avoid rebooting the computer 110. However, the present invention can be used in different embodiments, such as where the computer 110 is rebooted.

Figure 13:
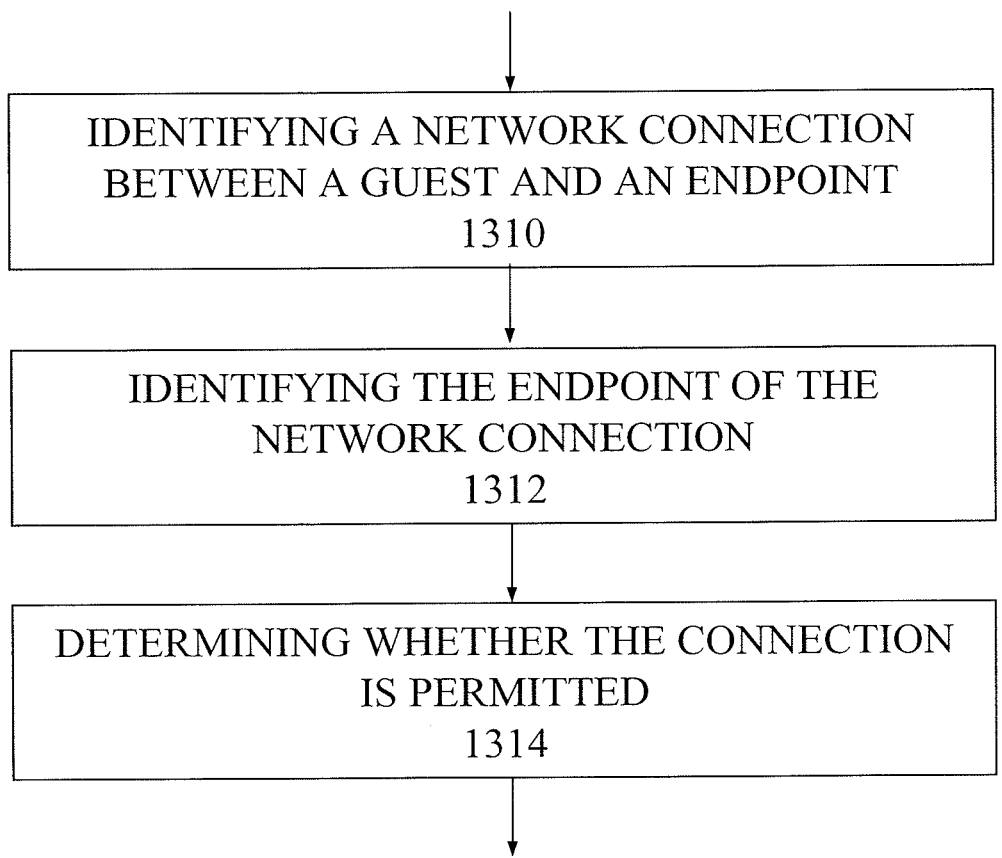
FIG. 13 illustrates one embodiment of another method performed by the processor when there is an attempt to establish a network connection between one of the guests and an endpoint on the network.

FIG. 13 illustrates one embodiment of another method performed by the processor 112. The method may be performed when there is an attempt to establish a network connection between one of the guests 312, 314 and an endpoint on the network 210. In this embodiment, the verification device 120 includes a policy for the guest in question, and that policy includes a list of trusted endpoints on the network 210. The method may be performed, for example, when the computer-readable instructions in the memory 114 of the processor 112, when executed by the processor 112, cause the processor 112 to perform the following steps.

Step 1310 includes identifying a network connection between a guest having a network interface and an endpoint on the network 210. This step may include identifying the network connection after the network connection is initiated by the endpoint of the network 210 and before data transmitted by the guest is permitted to reach the network interface 320. The guest may be either a select guest 312 or a legacy guest 314.

Step 1312 includes identifying the endpoint of the network connection. In other words, this step includes identifying where on the network the guest is trying to connect or where on the network a computer 110 is trying to connect to the guest.

Step 1314 includes determining whether the network connection to the endpoint is permitted by the policy of trusted endpoints stored in the verification device.

Many variations are possible with the present invention. For example, The network interface 320 may be located in the verification device 120 or outside of the verification device 120, as discussed above.

Steps 1310, 1312, and 1314 may be performed before data transmitted by the guest is permitted to reach the network interface. This may be done, for example, to better control communication and to better protect the computer 110.

Figure 14:
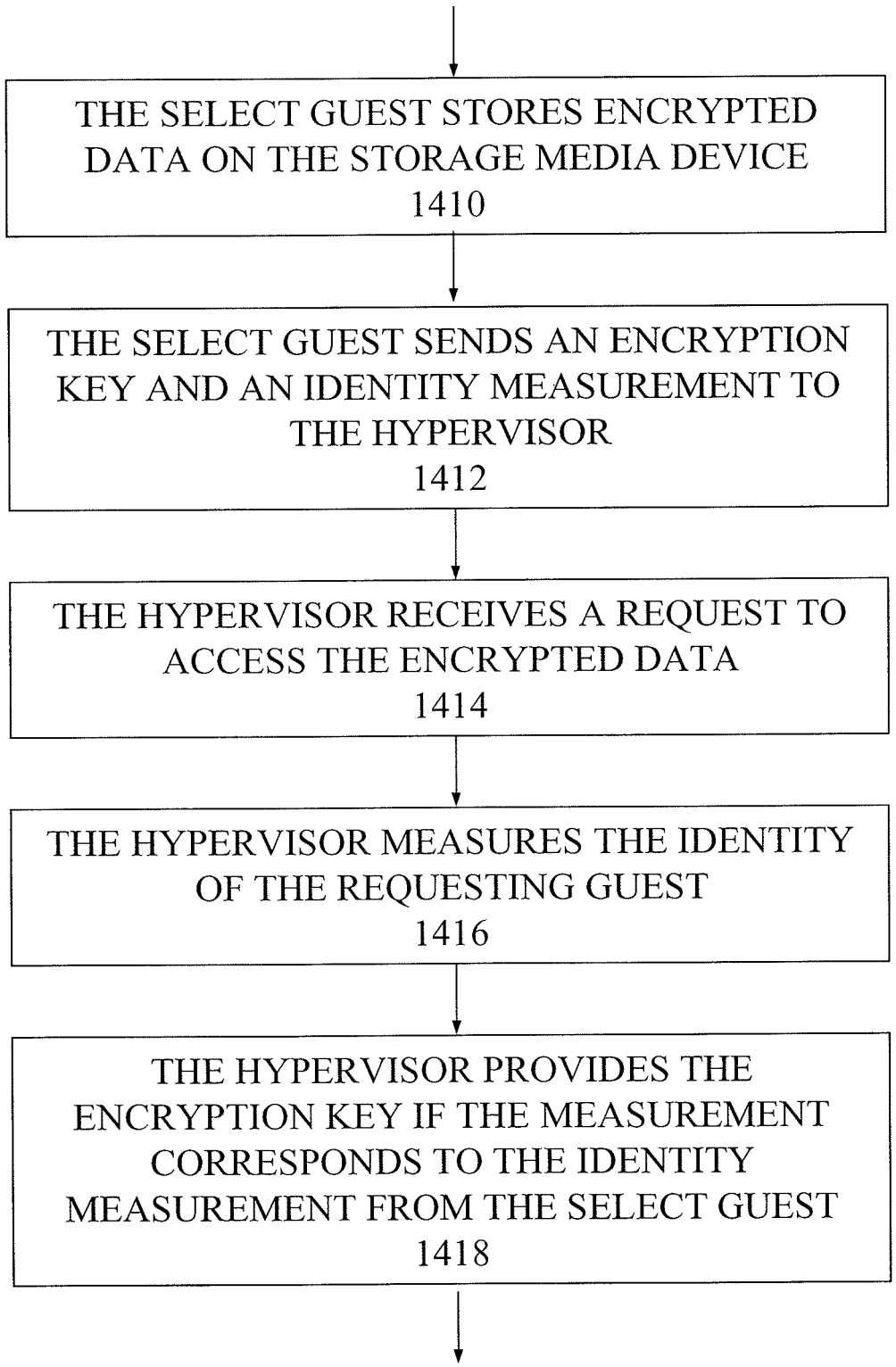
FIG. 14 illustrates one embodiment of a method that may be performed by the processor in connection with the embodiment illustrated in FIG. 3D

FIG. 14 illustrates one embodiment of a method that may be performed by the processor 112 in connection with the embodiment illustrated in FIG. 3D.

Step 1410 includes the select guest 312 storing encrypted data on a storage media device 130.

Step 1412 includes the select guest 312 sending an encryption key and an identity measurement to the hypervisor 316. The encryption key corresponds to the encrypted data and the identity measurement corresponds to a guest permitted to receive the encryption key from the hypervisor 316.

Step 1414 includes the hypervisor 316 receiving a request to access the encrypted data from a requesting guest. The requesting guest may be the select guest 312 that stored the encrypted data or the requesting guest may be a different select guest or a legacy guest 314.

Step 1416 includes the hypervisor 316 measuring the identity of the requesting guest before the requesting guest executes any instructions. For example, the hypervisor 316 may measure all guests (e.g., select guests 312 and legacy guests 314) prior to any of the guests being executed. In this way, the hypervisor 316 has an identity measurement for all of the guests who may potentially request access to the encrypted data. Alternatively, the hypervisor 316 may measure identities of guests at other times, such as immediately before each guest is executed, or at other times.

Step 1418 includes the hypervisor 316 providing the encryption key to the requesting guest if the measurement of the identity of the requesting guest corresponds with the identity measurement received from the select guest. If, however, the identity of the requesting guest does not correspond with the identity measurement provided by the select guest, then the hypervisor 316 does not provide the encryption key to the requesting guest.

Exemplary Embodiments

The present invention will now be described in terms of several specific embodiments. These embodiments are illustrative of the present invention, but the present invention is not limited to the specific embodiments illustrated and described herein.

Technical Approach

The basic technical approach that will be described herein is two-pronged. First, we provide coarse-grained protections for full legacy OS and application suites (described below under the heading "Coarse-Grained Protections"). Second, we provide a fine-grained protected execution environment with powerful, efficient, and yet minimal trusted computing primitives for the execution of special-purpose security-sensitive codeblocks, called SSCBs (described below under the heading "Fine-Grained Protections"). We have been developing both the coarse-grained and fine-grained execution environments in parallel. Ultimately, these complimentary approaches will enable defense-in-depth by enforcing best practices configuration for legacy software environments while simultaneously allowing newly developed SSCBs to execute with state of the art code integrity, execution integrity, and data secrecy and integrity.

The present invention also includes the combination of both systems so that the appropriate granularity of protections are available for all software that executes on the system. The lowest layer of software in our system is a hypervisor 316, sometimes called TrustVisor 316.

Coarse-Grained Protections

Figure 15:
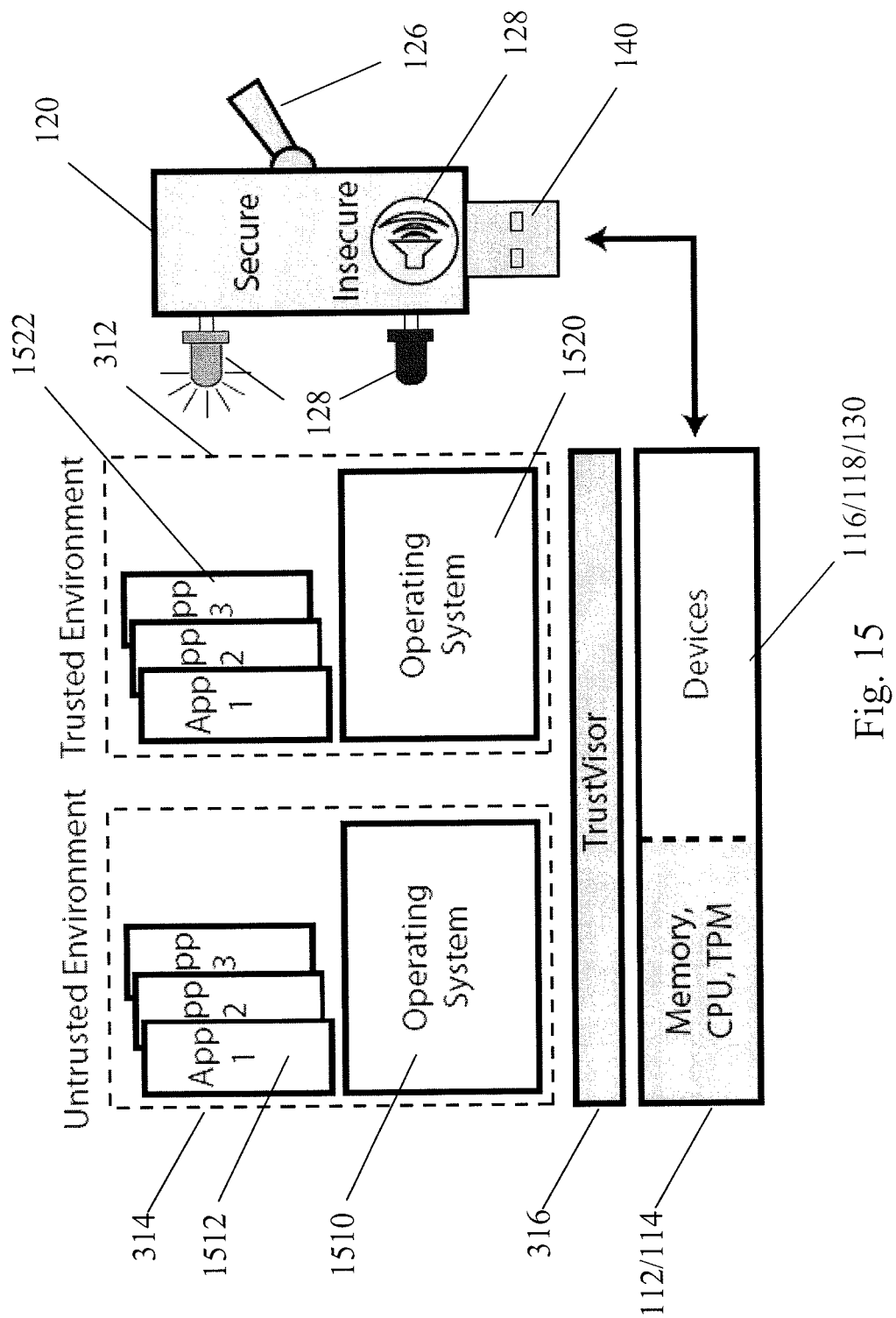
FIG. 15 illustrates one embodiment of coarse-grained protections according to the present invention.

FIG. 15 illustrates one embodiment of coarse-grained protections according to the present invention. In that embodiment, the platfoim 310 is partitioned into multiple environments 312, 314, but only one environment executes at a time. A verification device 120 indicates which environment is active and can be used to select between them. The shaded portions represent components that must be trusted.

The trusted 312 and untrusted 314 environments may include operating systems, applications, and other components. The illustrated embodiment shows that the trusted environment 312 includes an operating system 1510 and three applications 1512. Similarly, the untrusted environment includes an operating system 1520 and three applications 1522. The trusted 312 and untrusted 314 environments according to the present invention may be different from that illustrated, such as by include more or fewer applications or by including things in addition to operating systems and applications.

At a high level, we provide coarse-grained protections by splitting system execution into multiple guest 312, 314, sometimes referred to as "environments", that execute non-concurrently. Different environments may be trusted for different tasks. This design is based on the belief that the user has a set of tasks (e.g., games, photo editing, browsing for entertainment) that she wants to run with maximum performance, and that she has a set of tasks that are security sensitive (e.g., banking, healthcare) which she wants to run with maximum security and which are infrequent and less performance-critical. The performance-sensitive applications run in the untrusted environment 314, which runs at near-native speed, while security-sensitive applications run in their own trusted environment 312, which is kept clean and protected by TrustVisor 316. In some embodiments, the user may be allowed to have multiple security-sensitive environments 312.

According to one embodiment, the coarse-grained component of the TrustVisor 316 architecture is based on four core concepts: (i) hyper-partitioning: system resources are partitioned as opposed to being virtualized. Among other benefits, this results in greater performance, since it minimizes resource interpositioning, and it eliminates many side channel attacks possible with virtualization; (ii) hyper-switching: device states are saved and restored across environment switches; (iii) external verification and trusted path: the state of the system (trusted or untrusted) is communicated to the user in a secure and easy to understand fashion; and (iv) trusted environment protection: TrustVisor 316 limits code execution in the trusted environment to a finite set of trusted applications and ensures that network communication is only permitted with trusted sites.

Hyper-Partitioning.

Since the untrusted environment 314 may be infected with malware, TrustVisor 316 must isolate the trusted environment(s) 312 from the untrusted environment 314. Further, TrustVisor 316 must isolate itself from both environments so that its functionality cannot be deliberately or inadvertently modified. To achieve this isolation, TrustVisor 316 partitions the CPU in time by only allowing one environment to execute at a time. Memory 114 and device partitioning are explained below.

Using partitioning as opposed to virtualization has many benefits. First, it allows the untrusted environment 314 to run with full generality at native speed, since it has full access to the CPU and system devices. Second, whenever environments with different trust levels share resources (e.g., when using virtualization), side channels exist that might allow information in the trusted environment 312 to leak to malware in the untrusted environment 312 [B. Lampson. A note on the confinement problem. Communications of the ACM, 16(10): 613-615, 1973.]. Partitioning eliminates most of these side-channels. Finally, partitioning keeps the TrustVisor 316 code-base tiny, since it does not require device drivers supporting different devices from various vendors [P. Karger and D. Safford. I/O for virtual machine monitors: Security and performance issues. IEEE Security and Privacy, 6(5):16-23, 2008.]. A small code base permits formal analysis of TrustVisor 316 to rule out potential vulnerabilities.

Figure 16:
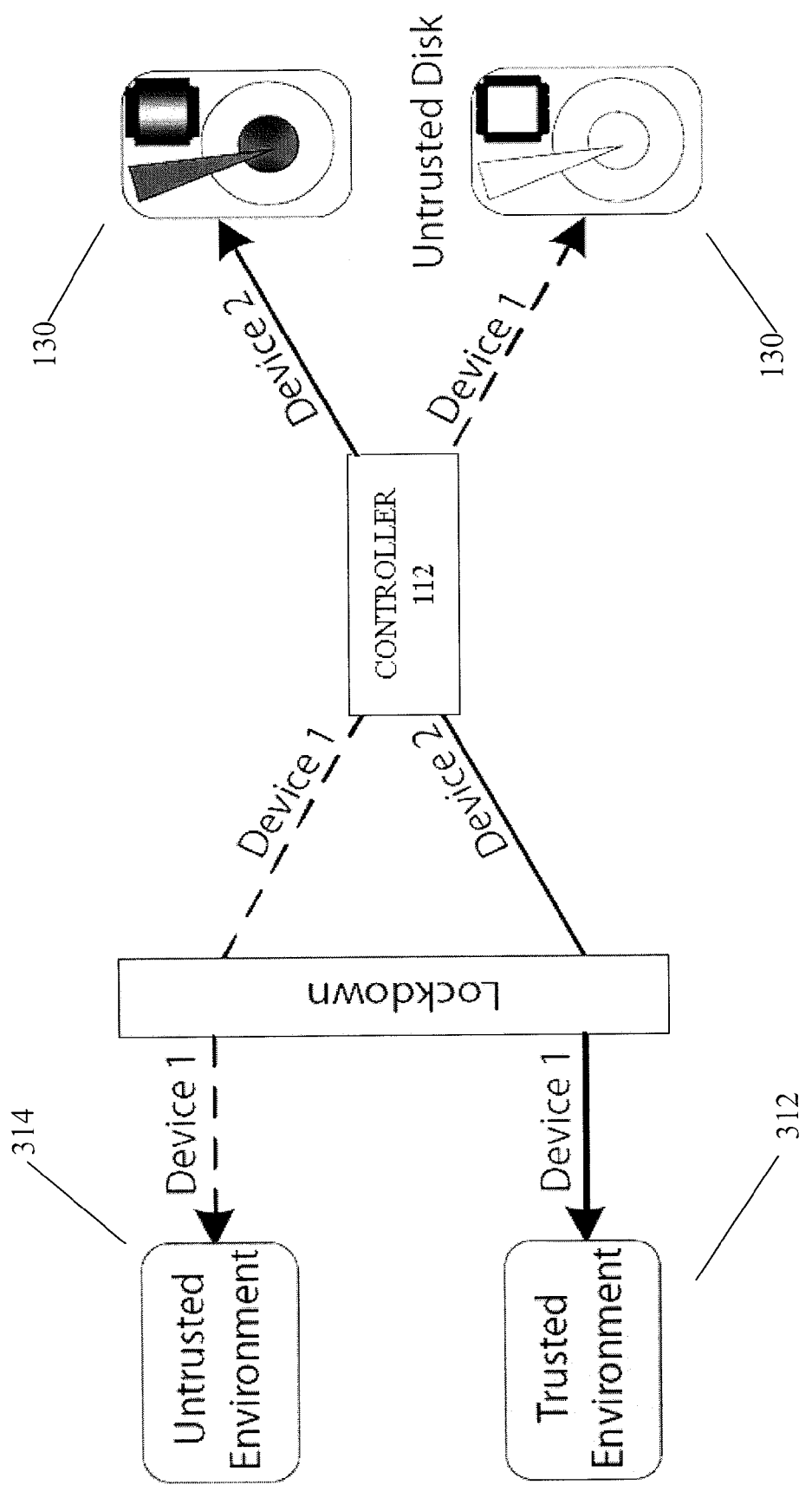
FIG. 16 illustrates one embodiment of hyper-partitioning of storage devices according to the present invention.

FIG. 16 illustrates one embodiment of Hyper-Partitioning of Storage devices 130 according to the present invention. In this embodiment there are two devices 130, one for each of the trusted 312 and the untrusted 314 environments. These devices are sometimes known as "allocated" devices because they are allocated for the use of a particular environment. Devices which are shared between environments are sometimes known as "base" devices.

In this embodiment, both the trusted 312 and the untrusted 314 environments believe they are using the same device 130, in this case a disk drive, in the system. In reality, TrustVisor 316 intercepts the device selection requests and redirects disk operations to the appropriate disk 130, based on the current environment. Although this embodiment will be discussed in terms of storage devices, the present invention may be used with partitioned devices 130 other than storage devices.

TrustVisor 316 partitions the available physical memory 114, 130 in the system into three areas: the TrustVisor 316 memory region, the untrusted environment's 314 memory region, and the trusted environment's 312 memory region. For example, the TrustVisor 316 may employ Nested Page Tables to restrict each environment to its own memory region. In other words, the NPT for the untrusted environment 314 does not map physical memory pages that belong to the trusted environment 312 and vice versa. Further, it employs hardware-based DMA-protection within each environment to prevent DMA-based access beyond each environment's memory regions.

In this embodiment, partitioning will be described in terms of partitioning a storage media device 130. However, the present invention may also be used to partition other memory, such as memory 114. In some embodiments the present invention may be used to partition all forms of memory 114, 130, and in other embodiments the present invention may be used to partition less than all forms of memory.

With hyper-partitioning, both the untrusted 314 and trusted 312 environments may use the same set of physical devices 116, 118, 130. Thus, TrustVisor 316 must ensure that device states are saved and restored across environment switches using hyper-switching. Devices that do not store persistent data, such as video 118, audio 118, and input 116 devices can be swapped in this manner.

However, storage devices 130 may contain persistent, sensitive data from the trusted environment 312, or malicious data from the untrusted environment 314. Thus, TrustVisor 316 ensures that each environment is provided with its own set of storage devices 130 and/or partitions. For example, TrustVisor 316 can assign a different hard drive 130 to each environment. Alternately, TrustVisor 316 can assign a different partition on the same hard drive 130 to each environment. The challenge is to create this partition without virtualizating the storage devices 130, while providing strong isolation that cannot be bypassed by a malicious OS.

TrustVisor 316 efficiently partitions storage devices 130 by interposing on device selection, rather than device usage. It takes advantage of the fact that modern storage devices 130 rely on a controller that implements the storage protocol (e.g., ATA, SATA) and directs storage operations to the attached devices. When the operating system writes to the storage controller's I/O registers (a standard set for a given controller type), TrustVisor 316 intercepts the write and manipulates the device controller to select the appropriate device for the currently executing environment (see FIG. 16). All other device operations (e.g., reads and writes) proceed unimpeded by TrustVisor 316. A similar scheme can be adopted for two partitions on the same hard disk by manipulating sector requests.

Leaving security-sensitive data on the trusted disk unencrypted depends on a trusted BIOS. Otherwise, malicious code may boot first and access data without TrustVisor 316 to interpose on device selection. Thus, according to one embodiment of the present invention, TPM-based disk encryption is used so that data on the sensitive disk will only be accessible if TrustVisor 316 has been loaded.

Hyper-Switching.

Since TrustVisor 316 does not employ device virtualization, switching between the untrusted 314 and the trusted 312 environment (and vice versa) is a challenge. In modern OSes, device drivers store device configuration information in memory and expect the internal state of the devices to match that configuration. Hence, simply saving the memory contents of one environment and replacing it with the other will not suffice.

In one embodiment, TrustVisor 316 uses the ACPI Sleep States (employed by all modern OSes) to switch between the trusted 312 and untrusted 314 environments. When a sleep command is initiated (e.g., when the user closes the lid on a laptop), the OSPM first informs all currently executing user and kernel-mode applications and drivers about the sleep signal. They, in turn, store the configuration information needed restore the system when it awakes. The device drivers use the OSPM to set desired device power levels. The OSPM then signals the ACPI Subsystem, which ultimately performs chipset-specific operations to transition the system into the desired sleep state. The OSPM polls the ACPI Subsystem for a wake signal to determine when it should reverse the process and wake the system.

With hyper-switching, TrustVisor 316 performs an environment switch by transitioning the current environment to sleep and waking up another. Assuming the user starts in the untrusted environment 314, we briefly describe the steps involved in a hyper-switch. When the user rotates the selector 126 on the USB verifier 120 to initiate a switch to a particular trusted environment 312, the USB verifier 120 communicates with TrustVisor 316 which in turn instructs the OSPM in the untrusted environment 314 to put the system to sleep. When the OSPM in the untrusted environment 314 issues the sleep command to the ACPI Subsystem, TrustVisor 316 intercepts the command, resets all devices, updates the output on the USB verifier 120, and issues a wake command to the OSPM in the trusted environment 312.

External Verification and Trusted Path.

While TrustVisor 316 always knows which environment is currently operating, it must create a trusted path to the user to convey this information in a way she can easily understand and trust. Otherwise, the user might be tricked into performing security-sensitive operations in the untrusted environment 314. One approach to conveying whether the system is in the trusted 312 or the untrusted 314 environment would be via the display. However, this approach would require TrustVisor 316 to include a display driver, and malware in the untrusted environment 314 might try to trick the user by manipulating the parts of the display that it had legitimate access to. TrustVisor 316 eliminates such attacks by using a simple, external device 120 to control the environment switching and to display the result of the switch to the user. Further, TrustVisor 316 ensures that the external device 120 can verify that it is interacting with a correct version of TrustVisor 316, preventing malware from misleading the device 120.

The USB Verifier.

The user employs a device 120, sometimes called the verification device 120 and sometimes called the USB verifier 120, to switch between trusted and untrusted environments. This device 120 may be external to the computer 110, such as a removable device that connects via a USB port or some other connection, or the device 120 may be integral with the computer 110. References to a "USB verifier" generally refer to an embodiment using a removable device 120 that connects via a USB port, although the present invention may also be used with connections other than USB ports and the invention may be used with non-removable devices 120.

The following describes characteristics of one embodiment of the present invention to enable the user to trust the USB verifier 120:

1. Correct Operation.

Software executing on the USB verifier 120 must be robust against compromise. By minimizing the code for the USB verifier 120, we make it amenable to formal analysis.

2. Minimal Input Capabilities.

To minimize complexity (and hence user confusion), we wish to minimize the number of input options.

3. Minimal Output Capabilities.

To reduce confusion, the user should be able to easily learn which environment she is working in.

Figure 17:
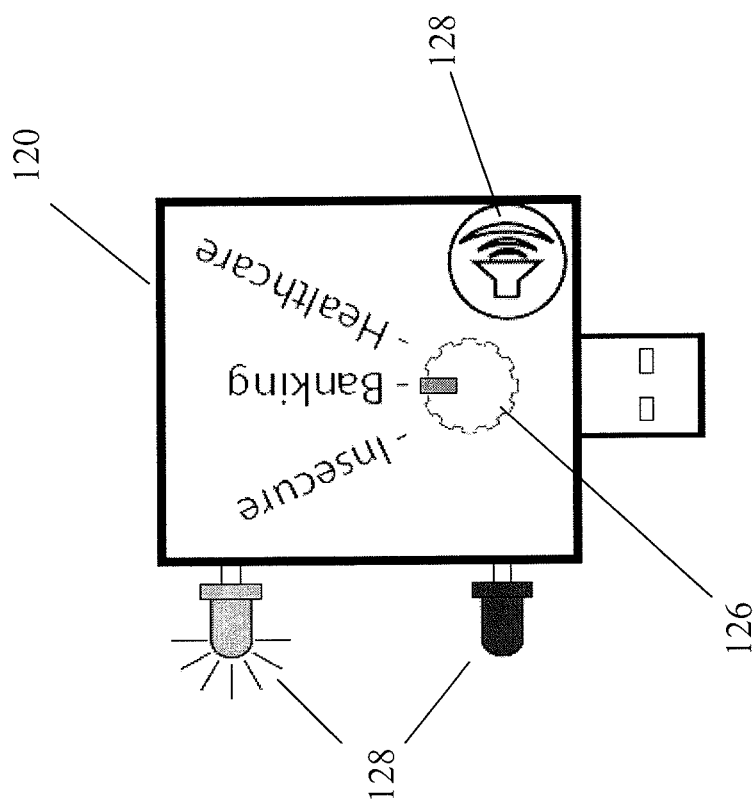
FIG. 17 illustrates one embodiment of a verification device for more than two mutually distrusting environments.

FIG. 17 illustrates one example of a USB verifier 120 according to the present invention. In this embodiment, the USB verifier 120 may be used for more than two mutually distrusting environments. This device 120 connects to the user's main computer or PC via a USB interface. The USB verifier 130 is equipped with a red and green LED 128, a selector 126 to choose which environment should be executing, and a buzzer 128 to alert the user when the LEDs have changed.

To achieve these properties, the USB verifier 120 consists of a single selector 126, two LEDs 128, and a buzzer 128. The selector 126 can be turned to indicate the environment that the user currently desires. When the green LED 128 is lit, the verifier 120 has confirmed that the trusted environment 312 chosen by the user via the selector 126 and the environment that is actually executing are the same. The red LED 128 indicates that the untrusted environment is active. Because it takes a non-negligible amount of time to switch environments (i.e., after she adjusts the selector 126), the USB Verifier 120 uses a blinking red LED 128 to indicate processing. Thus, the user need only remember to check that the green LED 128 is lit before performing security-sensitive tasks. The USB Verifier 120 uses the buzzer 128 to attract the user's attention whenever the LEDs 128 change states. It can also create an alarm buzz if the USB Verifier 120 is unable to verify the correctness of TrustVisor 316 or if the system encounters a fatal error. As with other specific examples of the present invention, specific types of output 128 (e.g., red LED, green LED, buzzer) are exemplary and the present invention may use different numbers, and types of outputs 128. Similarly, the specific functions described with regard to the output 128 may be modified.

Secure Channel.

To accurately verify the state of the system (trusted or untrusted), the USB verifier 120 must be able to communicate securely with TrustVisor 316. More precisely, it should not be possible for an adversary to impersonate or undetectably modify TrustVisor 316. TrustVisor 316 achieves this goal using a combination of CPU protections and hardware attestation (via a TPM).

To create a secure channel for communicating with the USB verifier 120, TrustVisor 316 uses CPU protections to reserve a USB controller and to prevent both environments from accessing it. Using USB as an interface is intuitive for users, and it eliminates the need for an external power source for the USB verifier 120.

To convince the USB verifier 120 that it is communicating with TrustVisor 316, we use TPM-based attestation [Trusted Computing Group. Trusted platform module main specification, Part 1: Design principles, Part 2: TPM structures, Part 3: Commands. Version 1.2, Revision 103, July 2007.]. Initially, TrustVisor 316 is started using a dynamic root of trust [Advanced Micro Devices. AMD64 architecture programmer's manual: Volume 2: System programming. AMD Publication no. 24593 rev. 3.14, September 2007.], [Intel Corporation. Intel trusted execution technology—software development guide. Document number 315168-005, June 2008.], which records a measurement of TrustVisor 316 in the TPM. When the USB verifier 120 is connected to the system, it sends a challenge (a cryptographic nonce) to TrustVisor 316. TrustVisor 316 uses the TPM to generate a quote (essentially a signed statement describing the software state of the system) that it transmits to the USB verifier 120, which checks the attestation. If verification fails, the USB verifier 120 halts, sets the LED 128 state to blinking red and emits an alarm buzz. If it succeeds, the USB verifier 120 emits an attention buzz and sets the LED 128 state to solid red if the untrusted environment 314 is running or to solid green if a trusted environment 312 is running.

Since it is connected via USB, the USB verifier 120 can also detect when the system is rebooted, since on a reboot, a USB controller sends all attached USB devices a reset signal. When this happens, the USB verifier 120 emits the attention buzz and sets the LED state to blinking red, since it can no longer vouch for the state of the system. It then performs the procedure described above to verify that TrustVisor 316 is back in control and to learn which environment is currently active.

Trusted environment 312 Protection.

TrustVisor's 316 trusted environments 312 run a commodity OS and applications. TrustVisor 316 verifies the integrity of all the files of a particular trusted environment 312 during TrustVisor's 316 installation. Further, TrustVisor 316 trusts the software in the trusted environment 312 to not leak data deliberately. However, vulnerabilities within the OS or an application in a trusted environment 312 can be exploited either locally or remotely to execute malicious code. Further, since the trusted environments 312 and untrusted environment 314 use the same devices, the untrusted environment 314 could change a device's firmware to act maliciously. TrustVisor 316 uses hardware DMA protections, approved code execution, and network protection to ensure that only trusted code (including device firmware code) can be executed and only trusted sites can be visited while in the trusted environment 312.

Approved Code Execution.

For non-firmware code, TrustVisor 316 uses page protections within the physical memory page tables to enforce a W xor X policy on physical memory pages used within the trusted environment 312. Thus, a page within the trusted environment 312 may be executed or written, but not both. Prior to converting a page to executable status, TrustVisor 316 checks the memory region against a list of trusted software. Execution is permitted only if this check succeeds.

It is known to enforce a similar policy only on the kernel [A. Seshadri, M. Luk, N. Qu, and A. Perrig. SecVisor: A tiny hypervisor to provide lifetime kernel code integrity for commodity OSes. In Proceedings of the ACM Symposium on Operating Systems Principles (SOSP), October 2007.]. Other researchers use it to determine what applications are running [L. Litty, H. A. Lagar-Cavilla, and D. Lie. Hypervisor support for identifying covertly executing binaries. In USENIX Security Symposium, 2008.]. In contrast, TrustVisor 316 uses these page protections to ensure that potentially untrusted code is always measured before it is invoked. In other words, the present invention may be used to isolate bad code rather than preventing bad code from running.

For device firmware code, TrustVisor 316, during installation, scans all of the hardware installed on the system and enumerates all system and device firmware code regions. It assumes this code has not yet been tampered with and uses physical memory page tables to prevent either environment from writing to these regions.

Network Protection.

Figure 18:
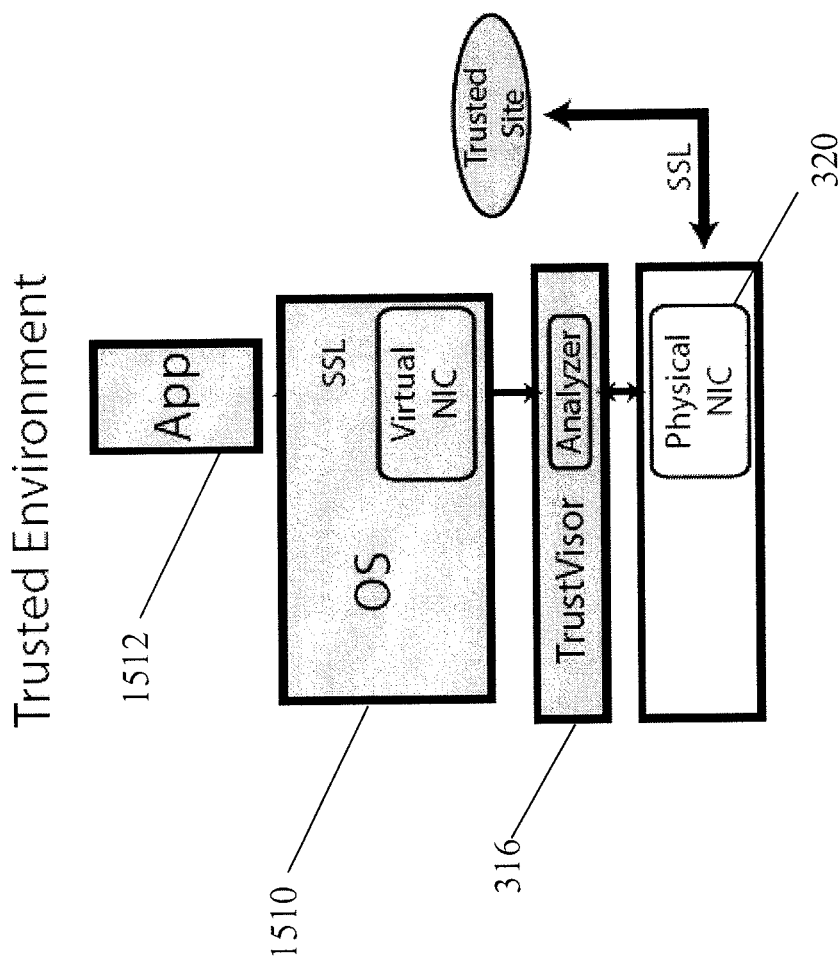
FIG. 18 illustrates one embodiment of Trusted Environment Network Protection.

FIG. 18 illustrates one embodiment of the present invention for use with connecting to sites on the network. According to one embodiment, the trusted environment 312 Network Protection. TrustVisor's 316 protocol analyzer only permits SSL sessions to trusted sites.

Since users perform many security-sensitive activities online, applications executing in a trusted environment 312 need to communicate with remote sites via the network. However, permitting network communication exposes the trusted environment 312 to external attacks. Remote attackers may exploit flaws in the OS's network stack, or the user may inadvertently access a malicious site. While the approved code execution described above prevents many code-based attacks, the trusted environment 312 may still be vulnerable to data-based attacks [H. Shacham. The geometry of innocent flesh on the bone: Return-into-libc without function calls (on the x86). In ACM CCS, 2007.].

To forestall such attacks, TrustVisor 316 restricts the trusted environment 312 to communicate only with a limited set of trusted sites. It imposes these restrictions by interposing on all network traffic to or from the trusted environment 312 (see FIG. 18). TrustVisor 316 uses hardware CPU and physical memory protections to prevent the trusted environment 312 from seeing or accessing any physical network devices present in the system. Network communication is permitted via a virtual network interface that TrustVisor 316 installs in the guest OS. This interface forwards packets to TrustVisor 316, which analyzes the packets and then forwards them onto the physical network interface.

TrustVisor 316 uses packet analysis to determine which network packets are permitted. In one embodiment, TrustVisor 316 only allows SSL and DNS network packets to pass through. All other packets are dropped. The rationale for this approach is that any site with sensitive data should be using SSL to protect it in transit, although the present invention is not limited to this embodiment. When an SSL session is initiated, TrustVisor 316 determines if the request is a valid SSL connection request. If it is, TrustVisor 316 validates the site's SSL certificate and checks it against the list of trusted sites. If any of these checks fail, the packet is dropped. Incoming packets are permitted only if they belong to an existing SSL session or are in response to an earlier DNS request. Note that DNS attacks are forestalled by SSL certificate verification.

Fine-Grained Protections

A primary component of our technical approach is to enable the execution of self-contained (e.g., statically linked) security-sensitive codeblocks (SSCBs) in total isolation from a legacy OS and DMA-capable devices. One embodiment of the present invention provides facilities for remote attestation and the long-term protection of sensitive state. This constitutes fine-grained protection tailored for small, special-purpose code modules.

Figure 19:
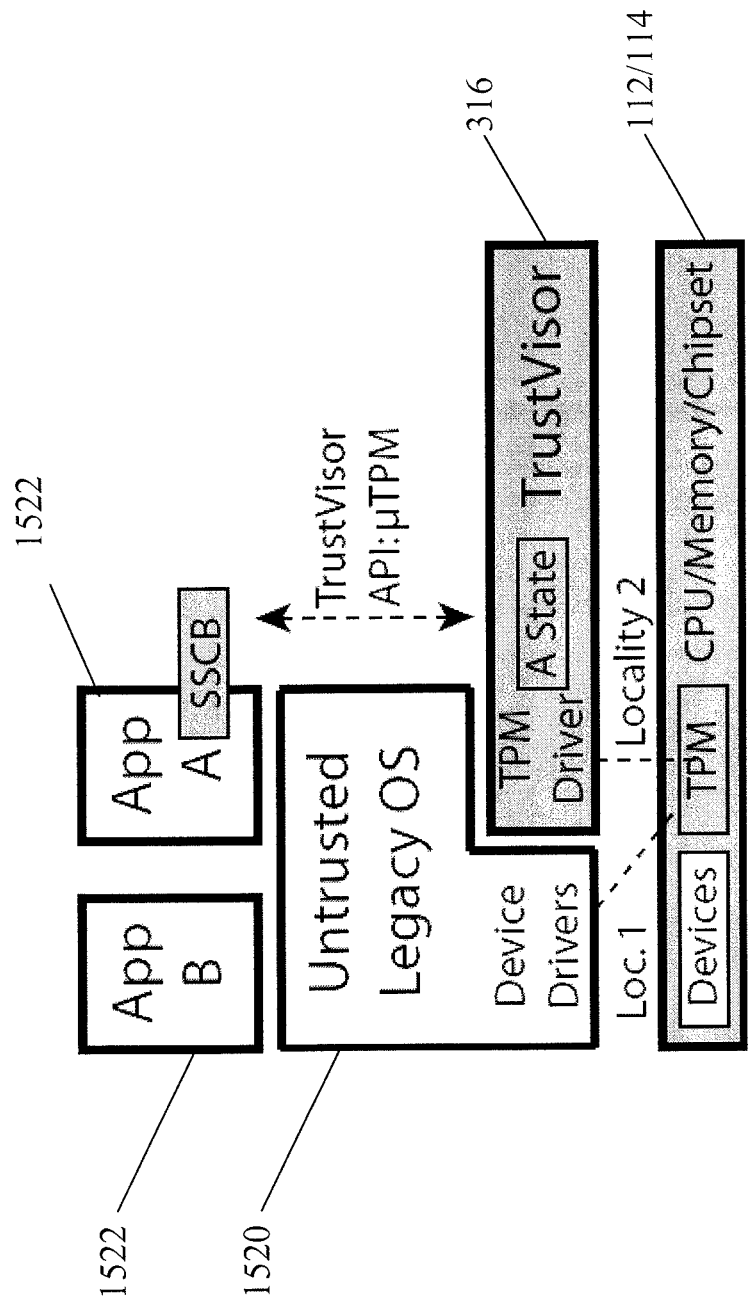
FIG. 19 illustrates one embodiment of a fine-grained protection architecture with TrustVisor.

FIG. 19 illustrates one embodiment of the present invention for use in a fine-grained protection architecture with TrustVisor 316. The shaded components are trusted. A TrustVisor-aware application can register a SSCB with TrustVisor 316, so that it will be executed in isolation from the untrusted legacy OS and applications. The untrusted legacy OS remains responsible for controlling the platform's devices. The only interface exposed to a SSCB by TrustVisor 316 is that of a μTPM. The system's physical TPM is shared by TrustVisor 316 and the untrusted OS using the TPM's locality mechanism.

One example of an application where such capabilities are desirable is an SSL-enabled webserver, where the private SSL/TLS signing key is rendered inaccessible to all but a dedicated code module. This way, even if the remainder of the web server or the OS on which it runs becomes compromised, the secrecy of the private key is preserved. However, such an environment imposes considerable performance requirements on the isolation mechanism, as it must be able to sustain real-world levels of SSL/TLS session establishment.

A powerful mechanism supporting isolated execution of SSCBs is the creation of a dynamic root of trust enabled by modern TPM-equipped platforms [Advanced Micro Devices. AMD64 architecture programmer's manual: Volume 2: System programming. AMD Publication no. 24593 rev. 3.14, September 2007.], [Intel Corporation. Intel trusted execution technology—software development guide. Document number 315168-005, June 2008.]. Unfortunately, today's dynamic root of trust mechanisms impose considerable performance overhead [J. M. McCune, B. Parno, A. Perrig, M. K. Reiter, and H. Isozaki. Flicker: An execution infrastructure for TCB minimization. In Proceedings of the ACM European Conference in Computer Systems (EuroSys), April 2008.], and are not suitable for frequent use on a busy server. We enhance this mechanism to provide excellent performance and to further enable remote attestation of SSCBs loaded for execution.

We wish to provide the security advantages of a system employing a dynamic root of trust mechanism, but without paying a severe performance penalty if the mechanism is heavily used. We further wish to maintain compatibility with available legacy operating system and application software, but exclude this software from the TCB. One solution is to leverage available hardware virtualization support to provide memory isolation and DMA protection for SSCBs. In one embodiment, we implement a small TrustVisor 316 (FIG. 19) to virtualize a machine's physical memory, enforce memory isolation between different SSCBs and untrusted code, protect against malicious DMA reads and writes, and enable remote attestation and long-term protected storage. We use dynamic root of trust only once per boot cycle to invoke TrustVisor 316.

Figure 20:
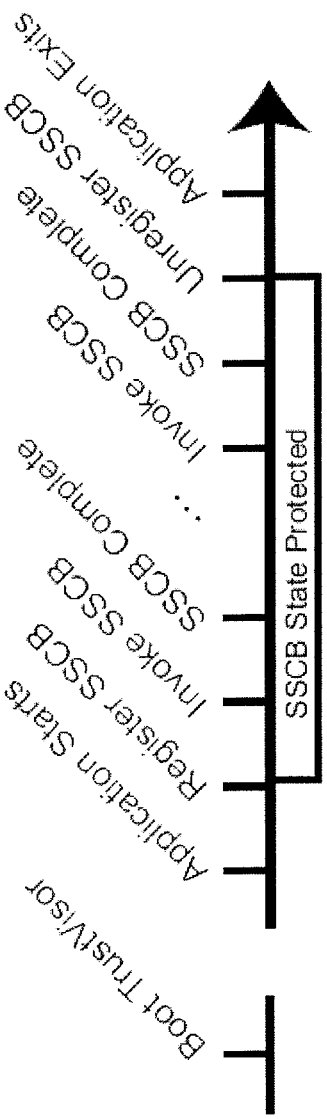
FIG. 20 illustrates one embodiment of a basic sequence of events for a particular SSCB.

To distinguish between legacy code and SSCBs, we devise a registration mechanism by which untrusted applications can register certain code and data as security-sensitive. FIG. 20 illustrates a timeline of an application registering a SSCB, and executing it one or more times.

To provide long-term protection of secrets required by SSCBs, and to enable remote attestation that a particular SSCB has executed, one embodiment of TrustVisor 316 is designed to also export a minimal TPM-like interface to SSCBs. We call this interface a micro-TPM (μTPM), and TrustVisor 316 supports a μTPM instance for each registered SSCB.

Figure 21:
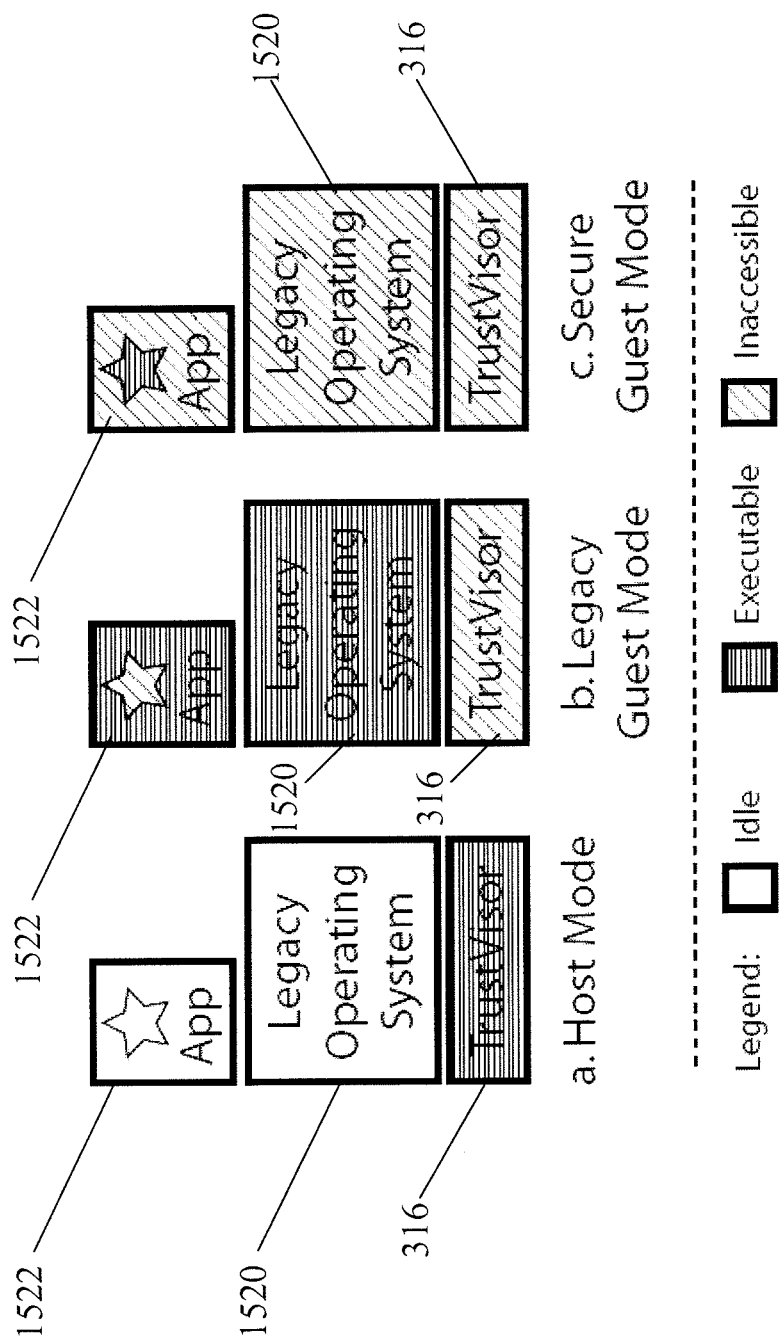
FIG. 21 illustrates one embodiment of a comparison of the three execution modes of code with TrustVisor.

The present invention in general, and TrustVisor 316 in particular, may have more than one basic operating mode. FIG. 21 illustrates one embodiment of a comparison of the three execution modes of code with TrustVisor 316: host mode, legacy guest mode, and secure guest mode. In host mode, TrustVisor 316 itself is executing. In legacy guest mode, either the untrusted OS or the untrusted portion of an application is executing. In secure guest mode, a registered SSCB is executing with TrustVisor's 316 protections. This embodiment will now be described in more detail Host mode refers to execution of TrustVisor 316 code at the system's highest privilege level. TrustVisor 316 in turn supports two guest modes. In legacy guest mode, a commodity x86 operating system and its applications can execute without requiring any awareness of the presence of TrustVisor 316. The legacy OS manages all peripheral devices on the system (network, disk, display, USB, etc.), with the TPM as the only shared device. TrustVisor 316 accesses the TPM via its Locality 2 interface [Trusted Computing Group. Trusted platform module main specification, Part 1: Design principles, Part 2: TPM structures, Part 3: Commands. Version 1.2, Revision 103, July 2007.], and prevents the legacy OS from accessing this interface, opting instead to give the legacy OS access to the TPM's Locality 1 interface (TPM chips are memory mapped to multiple physical addresses, each corresponding to a different privilege level called a locality, where 4 is most privileged and 1 is least privileged [Trusted Computing Group. Trusted platform module main specification, Part 1: Design principles, Part 2: TPM structures, Part 3: Commands. Version 1.2, Revision 103, July 2007.]; TrustVisor can prevent the guest from accessing the Locality 2-4 interfaces by unmapping the relevant memory regions). In secure guest mode, a SSCB executes in total isolation from the legacy OS and its applications. When a SSCB is registered, TrustVisor 316 extends a measurement (cryptographic hash) of the SSCB into the first μPCR in the SSCB's corresponding μTPM instance. All input and output parameters are marshaled by TrustVisor 316 into protected memory before the SSCB begins executing. As we merge our coarse-grained and fine-grained protections into a single instance of TrustVisor 316, the guests receiving coarse-grained protections will execute in legacy guest mode.

Hardware Memory Protections.

A main function of TrustVisor 316 is to isolate SSCBs from untrusted code by supporting both legacy guest mode and secure guest mode (FIG. 21). However, in either mode, any code in the guest must not be allowed to compromise the code integrity of TrustVisor 316. Note that the legacy OS may also reprogram DMA-capable devices in a compromise attempt. To defend against these attacks, TrustVisor 316 runs as a hypervisor at the system's highest privilege level. TrustVisor 316 virtualizes the guest's physical memory to provide isolation between TrustVisor 316 and the legacy system, and between the legacy system and SSCBs. TrustVisor 316 programs the device exclusion vector [Advanced Micro Devices. AMD64 architecture programmer's manual: Volume 2: System programming. AMD Publication no. 24593 rev. 3.14, September 2007.] (DEV) to protect itself and registered SSCBs against DMA accesses.

TrustVisor 316 uses page tables to control MMU-based memory protections. We choose page tables, rather than other MMU-based protections (e.g., segmentation), because page tables are supported by many current CPU architectures. To virtualize physical memory, TrustVisor 316 maintains page tables that translate guest physical addresses into host physical (aka "machine") addresses. These page tables are located in TrustVisor's 316 own memory region, thereby preventing any code in the guest from tampering with the page translation. Indeed, the code in the guest need not even be aware of this virtualization. To reduce complexity and keep the TCB small, TrustVisor 316 leverages hardware virtualization with support for nested page tables (NPT) provided by recent AMD x86 CPUs and enforced by the system's MMU (memory-management unit). Intel offers similar support called Extend Page Tables, which TrustVisor 316 can be readily extended to leverage [Intel Corporation. Intel virtualization technology specification for the IA-32 Intel architecture. Intel Publication no. C97063-002, April 2005.]. This design enforces data secrecy and integrity even if a compromised legacy OS modifies its page tables (guest virtual address to guest physical address), since the guest physical address space is restricted to specifically exclude all of TrustVisor's 316 sensitive memory regions.

Code and Execution Integrity for SSCBs.

It is the responsibility of application developers to privilege separate their programs into sensitive and untrusted portions, although automatic privilege separation may be possible in some instances to ease the burden on the developer [D. Brumley and D. Song. Privtrans: Automatically partitioning programs for privilege separation. In Proceedings of USENIX Security Symposium, 2004.]. The untrusted code can register sensitive code with TrustVisor 316, so that all memory regions (both code and data) corresponding to a particular SSCB will be isolated and measured by TrustVisor 316. The measurement of the SSCB is extended into the μTPM instance associated with this registered SSCB.

SSCB Registration.

TrustVisor 316 may implement an application-level hyper call interface for registering SSCBs. The registration interface accepts a specification for all the functions provided by a SSCB, thereby allowing application programmers to specify sets of functions as security-sensitive. The specification includes a list of function entry points, and input and output parameter formats. This information allows TrustVisor 316 to verify that the specified addresses are legal (i.e., they belong to the calling application's address space), and marshal and unmarshal the parameters between legacy mode and secure mode when the functions inside the SSCB are invoked.

During registration, the memory pages that correspond to the SSCB—including pages for the stack, heap, and other execution requirements for the SSCB—are protected by TrustVisor 316 and become inaccessible to the untrusted OS, application, and even DMA requests from devices. It is at this point—"Register SSCB" in FIG. 20—that code integrity protections for the SSCB become active. TrustVisor 316 ensures that no other code on the system can tamper with this SSCB's memory pages. Further, the TCB includes only TrustVisor 316 and the SSCB itself.

Once the pages are inaccessible to untrusted code, TrustVisor 316 computes a measurement (cryptographic hash) over the contents of these pages and extends it into the first μPCR of the μTPM instance associated with this registered SSCB.

SSCB Invocation.

Following registration, the untrusted legacy application and underlying OS cannot read, write, or directly execute the memory containing the SSCB that it registered. However, the functions inside the SSCB can still be invoked using what appears to be an ordinary function call. Any function call to code inside the SSCB will trap to TrustVisor 316. TrustVisor 316 then performs the following three steps before transferring control to the called function inside the SSCB:

1. Identify which registered SSCB contains the current called sensitive function.
2. Switch the guest from legacy mode to secure mode, with secure mode configured so that only the pages containing this SSCB are accessible.
3. Prepare the secure-mode execution environment (including marshaling input parameters from the untrusted application and setting up the SSCB's stack pointer) for the sensitive function call.

SSCB Termination.

When a SSCB has completed executing and returns back to the calling legacy application, TrustVisor 316 once again gets control. This happens because any attempt to execute code in secure mode outside the SSCB causes a trap into TrustVisor 316. TrustVisor 316 performs the following two steps before transferring control back to the legacy application:

1. Marshall any returned parameters and make them available to the calling untrusted application.
2. Switch the guest from secure guest mode to legacy guest mode, in which the pages containing the SSCB are once again inaccessible from legacy guest mode.

The SSCB's execution state is left intact, so that the corresponding untrusted application can invoke it a second time with different input parameters, or in response to an attestation request.

SSCB Unregistration.

Unregistration can only be initiated by the application that originally registered a particular SSCB. During unregistration, TrustVisor 316 zeros all execution state associated with that SSCB. This includes its stack, heap, and TrustVisor-internal state such as the relevant page table entries and μTPM state. The relevant pages are once again marked accessible to guest mode (the untrusted application and OS).

Data Secrecy and Integrity Mechanisms.

Here we describe how TrustVisor 316 may protect the secrecy and integrity of data, where data can be internal TrustVisor 316 state as well as the state of SSCBs. We distinguish two intervals during which data protection is required: residence in volatile storage (RAM) while a particular SSCB is executing, and residence on non-volatile storage while untrusted code is executing.

Data in Volatile Storage.

Here, volatile storage refers to data in memory that is protected by TrustVisor 316 and the system's MMU and DEV. The same mechanisms that provide code integrity for TrustVisor 316 and executing SSCBs apply here to protect the secrecy and integrity of data.

TrustVisor 316-internal state is protected by keeping it in the region of memory that is accessible only to code in host mode (FIG. 21). TrustVisor 316 configures the NPTs such that guest physical memory simply excludes the physical pages that contain TrustVisor 316 state. There is no way for code in the guest to address the pages containing the sensitive state. Likewise, TrustVisor 316 programs the system's device exclusion vector (DEV) to prevent access to these pages by DMA-capable devices.

While a SSCB is registered, TrustVisor 316 ensures that the machine physical pages that contain SSCB state are unmapped from the legacy OS's guest physical memory space. Data and code pages are treated differently. Any attempt by the legacy OS to read, write, or execute the data pages will trap to TrustVisor 316, which will prevent the access. Executing the code pages that belong to any SSCB is legal, and is handled as described earlier in this section. Likewise, a SSCB that wishes to output any of its state to the untrusted world can do so simply by returning it as an output parameter.

Data in Non-Volatile Storage.

Part of the TrustVisor 316 model is that the legacy OS manages all devices on the system. Thus, any data that is to be put into non-volatile storage will be under the control of the untrusted legacy OS. This requirement will arise during the lifetime of a system with TrustVisor 316 whenever that system reboots, and whenever a SSCB needs to save state for extended periods of time, across many runs.

To protect the secrecy and integrity of data under these conditions, cryptography is required. In brief, sensitive data that must be protected on non-volatile storage must be encrypted and integrity protected.

Numerous algorithms exist for authenticated encryption—the real challenge is to protect the relevant cryptographic keys.

We employ two levels of protection for cryptographic keys with TrustVisor 316. TrustVisor 316 protects its own secrets using cryptographic keys protected by the system's Trusted Platform Module, and exposes a similar interface to SSCBs that they can use to protect the encryption keys for their secrecy- or integrity-protected data.

μTPM Functions.

We observe that many applications are still valuable with a greatly reduced set of TPM functions. The software μTPM interface exposed by TrustVisor 316 exports the following TPM-like functions:

1. TV_Extend for measuring data,
2. TV_GetRand for getting random bytes,
3. TV_Seal and TV_Unseal for sealing and unsealing data based on measurements, and
4. TV_Quote to attest recorded measurements using digital signatures.

The secrecy and integrity of sealed data is protected by symmetric cryptographic primitives performed in TrustVisor 316. These mechanisms are a significant source of TrustVisor's 316 efficiency for trusted computing operations. Previous systems rely on the TPM's low-cost CPU to perform asymmetric sealing and quote operations (e.g., Flicker [J. M. McCune, B. Parno, A. Perrig, M. K. Reiter, and H. Isozaki. Flicker: An execution infrastructure for TCB minimization. In Proceedings of the ACM European Conference in Computer Systems (EuroSys), April 2008), whereas TrustVisor 316 executes the TV-family of trusted computing operations on the platform's primary CPU, and uses efficient symmetric primitives for TV Seal and TV Unseal.

Roots of Trust for Integrity Measurement.

Integrity measurement is the act of keeping track of the cryptographic hash of all software that has been loaded for execution in the TCB. For a particular application's SSCB, this amounts to TrustVisor 316 and the SSCB itself. Measurements of TrustVisor 316 are kept in the system's physical TPM. Measurements of a SSCB are kept in the μTPM instance corresponding to that SSCB.

Integrity measurement is an essential requirement for data protection and remote attestation. Without integrity measurement and a TPM, there is no facility to protect the cryptographic keys that provide data secrecy and integrity when the data is kept on non-volatile storage under the control of untrusted code. Without integrity measurement, there is no trustworthy source of information about what code has been loaded for execution to use in remote attestations.

Further, our mechanism for maintaining (and attesting and sealing with respect to) integrity measurements is a significant contribution to minimizing the TCB. Existing systems to virtualize the TPM suffer from an excessive TCB, as we describe in the section entitled "Related Research". We observe that many applications are still valuable with the reduced set of TPM functions described above.

Ultimately, trust in a system running TrustVisor 316 stems from TPM-based attestation to the use of dynamic root of trust (DRTM) to invoke TrustVisor 316 via the SKINIT instruction. TrustVisor 316 accesses the TPM chip via its Locality 2 [Trusted Computing Group. Trusted platform module main specification, Part 1: Design principles, Part 2: TPM structures, Part 3: Commands. Version 1.2, Revision 103, July 2007.] interface and exposes Locality 1 access to the physical TPM chip to the untrusted guest OS (FIG. 19) to maintain compatibility with existing suites of TPM applications (e.g., TrouSerS (http://trousers.sourceforge.net/)).

Each μTPM instance includes the necessary "micro" Platform Configuration Registers (μPCRs) to keep track of a single SSCB's measurements. TrustVisor 316 performs the initial measurement of the SSCB and extends it into the first μPCR in the μTPM instance associated with the registered SSCB. This mechanism is designed to replicate the functionality of the dynamic root of trust provided by the system's physical TPM.

Attestation and Trust Establishment.

Here we describe how attestation enables a remote entity to establish trust in TrustVisor 316, and subsequently in SSCBs executing on top of TrustVisor 316. Building on the two-level integrity measurement mechanism described, we also design a two-part attestation mechanism. First, we use TPM-based attestation to demonstrate that a dynamic root of trust was employed to launch TrustVisor 316 with hardware-enforced isolation. Second, we use the μTPM functionality built into TrustVisor 316 to demonstrate that a particular SSCB was registered and executed with TrustVisor 316-enforced isolation.

TPM-Generated Attestation.

An external verifier that receives a TPM-generated attestation covering the PCRs into which TrustVisor 316-relevant binaries and data have been extended conveys the following information to the verifier:

A dynamic root of trust (e.g., AMD's SKINIT instruction) was used to bootstrap the execution of TrustVisor 316.

TrustVisor 316 received control immediately following the establishment of the dynamic root of trust.

The precise version of TrustVisor 316 that is executing is identifiable by its measurement (cryptographic hash) in one of the PCRs.

TrustVisor 316 generated an identity key for its µTPM based on the current TPM AIK.

Note that the verifier must learn the identity of the TPM's AIK by some authentic mechanism, such as a PKI, pre-configuration by an administrator, OEM, or system owner.

µTPM-/TrustVisor 316-Generated Attestation.

An attestation from TrustVisor 316 consists of the output of a TV Quote operation, along with additional untrusted data to facilitate the verifier's making sense out of the values in the pPCRs. The verifier must first decide to trust TrustVisor 316 based on a TPM attestation. If TrustVisor 316 is untrusted, then no trusted environment 312 can be constructed on top of TrustVisor 316. A verifier learns the following information as it analyzes the contents of the µPCRs:

µPCR [0] always begins with 20 bytes of zeros extended with the measurement of the registered SSCB. Thus, the verifier can learn precisely which SSCB was registered and invoked during this session on TrustVisor 316.

The values in the remaining µPCRs and any other values extended into µPCR [0] are specific to the SSCB that executed, and will not have been influenced by TrustVisor 316.

The set of µPCRs selected for inclusion in TV Quote (and a nonce provided by the remote verifier to ensure freshness) will be signed by TrustVisor's 316 µTPM identity key µAIK, generated by TrustVisor 316.

Note that the verifier can confirm precisely which SSCB executed, and that a SSCB constructed to measure its inputs and outputs enables the verifier to learn that the Execution Integrity of this SSCB is intact.

The Attestation Protocol.

FIG. 22 illustrates one embodiment of the attestation protocol by which a remote party (which may be a local verification device 120) verifies that a particular attestation represents a legitimate run of a SSCB. This may be used, for example, to convince an external verifier that a particular SSCB ran on a particular system with TrustVisor's 316 protections.

Putting it all Together: Coarse- and Fine-Grained Protections

Figure 23:
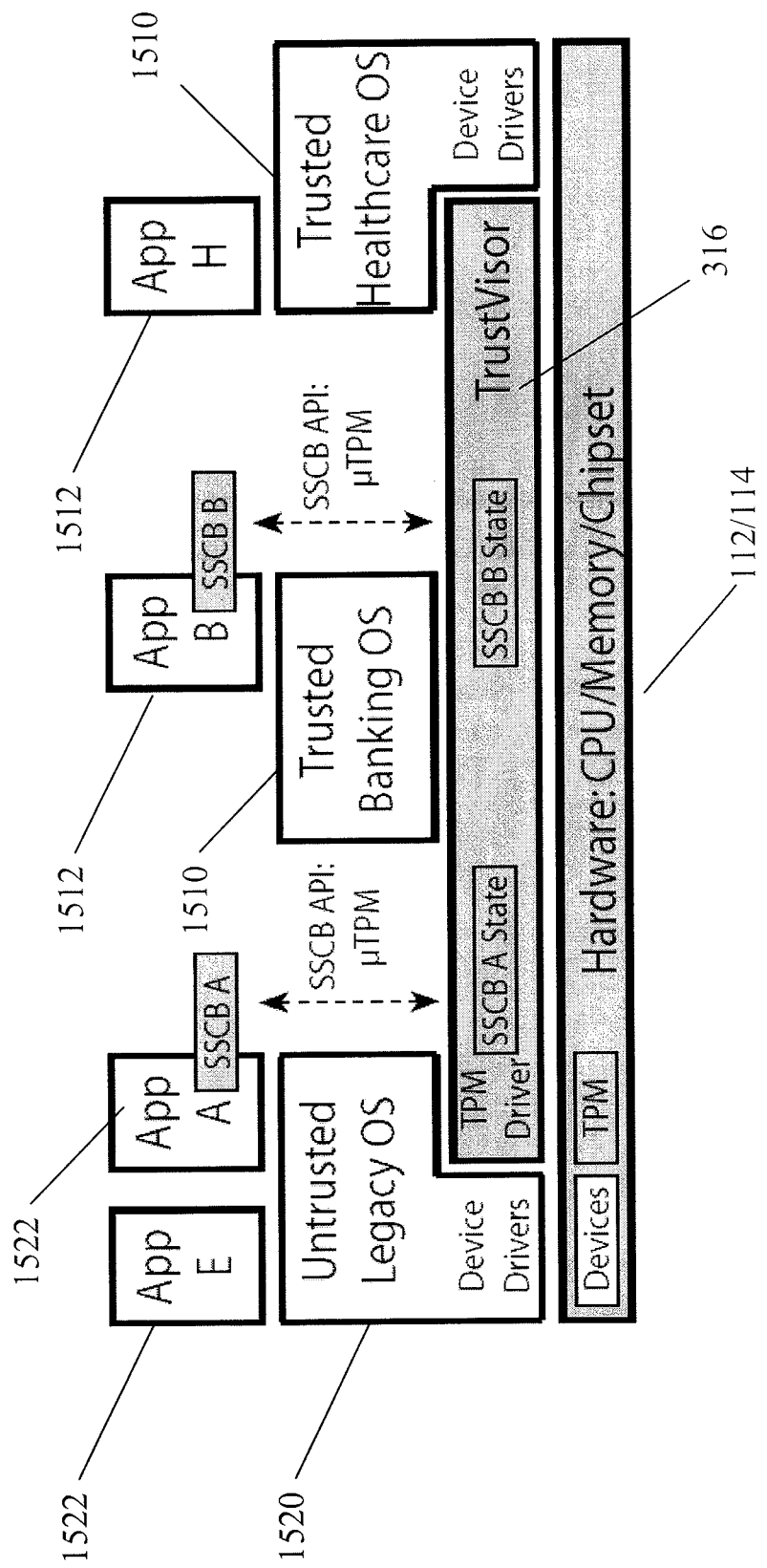
FIG. 23 illustrates one embodiment of a system architecture demonstrating three different guest types running on TrustVisor.

FIG. 23 illustrates one embodiment of a system architecture demonstrating three different guest types running on TrustVisor 316. Shaded regions indicate the trusted computing base for fine-grained protections. The leftmost guest's operating system is completely untrusted, and may be executing malware denoted E. However, TrustVisor 316-aware applications, such as App A, may still invoke SSCBs and generate subsequent attestations to their execution integrity. The center guest runs and trusts a commodity operating system but that OS has been carefully configured for a minimal set of operations—in this case the bare essentials to support a banking application B. Since B's OS is too large to formally verify and may still be subject to compromise, B can employ SSCBs and execute them with TrustVisor's 316 protections. The rightmost guest is similar to the center guest but has been tailored to a healthcare application that does not leverage any TrustVisor 316-protected SSCBs.

FIG. 23 shows the architecture of a system supporting both coarse- and fine-grained protections. Coarse-grained protections can be employed to keep various instances of legacy operating systems and applications apart. Page-level integrity checks and W⊕X permissions can prevent unknown code or code with known vulnerabilities from executing. Inside any of these environments, new applications or legacy applications with their security-critical code privilege-separated can leverage SSCBs to get the maximum level of protection for data secrecy and integrity. Our µTPM's attestation facilities can demonstrate the execution integrity of the code that runs in a SSCB to consume inputs, and produce outputs. All of these properties can be verified by the local USB verification device (FIG. 17), which exposes a simple interface to the user. They can also be attested over the network to arbitrary parties, thereby bolstering the security of Internet-scale applications.

Software-Based Attestation for Legacy Hardware and Recovery

Our coarse- and fine-grained protection mechanisms require the presence of current-generation x86 hardware with virtualization and attestation support. Older hardware that lacks these facilities can be supported using software-based techniques to create a dynamic root of trust. The primary drawback of the software based techniques is that tight timing requirements preclude use across the Internet. However, a local verification device (e.g., FIG. 17) can be readily employed to confirm that the user's system is in an approved state.

Software-based attestation is also a powerful recovery mechanism. TPMs and the x86 systems that we consider are low-cost, commodity devices. It is unrealistic to think that they will withstand all attacks. For example, side-channels such as timing or electro-magnetic emissions may enable a sophisticated adversary to compromise hardware secrets in the platform's TPM. Software-based attestation can be used to confirm that a new root of trust has been established for execution on the platform, thereby enabling the system's TPM to be reconfigured for further use.

Although the present invention has been described in terms of specific embodiments, the present invention may include many variations and modifications. Several additional embodiments and variations are identified below, although the present invention is not limited to these additional embodiments and the present invention is not limited to the previous embodiments described.

In one embodiment, the present invention may include the implementation of the hardware-based tools for remote attestation and verification of untampered remote execution of security-sensitive code. Remote execution of security-sensitive code is intended to take advantage of the hardware support offered by commercially available platforms, such as Intel and AMD processors.

In another embodiment, the present invention may include implementation of the software-based tools for local attestation and verification of untampered remote execution of security-sensitive code. Local execution of security-sensitive code is intended to take advantage of the user's proximity to the execution environment and the use of verification devices (e.g., of the size of a USB memory stick) with a human interface. The mechanisms used in this area need not rely on the physical security of TPM-based hardware since user proximity assures sufficient physical security. Hence minimizing the use of secrets becomes an achievable goal.

In another embodiment, the present invention may include implementation of the first two applications requiring secure execution of sensitive code, namely (1) secure web browsing to a set of trusted websites, whereby a user can verify that any sensitive information she provides to the remote webserver arrives with its secrecy and integrity protected, and (2) an environment for OEMs to develop security-sensitive codeblocks complete with support for a trusted path to the user. This gives OEMs a secure platform on which new services can be deployed and existing services can be verifiably hardened against attack, even if the user's system is corrupted by malware. These applications will be implemented on a commercially available operating system platform such as Linux or Windows.

In another embodiment, the present invention may include the implemented tools in a casual user environment supported by a commercially available platform.

In another embodiment, the present invention may include the implementation of several client and server platforms that are distributed across the Internet or some other network for secure remote login. In addition, the present invention may be used to protect against attacks launched by malware and/or malicious insiders, both locally and remotely.

In another embodiment, the present invention includes tools for user-verifiable execution of security-sensitive code on untrusted platforms is to enhance the integrity and security of commercial software products. These tools may be, for example, usable by independent parties without direct supervision from tool developers. The tools can provide significant assurance in the secure execution of sensitive software applications unhampered by the presence of malware.

In another embodiment, the present invention includes a user device that allows the verification of correct execution of security-sensitive applications. The present invention may also include applications that will be a secure browsing environment targeted for use by end-users, and an environment for building a trusted path to security-sensitive codeblocks within applications targeted for use by OEMs. The present invention may also include other user-verifiable applications that will also run unencumbered by malware on commercial platforms such as Linux and Windows.

In another embodiment, the present invention includes a secure browser environment as a stand-alone consumer product, a system to provide trusted path to security-sensitive code for OEMs, and other products and embodiments. Several embodiments of the present invention will be briefly described below.

In addition, the examples provided herein are illustrative and not limiting, and other variations and modifications of the present invention are contemplated. Those and other variations and modifications of the present invention are possible and contemplated, and it is intended that the foregoing specification and the following claims cover such modifications and variations.

The invention claimed is:

1. A computer, comprising:
a processor;
memory connected to the processor and including computer-readable instructions which, when executed by the processor, cause the processor to create a computing platform having:
a select guest having a privilege level and an identity, said select guest to be kept secure from other parts of said computer;
a legacy guest having a privilege level, said legacy guest not assumed to be secure;
a hypervisor, wherein:
the hypervisor supports both the select guest and the legacy guest;
the hypervisor has a privilege level that is more privileged than the privilege level of the select guest;
the hypervisor has a privilege level that is more privileged than the privilege level of the legacy guest;
the hypervisor partitions a unique portion of the memory for the exclusive use of the select guest;
the hypervisor partitions a unique portion of memory for the exclusive use of the legacy guest;
the hypervisor partitions a unique portion of memory for the exclusive use of the hypervisor;
a verification device connected to the processor and including a processor and memory, wherein the memory of the verification device includes computer-readable instructions and wherein the memory of the verification device includes a policy for the select guest;
wherein the computer-readable instructions in the memory of the computer, when executed by the processor of the computer, cause the processor of the computer to perform the steps of:
receiving a signal indicative of a request to execute the select guest;
authenticating a secure connection between the hypervisor and the verification device after receiving the signal indicative of the request to execute the select guest;
measuring the identity of at least a portion of the select guest before the select guest executes any instruction;
sending a measurement of the identity of the select guest to the verification device;
wherein the computer-readable instructions in the memory of the verification device, when executed by the processor in the verification device, cause the processor in the verification device to perform the steps of:
receiving the measurement of the select guest from the processor in the computer;
comparing the policy stored in the verification device with the measurement of the select guest received by the verification device;
wherein the steps of authenticating, measuring, sending, receiving the measurement, and comparing are performed after receiving the signal indicative of the request to execute the select guest and without rebooting the computer.

2. The computer of claim 1, wherein the computer-readable instructions in the memory of the verification device, when executed by the processor in the verification device, cause the processor in the verification device to perform the step of:
sending a signal indicative of whether to execute the select guest after comparing the policy stored in the verification device with the measurement of the select guest.

3. The computer of claim 1, wherein:
the hypervisor has an identity;
the verification device includes a policy for the hypervisor;
authenticating a secure connection between the hypervisor and the verification device includes:
measuring the identify of at least a portion of the hypervisor; and
sending the measurement of the identity of the hypervisor to the verification device;
the steps of measuring the identify of at least a portion of the hypervisor and sending the measurement of the identity of the hypervisor to the verification device are performed after receiving the signal indicative of the request to execute the select guest and without rebooting the computer;
the computer-readable instructions in the memory of the verification device, when executed by the processor in the verification device, cause the processor in the verification device to perform the steps of:
receiving the measurement of the hypervisor from the processor in the computer; and comparing the policy stored in the verification device with the measurement of the hypervisor received by the verification device; and the steps of receiving the measurement of the hypervisor and comparing the policy stored in the verification device with the measurement of the hypervisor received by the verification device are performed after sending the measurement of the identity of the hypervisor to the verification device and without rebooting the computer.

4. The computer of claim 1, wherein:

the hypervisor has an identity; and the computer-readable instructions in the memory of the computer, when executed by the processor of the computer, cause the processor of the computer to perform the step of measuring the identity of the hypervisor before the hypervisor executes any instructions.

5. The computer of claim 1, wherein:

at least one of the select guest and legacy guest includes a network interface connected to a network outside of the computer;

the policy stored in the verification device includes a list of trusted endpoints on the network for the guest having the network interface;

wherein the computer-readable instructions in the memory of the computer, when executed by the processor of the computer, cause the processor of the computer to perform the steps of:

identifying a network connection between the guest having the network interface and an endpoint on the network;

identifying the endpoint of the network connection;

determining whether the network connection to the endpoint is permitted by the policy of trusted endpoints stored in the verification device.

6. The computer of claim 5, wherein identifying the network connection between the guest having the network interface and the endpoint on the network includes identifying the network connection after the network connection is initiated by the endpoint of the network and before data transmitted by the guest is permitted to reach the network interface.

7. The computer of claim 5, wherein the policy of trusted endpoints stored in the verification device can be modified to add and remove trusted endpoints.

8. The computer of claim 1, wherein the policy identifies other guests with which the select guest may share information.

9. The computer of claim 1, wherein the signal indicative of the request to execute the select guest is initiated by a guest in the computing platform.

10. The computer of claim 1, wherein the signal indicative of the request to execute the select guest is initiated by a human user.

11. The computer of claim 10, wherein the computer-readable instructions in the memory of the verification device, when executed by the processor in the verification device, cause the processor in the verification device to perform the step of:

providing a human-perceptible indication of whether the measurement of the select guest received by the verification device corresponds with the policy stored in the verification device, wherein providing the human-perceptible indication is performed after comparing the policy stored in the verification device with the measurement of the select guest that was received by the verification device.

12. The computer of claim 1, wherein:

the computing platform has a plurality of select guests, wherein each select guest has a privilege level and an identity;

the hypervisor supports each of the plurality of select guests;

the hypervisor has a privilege level that is more privileged than the privilege level of the plurality of select guests;

the hypervisor partitions a unique portion of the memory for the exclusive use of each of the plurality of select guests;

the verification device includes a policy for each of the plurality of select guests;

the step of receiving the signal indicative of the request to execute the select guest includes receiving a signal indicative of a request to execute one of the plurality of select guests; the step of measuring the identity of at least a portion of the select guest before the select guest executes any instruction includes measuring the identity of at least a portion of the select guest corresponding to the signal indicative of the request to execute one of the plurality of select guests;

the step of sending a measurement of the identity of the select guest to the verification device includes sending a measurement of the identity of the select guest corresponding to the signal indicative of the request to execute one of the plurality of select guests.

13. The computer of claim 12, further comprising after receiving the signal indicative of the request to execute one of the plurality of select guests:

providing a human-perceptible indication of which of the plurality of select guests is selected for execution, wherein providing a human-perceptible indication is provided by the verification device.

14. The computer of claim 1, further comprising executing the select guest after comparing the policy stored in the verification device with the measurement of the select guest that was received by the verification device.

15. The computer of claim 14, further comprising:

a storage media device that is shared by both the select guest and the legacy guest; the select guest stores encrypted data on the storage media device;

the select guest sends an encryption key and an identity measurement to the hypervisor, wherein the encryption key corresponds to the encrypted data and the identity measurement corresponds to a guest permitted to receive the encryption key;

the hypervisor receives a request to access the encrypted data from a requesting guest;

the hypervisor measures the identity of the requesting guest before the requesting guest executes any instructions;

the hypervisor provides the encryption key to the requesting guest if the measurement of the identity of the requesting guest corresponds with the identity measurement received from the select guest.

16. The computer of claim 15, wherein the select guest and the requesting guest are different guests.

17. The computer of claim 14, further comprising providing a human-perceptible indication of whether the measurement of the select guest received by the verification device corresponds with the policy stored in the verification device.

18. The computer of claim 17, further comprising receiving an input from the user indicative of confirmation to execute the select guest, wherein the input from the user indicative of the user's confirmation to execute the select guest is received:

after providing the human-perceptible indication of whether the measurement of the select guest received by the verification device corresponds with the policy stored in the verification device, and before executing the select guest.

19. The computer of claim 14, wherein the computer-readable instructions in the memory of the computer, when executed by the processor of the computer, cause the processor of the computer to perform the steps of:

receiving a signal indicative of a request to execute the legacy guest, wherein the signal indicative of the request to execute the legacy guest is received after executing the select guest;

pausing the execution of the select guest after receiving the signal indicative of the request to execute the legacy guest; and executing the legacy guest after pausing the execution of the select guest.

20. The computer of claim 19, wherein receiving the signal indicative of the request to execute the legacy guest includes receiving an input at the verification device from a human user indicative of the request to execute the legacy guest.

21. The computer of claim 19, wherein receiving the signal indicative of the request to execute the legacy guest includes receiving a signal initiated by one of the guests in the computing platform.

22. The computer of claim 19, wherein:

the computer readable-instructions in the memory of the computer, when executed by the processor of the computer, cause the processor of the computer to perform the steps of:

receiving a signal indicative of a request to resume executing the select guest after executing the legacy guest;

authenticating a secure connection between the hypervisor and the verification device after receiving the signal indicative of the request to resume executing the select guest; sending a most recent measurement of the identity of the select guest to the verification device after authenticating the secure connection between the hypervisor and the verification device;

wherein the computer-readable instructions in the memory of the verification device, when executed by the processor in the verification device, cause the processor in the verification device to perform the steps of:

receiving the most recent measurement of the identity of the select guest from the processor in the computer;

comparing the policy stored in the verification device with the most recent measurement of the identity of the select guest that was received by the verification device;

wherein the steps of authenticating, sending, receiving the most recent measurement, and comparing are performed after receiving the signal indicative of a request to execute the select guest and without rebooting the computer.

23. The computer of claim 22, further comprising pausing execution of the legacy guest after receiving the signal indicative of the request to resume executing the select guest.

24. The computer of claim 23, wherein the computer-readable instructions in the memory of the verification device, when executed by the processor in the verification device, cause the processor in the verification device to perform the steps of:

providing a human-perceptible indication of whether the most recent measurement of the select guest received by the verification device corresponds with the policy stored in the verification device.

25. The computer of claim 24, further comprising:

receiving an input from a human user indicative of confirmation to execute the select guest, wherein the input indicative of confirmation to execute the select guest is received:

after providing a human-perceptible indication of whether the most recent measurement of the select guest received by the verification device corresponds with the policy stored in the verification device, and before executing the select guest.

26. The computer of claim 25, further comprising resuming execution of the select guest, wherein resuming execution of the select guest is performed:

after pausing the execution of the legacy guest; and after receiving an input from the human user indicative of confirmation to execute the select guest.

27. The computer of claim 24, further comprising resuming execution of the select guest, wherein resuming execution of the select guest is performed:

after pausing the execution of the legacy guest; and without receiving an input from a human user indicative of confirmation to execute the select guest.

28. The computer of claim 24, further comprising resuming execution of the select guest, wherein resuming execution of the select guest is performed:

after pausing the execution of the legacy guest; and without receiving an input from a human user indicative of confirmation to execute the select guest if the measurement of the select guest received by the verification device corresponds with the policy stored in the verification device.

29. The computer of claim 23, further comprising:

resuming execution of the select guest, wherein resuming execution of the select guest is preformed:

after pausing the execution of the legacy guest; and after comparing the policy stored in the verification device with the measurement of the select guest that was sent to the verification device by the processor.

30. The computer of claim 29, wherein the signal indicative of the request to resume executing the select guest is initiated by a guest in the computing platform.

31. The computer of claim 29, wherein the signal indicative of the request to resume executing the select guest is initiated by a human user.

32. The computer of claim 1, wherein there is more than one legacy guest.

33. The computer of claim 1, further comprising:

a first allocated device connected to the computer;

a second allocated device connected to the computer;

a base device connected to the computer;

wherein:

the hypervisor partitions the first allocated device for exclusive use by the select guest;

the hypervisor partitions the second allocated device for exclusive use by the legacy guest; and the hypervisor partitions the base device for use by both the select guest and the legacy guest.

34. The computer of claim 1, wherein both the unique portion of the memory for exclusive use by the select guest and the unique portion of the memory for exclusive use by the legacy guest are different portions of a common data storage device.

35. The computer of claim 34, wherein:

the hypervisor detects when one of the guests sends write instructions to a storage base device;

the hypervisor sends the write instructions to the unique portion of the memory for excusive use by the select guest when the write instructions come from the select guest;

the hypervisor sends the write instructions to the unique portion of the memory for exclusive use by the legacy guest when the write instructions come from the legacy guest.

* * * * *